United States Patent
Webber et al.

(10) Patent No.: US 11,969,311 B2
(45) Date of Patent: Apr. 30, 2024

(54) REPLACEMENT ATTACHMENT SYSTEM

(71) Applicant: Align Technology, Inc., San Jose, CA (US)

(72) Inventors: Peter Webber, Santa Clara, CA (US); Siobhan O'Leary, Santa Clara, CA (US)

(73) Assignee: Align Technology, Inc., San Jose, CA (US)

( * ) Notice: Subject to any disclaimer, the term of this patent is extended or adjusted under 35 U.S.C. 154(b) by 31 days.

(21) Appl. No.: 17/549,460

(22) Filed: Dec. 13, 2021

(65) Prior Publication Data
US 2022/0183795 A1    Jun. 16, 2022

Related U.S. Application Data

(60) Provisional application No. 63/125,364, filed on Dec. 14, 2020.

(51) Int. Cl.
| | |
|---|---|
| A61C 7/14 | (2006.01) |
| A61C 7/00 | (2006.01) |
| A61C 7/08 | (2006.01) |
| A61C 7/16 | (2006.01) |
| B29C 64/386 | (2017.01) |
| B29C 64/40 | (2017.01) |
| B29L 31/00 | (2006.01) |
| B33Y 10/00 | (2015.01) |
| B33Y 50/02 | (2015.01) |
| B33Y 80/00 | (2015.01) |

(52) U.S. Cl.
CPC .............. *A61C 7/146* (2013.01); *A61C 7/002* (2013.01); *A61C 7/08* (2013.01); *A61C 7/145* (2013.01); *A61C 7/16* (2013.01); *B29C 64/386* (2017.08); *B29C 64/40* (2017.08); *B29L 2031/7536* (2013.01); *B33Y 10/00* (2014.12); *B33Y 50/02* (2014.12); *B33Y 80/00* (2014.12)

(58) Field of Classification Search
CPC .. A61C 7/002; A61C 7/08; A61C 7/16; A61C 7/145; A61C 7/146
See application file for complete search history.

(56) References Cited

U.S. PATENT DOCUMENTS

| | | | |
|---|---|---|---|
| 4,183,141 | A | 1/1980 | Dellinger et al. |
| 5,820,368 | A | 10/1998 | Wolk |
| 6,183,248 | B1 | 2/2001 | Chishti et al. |
| 6,309,215 | B1 | 10/2001 | Phan et al. |

(Continued)

FOREIGN PATENT DOCUMENTS

KR      102100071 B1    4/2020

*Primary Examiner* — Cris L. Rodriguez
*Assistant Examiner* — Sydney J Pulvidente
(74) *Attorney, Agent, or Firm* — Shay Glenn LLP

(57) ABSTRACT

Dental attachment placement apparatuses with one or more replacement attachment systems for providing one or more replacement dental attachments. The replacement attachment systems may include a body that is configured to orient and align the apparatus with respect to the teeth. The apparatus may include one or more primary dental attachments coupled to the body, where the body is configured to position the primary dental attachments adjacent to the teeth for bonding. The replacement system can be configured to replace the primary dental attachments and align replacement dental attachments with respect to the teeth.

20 Claims, 56 Drawing Sheets

(56) References Cited

U.S. PATENT DOCUMENTS

| | | |
|---|---|---|
| 6,386,864 B1 | 5/2002 | Kuo |
| 6,454,565 B2 | 9/2002 | Phan et al. |
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2014/0067334 A1 | 3/2014 | Kuo |
| 2015/0265376 A1 | 9/2015 | Kopelman |
| 2015/0366638 A1 | 12/2015 | Kopelman et al. |
| 2016/0193014 A1 | 7/2016 | Morton et al. |
| 2016/0228214 A1* | 8/2016 | Sachdeva ............ G05B 19/4097 |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0318046 A1* | 11/2018 | Lee ....................... A61C 7/146 |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0262101 A1 | 8/2019 | Shanjani et al. |

(56) References Cited

U.S. PATENT DOCUMENTS

| | | |
|---|---|---|
| 2019/0298494 A1* | 10/2019 | Webber ................. A61C 7/145 |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

* cited by examiner

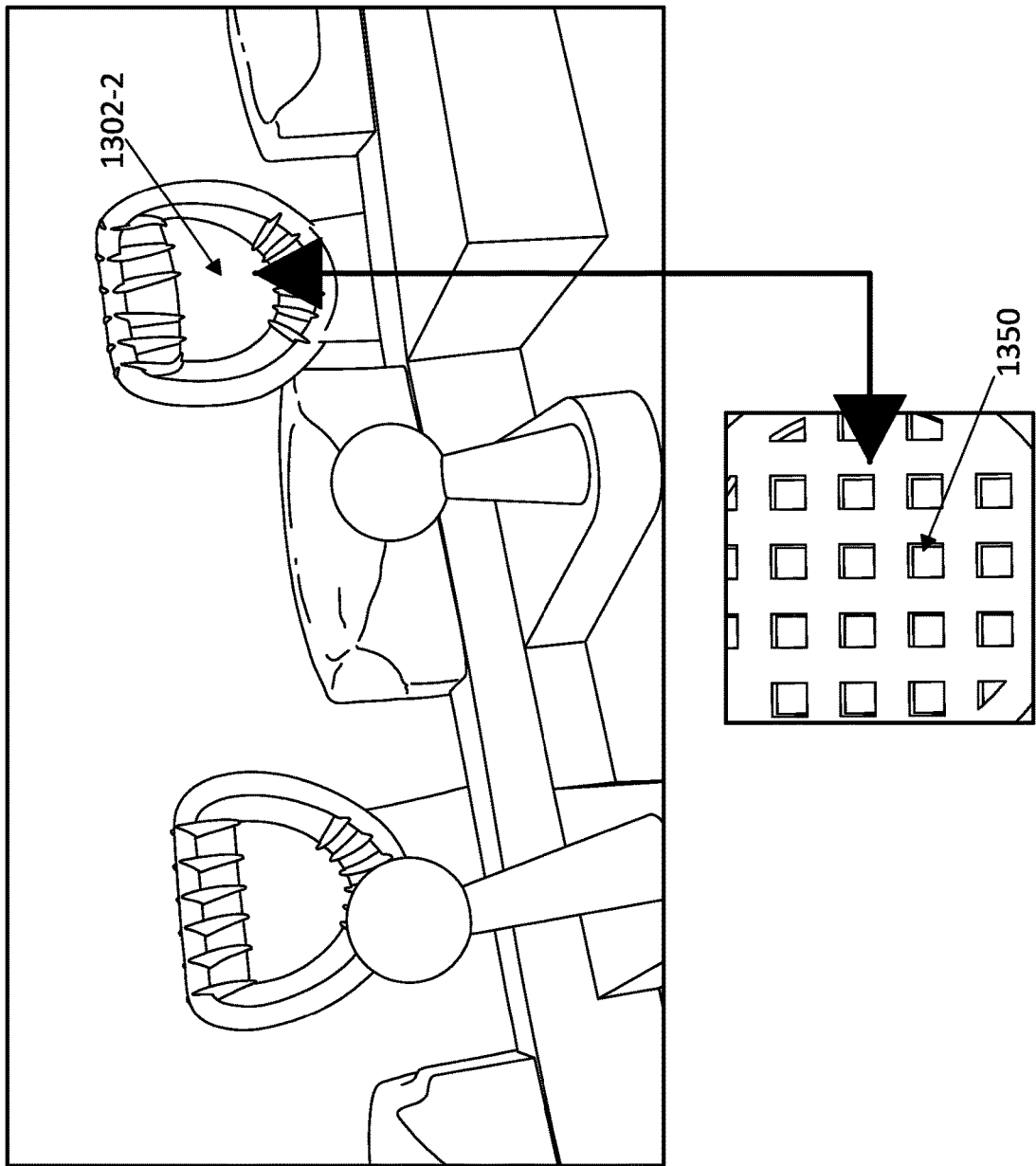

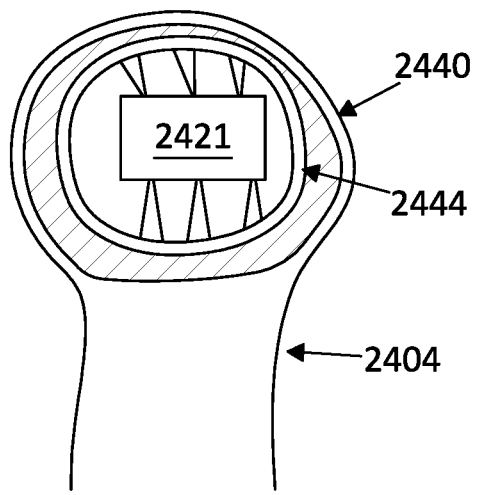
FIG. 24A
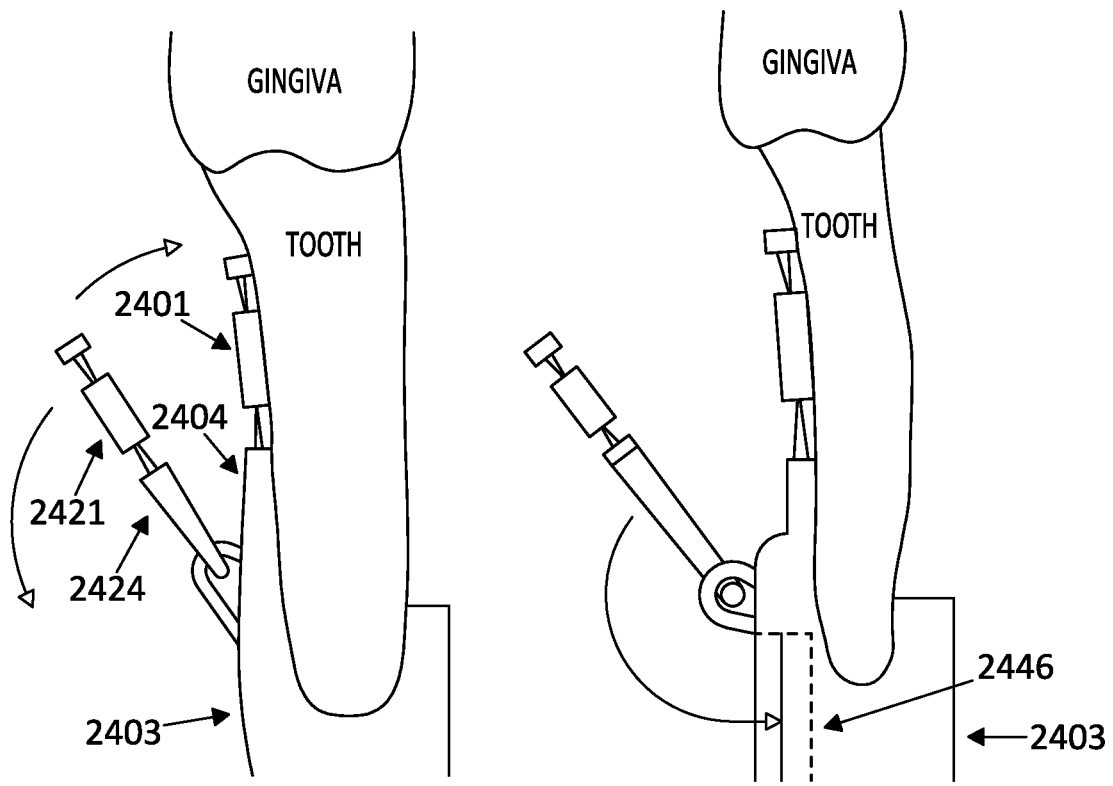
FIG. 24B
FIG. 24C

REPLACEMENT ATTACHMENT SYSTEM

CLAIM OF PRIORITY

This patent application claims priority to U.S. Provisional Patent Application No. 63/125,364, titled "REPLACEMENT ATTACHMENT SYSTEM," filed on Dec. 14, 2020, and herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are orthodontic dental devices and methods of making and using them. In particular, dental attachment apparatuses with a back-up dental attachment are described.

BACKGROUND

Dental aligners are generally designed to apply pressure to the teeth to move the teeth into the aligner's position. Patients that need one or more teeth rotated or moved in a particular direction may have small composite attachments bonded onto certain teeth. The location and placement of the dental attachments on the teeth can be important in order to properly cooperate with the aligner and apply the appropriate forces for straightening the teeth. A dental attachment placement apparatus, sometimes referred to as a template, may be used by a dental specialist to place the attachments in their proper locations on the teeth. The dental attachment placement apparatus may include a body that can be placed on the teeth to align the attachments, which are sometimes already attached to the body in their proper locations with respect to the teeth. The dental specialist can then bond the attachments to the patient's teeth. However, sometimes an attachment may fail to bond properly, or the bonding process may damage an attachment. In some cases, one or more of the attachments of the dental attachment placement apparatus may get lost or damaged during handing or shipment of the apparatus. If an attachment is lost or damaged, the dental specialist will need to find another dental attachment to replace the lost or damaged one, which may be difficult since the dental attachments often have a particular size and shape. Another option is for the dental specialist to order a new dental attachment placement apparatus, which takes time and would require the patient to make a follow-up appointment. Therefore, it would be helpful to provide a dental attachment apparatus that includes replacement attachments.

SUMMARY OF THE DISCLOSURE

The dental apparatuses (devices and system) and methods described herein address problems related to applying dental attachments to a patient's teeth. The dental attachment placement apparatuses include a replacement system that include one or more redundant dental attachments that may be used in case one or more primary attachments are lost, damaged, or otherwise unusable. The dental attachment placement apparatuses can be configured to properly align the replacement dental attachments adjacent to the teeth for bonding the replacement dental attachments in the correct positions. The dental attachment placement apparatuses may be configured to store the replacement attachments so that they are easily accessible in case they are needed. The dental attachment placement apparatuses with the attachment replacement system may have little to no impact on the overall usability of the apparatus, or in the manufacture of the apparatus.

The replacement dental attachments may serve as back-up dental attachments for primary dental attachments in cases where the primary dental attachments are lost or damaged. In these cases, the replacement dental attachments may be configured to bond at the same locations on the teeth as the primary dental attachments. In other instances, the replacement dental attachments may serve to bond dental attachments at locations other than the primary attachments, for example, if the replacement dental attachments are used as part of an alternative portion of a treatment plan.

The dental attachment placement apparatuses described herein can be manufactured using any of a number of fabrication technologies, including additive manufacturing (e.g., 3D printing, molding, joining, casting and/or other fabrication techniques. In some examples, the apparatuses are at least partially manufactured using 3D printing where the primary attachments, replacement attachments and the body are manufactured together as one part. In other cases, parts of the apparatuses are 3D printed separately from other parts of the apparatuses.

The dental attachment placement apparatuses described herein can be made of any of a number of materials. In some instances, a dental attachment placement apparatus is made of one or more polymer materials suitable for dental applications. In some cases, at least a portion of a dental attachment placement apparatus includes one or more composite polymer materials. In some cases, the body is made of a first material and the dental attachments (e.g., primary and/or replacement attachments) are made of a second material that is different than the first material. In some cases, the body and the dental attachments (e.g., primary and/or replacement attachments) are made of the same material(s).

For example, described herein are dental attachment placement apparatuses (e.g., devices, systems, etc.) including: a body configured for placement against tooth surfaces of a dental arch; an attachment support (e.g., attachment support structure) coupled to the body and configured to position a first dental attachment adjacent to a tooth of the dental arch; and an attachment replacement system configured to replace the first dental attachment with a second dental attachment and to position the second dental attachment adjacent to the tooth.

The body may be configured for placement against tooth surfaces of a dental arch by including a shape (surface) that conforms to the tooth surface; the body may be rigid, and may have a contour that is complimentary to the tooth surface. The surface may be textured, and/or may include one or more structures (e.g., channels, passages, openings, etc.) for a cement or dental adhesive. For example, the body may include surfaces that register with the tooth surfaces of the dental arch to retain a relative position of the dental attachment placement apparatus with respect to the dental arch when placed against the tooth surfaces. In some examples, the body includes cavities shaped to receive teeth of the dental arch to retain a relative position of the dental attachment placement apparatus with respect to the dental arch when placed against the tooth surfaces.

The attachment support may be coupled to the body or may be integrally formed with the body. The attachment support may be configured to position a first dental attachment adjacent to a tooth of the dental arch by supporting, e.g., holding, mounting, retaining, or the like, the first dental attachment so that it is held against a tooth. The attachment support may be configured so that it does not interfere with access to the attachment and/or tooth, and may allow the user (e.g., dentist, orthodontist, etc.) to secure and/or adjust the attachment position relative to the tooth.

The attachment support may be removably attached to the body. For example, the attachment support may be configured to position the first dental attachment at a first position with respect to the tooth, wherein the attachment replacement system is configured to position the second attachment at a second position with respect to the tooth that is different than the second position. The attachment support may be configured to position the first dental attachment at a first position with respect to the tooth, wherein the attachment replacement system is configured to position the second attachment at a second position with respect to the tooth that is the same as the second position.

The attachment replacement system may be configured to allow movement of the second dental attachment relative to the body. For example, an attachment replacement system may be configured to allow rotation or translation of the second dental attachment relative to the body. For example, an attachment replacement system may include one or more of a hinge, a joint, a rotatable arm, a gear and a dispenser configured to allow movement of the second dental attachment relative to the body. In some examples, the attachment replacement system may include a hinge configured to allow movement of the second dental attachment relative to the body.

The first dental attachment may have a different shape than the second dental attachment. Alternatively, the dental attachment may have the same shape as the second dental attachment.

The attachment replacement system may include a second attachment support supporting the second dental attachment. The second attachment support may include or more supports that frangibly connect the second dental attachment to the second attachment support. The attachment support may include one or more supports that frangibly connect the first dental attachment to the attachment support.

The dental attachment placement apparatus may include multiple attachment replacement systems configured to replace first dental attachments with corresponding second dental attachments.

For example, a dental attachment placement apparatus may include: a body configured for placement against tooth surfaces of a dental arch; a primary attachment support coupled to the body and configured to position a primary dental attachment adjacent to a tooth of the dental arch; and a replacement attachment support coupled to the body and configured to replace the primary dental attachment with a replacement dental attachment and to position the replacement attachment support adjacent to the tooth.

Also described herein are method of using any of the dental attachment placement apparatuses described herein. For example, a method may include: placing a body of the dental attachment placement apparatus against tooth surfaces of a dental arch; using an attachment replacement system coupled to the body to move a second dental attachment to a position adjacent to a surface of a tooth of the dental arch; and bonding the second dental attachment to the surface of the tooth.

Any of these methods may include removing a first dental attachment from the dental attachment placement apparatus prior to moving the second dental attachment to the position adjacent to the surface of the tooth. The method may also or alternatively include removing a dental attachment support from the dental attachment placement apparatus prior to moving the second dental attachment to the position adjacent to the surface of the tooth, wherein the dental attachment support is configured to support a first dental attachment. Moving the second dental attachment may include rotating or translating the second dental attachment relative to the body.

A dental attachment placement apparatus described herein includes: a body configured to be place on a patient's dental arch; a primary dental attachment coupled to the body, the primary dental attachment arranged to bond with a bonding surface on a tooth of the patient's dental arch when the body is placed on the patient's dental arch; and a replacement dental attachment coupled to body adjacent to the primary dental attachment, the replacement dental attachment arranged to move with respect to the body to replace the primary dental attachment such that the replacement dental attachment is arranged to bond with the bonding surface of the tooth.

The body can have an arch shape.

The replacement dental attachment can be arranged to move into place with respect to the bonding surface of the tooth after the primary dental attachment is decoupled from the body.

The replacement dental attachment can be configured to rotate or translate with respect to the body.

The body can have a plurality of registration surfaces configured to mate with a plurality of teeth of the patient's dental arch.

The replacement dental attachment can be coupled to the body by one or more of a hinge, a joint, a rotatable arm, a gear, and a dispenser configured to allow movement of the replacement dental attachment relative to the body.

The primary dental attachment can be attached to a first attachment support that is extends from the body.

The replacement dental attachment can be attached to a second attachment support that is extends from the body.

The body can include cavities shaped to receive teeth of the patient's dental arch to retain a relative position of the body with respect to the patient's dental arch when placed against the patient's tooth surfaces.

The primary dental attachment can be arranged to bond with a first position on the bonding surface of the tooth, and wherein the replacement dental attachment is arranged to bond with a second position on the bonding surface of the tooth, wherein the first position is different than the second position.

The primary dental attachment and the replacement dental attachment can be arranged to bond with a same position on the bonding surface of the tooth.

The primary dental attachment can have a different shape than the replacement dental attachment.

The primary dental attachment can have a same shape as the replacement dental attachment.

The primary dental attachment can be frangibly coupled to the body.

The replacement dental attachment can be frangibly coupled to the body.

The body can include multiple primary dental attachments and multiple replacement dental attachments.

A method of using a dental attachment placement apparatus described herein includes: placing a body of the dental attachment placement apparatus on a patient's dental arch, wherein a first dental attachment coupled to the body is positioned adjacent to a surface of a tooth of the patient's dental arch when the body is placed on the patient's dental arch; and moving a second dental attachment coupled to the body, wherein the second dental attachment is positioned adjacent to the surface of the tooth.

The method can further include bonding the second dental attachment to the surface of the tooth The first dental attachment can be positioned adjacent to a first position on the surface of a tooth, wherein the second dental attachment is positioned adjacent to a second position on the surface of the tooth, the first position different than the second position.

The method can further include decoupling the first dental attachment form the body before moving the second attachment in position adjacent to the surface of the tooth.

The second dental attachment can be positioned adjacent to a same position on the surface of a tooth as the first dental attachment was positioned prior to decoupling of the first dental attachment.

The first dental attachment can be supported by a dental attachment support coupled to the body, wherein decoupling the first dental attachment comprises removing a dental attachment support from the body.

Moving the second dental attachment can include rotating or translating the second dental attachment relative to the body.

The second dental attachment can be coupled to a second attachment support movably coupled to the body.

Other examples of dental attachments and placement apparatuses that may incorporate any of the features described herein may be found in U.S. patent application Ser. No. 16/366,686, filed Mar. 27, 2019, published as U.S. Patent Application Publication No. 2019/0298494, and entitled "DENTAL ATTACHMENT PLACEMENT STRUCTURE," which is incorporated herein by reference in its entirety.

These and other aspects and advantages are described herein.

BRIEF DESCRIPTION OF THE DRAWINGS

Novel features of embodiments described herein are set forth with particularity in the appended claims. A better understanding of the features and advantages of the embodiments may be obtained by reference to the following detailed description that sets forth illustrative embodiments and the accompanying drawings.

FIG. 13D illustrates a side view of the dental attachment placement structure of FIG. 13A showing a textured surface of a dental attachment according to some embodiments.

FIGS. 24A-24C illustrate yet a further example of a hinge-type dental attachment replacement system.

FIG. 27A shows a front view; FIG. 27B shows a side view; and FIG. 27C shows a perspective view.

DETAILED DESCRIPTION

In general, described herein are apparatuses (e.g., devices or systems) and methods for positioning dental attachments with respect to the teeth of a dental arch for bonding of the dental attachments. The apparatuses and methods can be used to attach one or more dental attachments to one or more teeth and to provide one or more replacement or secondary dental attachments.

Figure 1A:
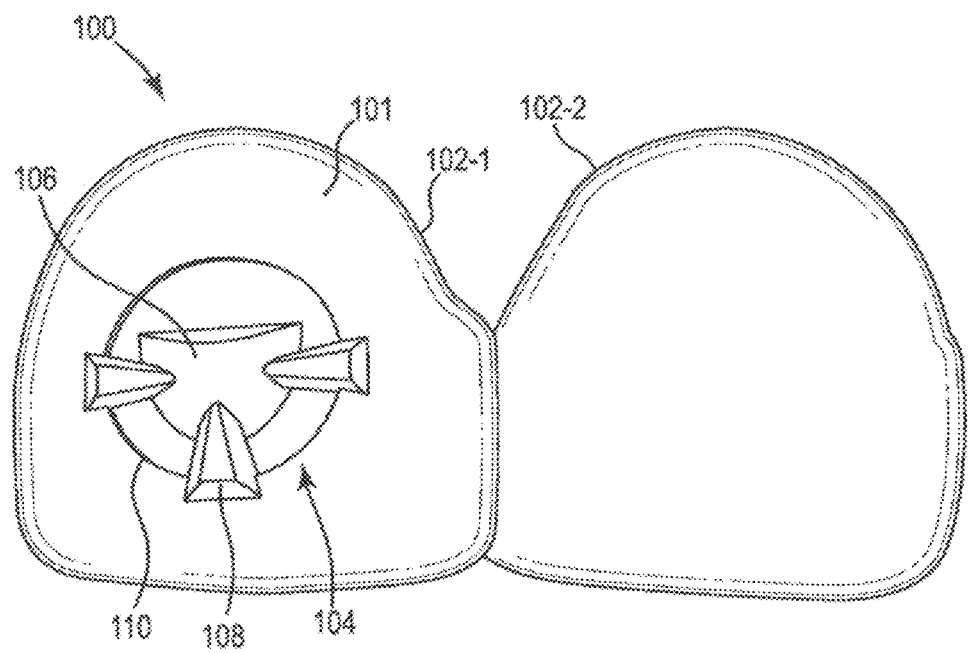
FIG. 1A illustrates a front view of a dental attachment placement structure for placement of an attachment according to a number of embodiments of the present disclosure.

FIG. 1A illustrates a front view of a dental attachment placement structure for placement of an attachment according to a number of embodiments of the present disclosure. In the embodiment of FIG. 1A, the apparatus 100 includes a body 101 having at least one surface shaped to conform to one or more of the contours of an exterior surface of a tooth. In the case of the embodiment of FIG. 1A, the body has multiple surfaces, (inner surfaces of portions 102-1 and 102-2), each shaped to conform to the multiple contours of an exterior surface of a tooth, and other surfaces will be discussed in more detail in FIG. 1B.

The body 101 also includes an attachment mounting structure 104 including the attachment 106, an aperture 110 to allow placement of the attachment 106 on the surface of a tooth, and a number of supports 108. The structure illustrated in FIG. 1A, allows the treatment professional to place the apparatus 100 onto the teeth of a patient to provide a more accurate position and orientation for the attachment 106, with respect to the tooth surface, during the securing of the attachment 106 to the surface of the tooth than previous techniques.

The securing of the attachment can be accomplished in any suitable manner. For example, the attachment can be cured to the tooth surface, for instance, by use of a light source, such as ultra-violet (UV) light source, which will bond the attachment material directly to the surface of the tooth. In some embodiments, an adhesive material can be applied to the back side of the attachment and the adhesive can be used to secure the attachment to the tooth surface.

In various embodiments, the apparatus can be designed to have one surface shaped to conform to one or more contours of an exterior surface of a tooth (e.g., a surface that conforms to a portion of the front surface of a tooth), such that when the two surfaces are aligned, their contours match, thereby indicating to the treatment professional that the apparatus has been placed correctly.

This correct placement can be with respect to the placement of the apparatus with respect to the tooth in one or more dimensions (e.g., up, down, right, left, rotationally, etc. with respect to the tooth surface upon which the attachment will be applied). If the apparatus is correctly placed, then the attachment will also be correctly placed with respect to the tooth surface.

As used herein, "positioning" is the locating of the attachment at a particular point on the surface of a tooth and "orienting" is the movement of the attachment in a manner that does not change its position on the surface of the tooth (e.g., a rotation of the attachment about an axis or movement of the attachment in one or more directions that does not change its position on the surface of the tooth). For example, an attachment can be positioned at a particular point on the surface of a tooth and then can be oriented by rotating it, for example, parallel to the tooth surface, or along an axis perpendicular to the surface of the tooth. Other angles of rotation can also be used to orient the attachment without changing the attachment's position.

Figure 1B:
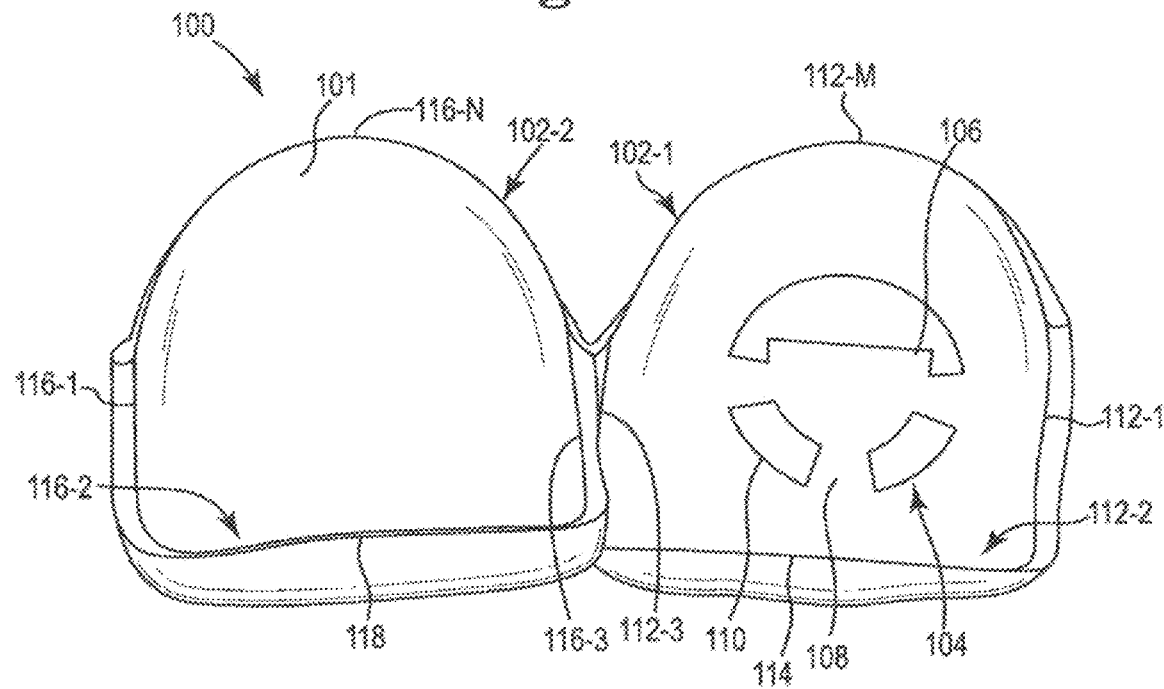
FIG. 1B illustrates a back view of the dental attachment placement structure of FIG. 1A.

In the embodiment of FIGS. 1A and 1B, the apparatus includes many surfaces that are shaped to conform to many contours of many exterior surfaces of multiple teeth (e.g., one or more contours of the front surface, side surfaces, edge surfaces, back surface, etc.).

Generally, the more surfaces used, the more accurate the positioning and/or orientation of the attachment, in relation to the tooth, can be to the desired correct placement. Also, when attaching multiple attachments, these surfaces can be used to accurately position and orient the attachments in relation to each other.

Once an attachment is placed on the tooth, it has to be secured to the tooth and the apparatus has to be removed. In some embodiments, such as that shown in FIGS. 1A and 1B, the apparatus can include one or more supports connecting the attachment to the body.

In such embodiments, the one or more supports can be made from a material that allows the support material 108 to be separated from the material of the attachment 106. For example, the support can be made from a material that can be broken at or near the location where the support and attachment are connected.

In some embodiments, the attachment between the support and the attachment can be released by a release agent, such as a chemical, heat, moisture, or other type of release agent. The release agent may, for example, dissolve a portion of the support and/or attachment in order to release the support and/or attachment from each other.

In various embodiments, the support and attachment can be fabricated from the same material, but the structure of the support can be such that it can be broken at a point to disconnect it from the attachment. Any suitable technique can be used to achieve the breaking or release of the support and/or attachment material in order to release the support from the attachment.

For example, the support structure may include a narrow section that is conducive to breaking at that location. In another embodiment, the support structure may include a scored section that is conducive to breaking at that location.

In various embodiments, the attachment can be mechanically mounted to the supports such that the attachment can be released from the supports once the attachment is secured to the surface of the tooth. This can be accomplished by any suitable releasable attachment structure. For example, one suitable structure is a groove located on each support and corresponding mating flanges on the attachment surface that can be slid out of the grooves to release the attachment from the supports.

FIG. 1B illustrates a back view of the dental attachment placement structure of FIG. 1A. In this view, the back side of the body 101 is shown including the back side of the attachment mounting structure 104 including the attachment 106 and supports 108, and the two inner surfaces of portions 102-1 and 102-2 of the body 101, each shaped to conform to the multiple contours of an exterior surface of a tooth are shown.

As used herein, a surface that is shaped to conform to a contour of an exterior surface of a tooth (i.e., an alignment surface) can be used to accurately position and/or orient the attachment on the tooth. For example, if surface of the apparatus is shaped to conform to a contour of the front surface of the tooth (e.g., surface 102-1 shown in FIG. 1A), then when the apparatus is pressed against the front surface of the tooth such that the contours of the tooth and the apparatus correspond to each other, the attachment will be correctly oriented with respect to the angle of the back side of the attachment to the surface of the tooth.

In the view shown in FIG. 1B, more surfaces shaped to conform to the multiple contours of an exterior surface of a tooth are shown than were visible in the view of FIG. 1A. As discussed above, if another surface is used, for example, a side surface 112-1, then the placement of the attachment can be more accurately accomplished with respect to its position and orientation.

For instance, when the side 112-1 is positioned along the corresponding side of the tooth such that their contours align, then the attachment should be the correct distance from the side of the tooth and will be correctly oriented with respect to the angle of the back side of the attachment to the surface of the tooth.

When more surfaces are utilized, the position and/or orientation of the attachment can be more precise. For example, the body 101 includes side surfaces 112-1, 112-3 of a first tooth, and side surfaces 116-1 and 116-3 of a second tooth. The body 101 also includes surfaces that are shaped to conform to the gingival line on a tooth 112-M and 116-N, and surfaces 112-2 and 116-2 that conform to the bottom edge of a tooth (and/or the bottom of the front and/or back side of the tooth).

Additionally, the embodiment of FIG. 1B includes a portion that conforms to the back side of the first tooth 114 and another portion that conforms to the back side of the second tooth 118. The use of such surfaces in conjunction with other surfaces can also allow for use of the corners of the teeth to be used to aid in positioning and/or orientation of an attachment. For example, the apparatus can be slid onto the tooth until the bottom edge of the tooth contacts the bottom edge 112-2 of the apparatus. When the front surface, the sides, corners, and bottom of the apparatus are aligned with their corresponding tooth surfaces, the attachment can be very precisely placed on its intended tooth surface.

Figure 1C:
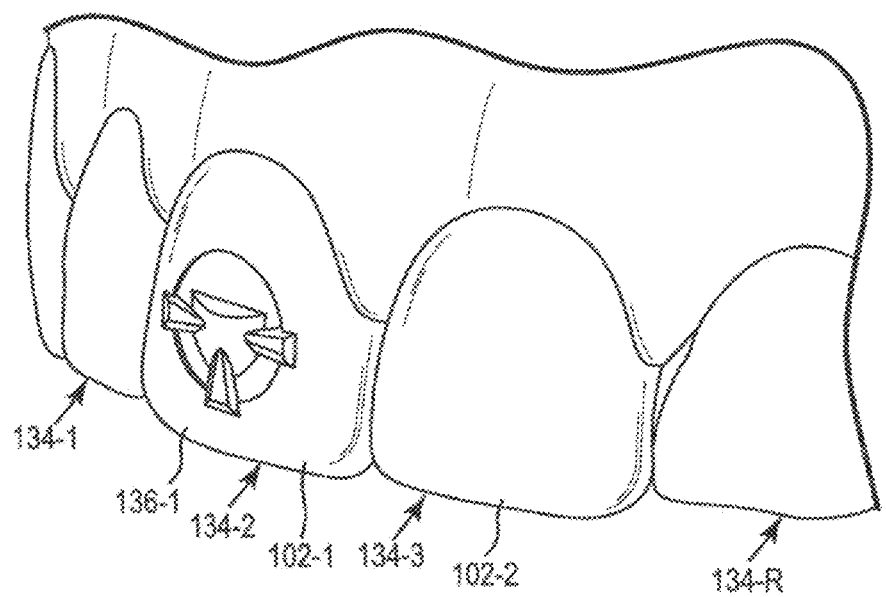
FIG. 1C illustrates a front view of the dental attachment placement structure of FIGS. 1A and 1B positioned on a tooth of a patient.

FIG. 1C illustrates a front view of the dental attachment placement structure of FIGS. 1A and 1B positioned on a tooth of a patient. In the view of FIG. 1C, several teeth and the gingiva of a patient are illustrated, including teeth 134-1, 134-2, 134-3, and 134-R. The apparatus 100 has been placed on the two of the teeth (134-2 and 134-3) such that the inner surfaces of portions 102-1 and 102-2 are placed in contact with tooth surfaces 136-1 and 136-2, respectively.

Figure 1D:
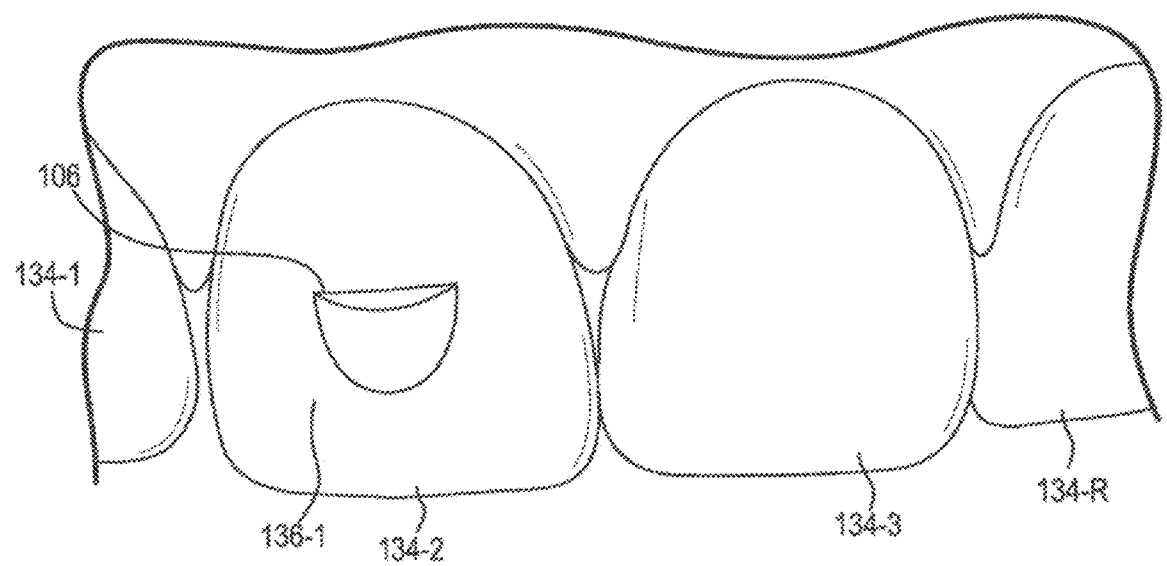
FIG. 1D illustrates a front view of a dental attachment attached to a tooth of a patient utilizing the dental attachment placement structure of FIGS. 1A and 1B.

FIG. 1D illustrates a front view of a dental attachment attached to a tooth of a patient utilizing the dental attachment placement structure of FIGS. 1A and 1B. The resultant placement has been accomplished via the attachment mounting structure illustrated in FIGS. 1A and 1B.

In this manner, the attachment 106 has been correctly positioned on the surface 136-1 of tooth 134-2 and oriented such that it can provide the desired force to the teeth of the patient (e.g., 134-1, 134-2, 134-3, 134-R, and/or other teeth of the patient) when combined with the dental appliance that will attach to the attachment.

In some embodiments, such as that shown in FIGS. 1A-1C, the attachment and/or the dental attachment placement structure, can be fabricated through direct fabrication, such as via a three-dimensional (3D) printer). This can be beneficial as the treatment profession can print these components at their location rather than at a manufacturing facility. Further, these components do not need to be formed around a mold of teeth when direct printed, this can save in manufacturing costs due to less time, materials, and employee time in creating such models and removing the components from the models.

Direct fabrication also allows for the design to be more easily and readily changed because the design can be altered via a computing device and direct printed from the modified design stored in memory on the computing device or a connected network or memory. Further, direct fabrication allows for creation of components of different material without substantial changes to equipment that may be used at a manufacturing facility, among other benefits.

For example, a dental attachment placement apparatus can be formed by printing, using a three-dimensional printing apparatus, an attachment, out of an attachment material and printing, using a three-dimensional printing apparatus, a dental attachment placement structure, connected to the attachment to hold the attachment in a particular position. In some embodiments, the dental attachment placement structure and the attachment can be fabricated from the same material. Material, examples include: polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof, which can be used to make dental appliances, such as aligners, or curable composite (e.g., a resin material) that can be used to attach orthodontic appliances to teeth or create orthodontic structures.

In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

As discussed herein, one other benefit to direct fabrication is that one or more surfaces that will be used to attach the attachment to a tooth and/or to position an attachment with respect to one or more teeth can be fabricated with surfaces that will mate with the corresponding surface of the one or more teeth to accomplish these functionalities (attachment and/or positioning of the attachment). This can be accomplished by virtual design of these surfaces and then using these virtual designs to fabricate the attachment and/or the dental attachment placement structure directly.

Figure 2:
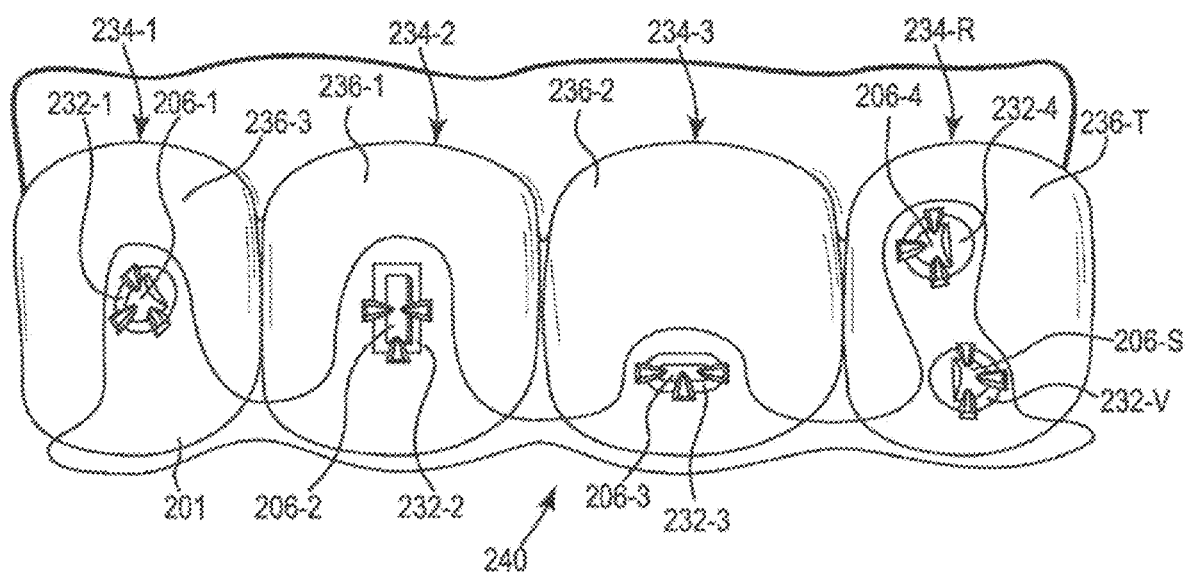
FIG. 2 illustrates a front view of a dental attachment placement structure having multiple attachment placement components provided on the structure according to a number of embodiments of the present disclosure.

FIG. 2 illustrates a front view of a dental attachment placement structure having multiple attachment placement components provided on the structure according to a number of embodiments of the present disclosure. In the embodiment of FIG. 2, the body 201 of apparatus 240 has an attachment mounting structure has an aperture 232-1 with an attachment 206-1 placed in the aperture. Through use of the apparatus 240, the attachment is in the desired position and orientation for securing to the surface 236-3 of tooth 234-1.

Attachments 206-2, 206-3, 206-4, and 206-S are also positioned in apertures 232-2, 232-3, 232-4, and 232-V on surface 236-1 of tooth 234-2, 236-2 of tooth 234-3, and 236-T of tooth 234-R. In such an embodiment, one or more of the teeth can have multiple attachments affixed thereon.

In order to save fabrication time and materials cost, the apparatus may include multiple attachment locations and only some may be used at any given time. In such applications, the apparatus 240 can, for example, be used to affix attachment 206-2 at one point in time and can be reused to attach 206-S at aperture 232-V or an attachment at one or more of the other locations on the apparatus (e.g., apertures 232-1, 232-2, and/or 232-3) at a different time.

Another feature of the embodiment of FIG. 2, is that in order to save fabrication time and materials cost, an apparatus with less material can be used. In such embodiments, the apparatus can be designed such that a reduced amount or minimized amount of material is used in order to properly position the attachment at a desired location (e.g., target location).

Further, in prior concepts, treatment professionals may only have had access to a few, standardized attachment shapes. In this manner, the options for treatment may have been restricted based on the limited forces that could be provided by the standardized attachments. If any other attachment shape was desired, the treatment professional could file or grind the attachment surfaces to change its shape, but a treatment plan would not take these modifications into account and therefore the actual result would be different than the treatment plan result. This resulted in additional time spent in getting the proper shape, misshapen attachments that did not fit or function correctly, and other issues.

Although embodiments of the present disclosure can be used to form such standardized attachments, since the apparatus can be fabricated to be used with a specific patient's teeth positioning, specialized attachments can also be designed and can be made available to a treatment professional.

Such specialization can also, for example, include the size of the attachment, shape of the attachment, and other suitable specialized characteristics. Accordingly, the patient will be able to get a more customized treatment based on use of such embodiments. This can allow the apparatus to be specialized to the patient, but not be onerous on the treatment professional who, for example, may not have attachment design skills or capabilities.

In some embodiments, the treatment professional may also select one or more attachment materials or attachment types and/or select the location upon which they should be applied. Such embodiments can allow further customization of the apparatus and can be taken into account when the manufacture of the attachment templates is created. Further, in various embodiments, this customization can be made for each appliance (or for multiple appliances) in a set of appliances of a treatment plan.

In some embodiments, a computing device (such as that described in relation to FIG. 10 below) can be used to create a treatment plan to move the teeth of a patient in an incremental manner to improve their position within the patient's mouth. Other dental appliances can be created to aid patients with sleep apnea or medication delivery, among other types of appliances.

A computing device can be used to create such devices or molds to fabricate such dental appliances, attachments, and/or attachment placement structures. In some embodiments, a computing device can be used to virtually model such dental appliances, attachments, and/or attachment placement structures.

For example, through use of a treatment plan and/or virtual modeling, a dental appliance (e.g., an aligner for aligning teeth or jaws of a patient) or attachment placement structure can be made, for example, by thermal-forming a sheet of plastic over a physical dental mold. The physical dental mold, for instance, can represent an incremental position to which a patient's teeth are to be moved and can include attachment shapes formed in the mold.

In this manner, one or more surfaces of the dental appliance can engage with one or more surfaces of the one or more attachments (when the finished dental appliance is placed in the patient's mouth with the actual attachments). By having the attachments on the mold, the dental appliance is formed with the surfaces that will interact with the attachments.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of a number of teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as an SLA or 3D printing machine, to form and/or create the dental mold. As discussed above, the result of the dental mold can include a set of molded teeth.

The set of molded teeth can include at least a replica of a number of teeth of the patient but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance or attachment placement structure can be formed by layering a thermoformable sheet of material and/or multiple sheets of one or more materials over the dental mold. The materials can include a polymeric material, for instance.

Generally, the dental appliance or attachment placement structure is produced and/or formed by heating the polymeric thermoformable sheet and vacuum or pressure forming the sheet over the dental mold (e.g., a number of molded teeth). A dental appliance or attachment placement structure can, for example, include a negative impression of the dental mold. Such molding techniques can be used to create the dental appliances and attachment placement structures.

Figure 3A:
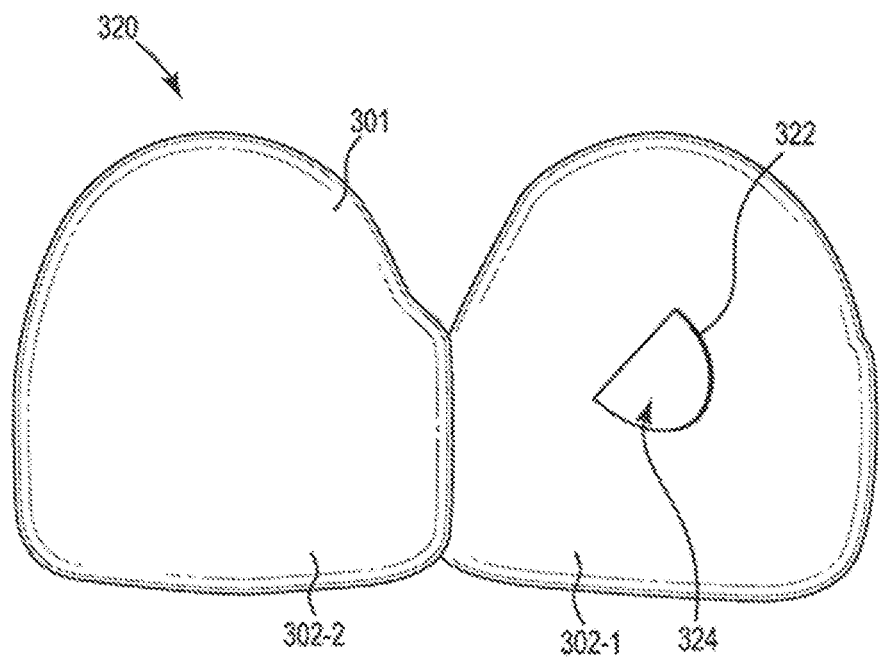
FIG. 3A illustrates a front view of a dental attachment placement structure for etching a tooth according to a number of embodiments of the present disclosure.
Figure 3B:
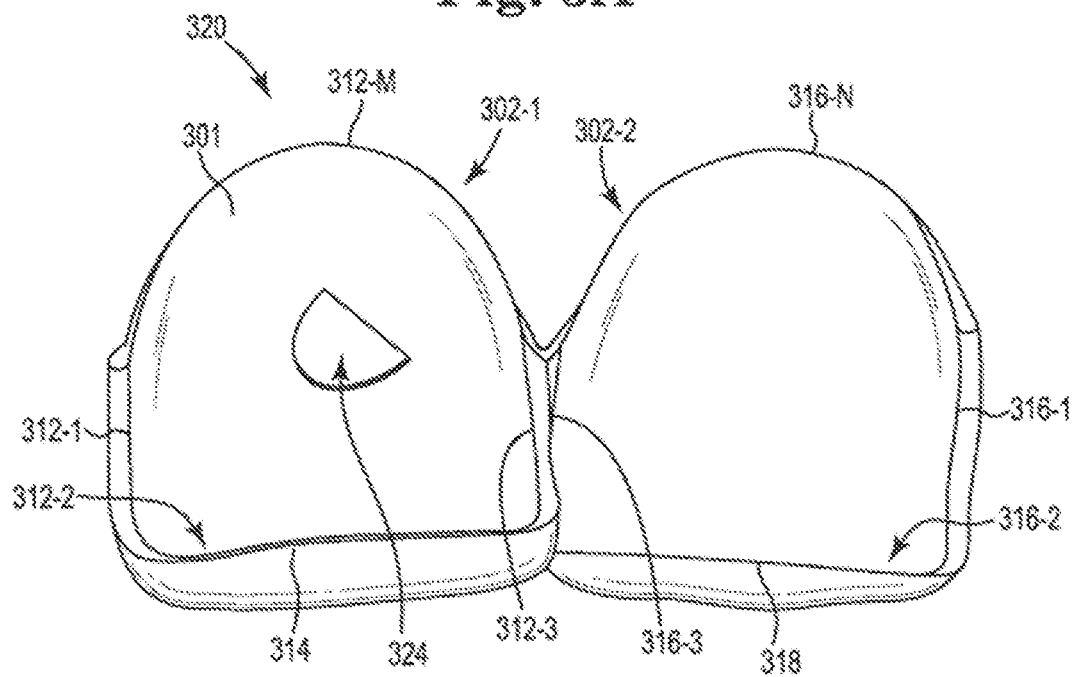
FIG. 3B illustrates a back view of the dental attachment placement structure of FIG. 3A.

FIGS. 3A and 3B illustrate another apparatus embodiment that can be used in the placement of an attachment on the surface of a tooth. FIG. 3A illustrates a front view of a dental attachment placement structure for etching a tooth according to a number of embodiments of the present disclosure. FIG. 3B illustrates a back view of the dental attachment placement structure of FIG. 3A.

In some instances, it may be beneficial to prepare the surface of the tooth for adhering of a dental attachment thereto. It is ideal if the preparation of the surface of the tooth takes place only at the area in which the attachment is to be attached.

Such preparation can include etching of the surface of the tooth which improves the adhesion between the tooth surface and the attachment or adhesive material used to adhere the attachment to the tooth. In embodiments such as that illustrated in FIGS. 3A, 3B, and 4, the dental attachment placement structure can be utilized as an etch mask that allows the etching to occur in the area to which the attachment is to be placed without etching other surfaces not at the attachment area.

Similar to the apparatus of FIG. 1A, in the embodiment of FIG. 3A, the apparatus 320 includes a body 301 having at least one surface shaped to conform to one or more of the contours of an exterior surface of a tooth. The body has multiple surfaces, 302-1 and 302-2, each shaped to conform to the multiple contours of an exterior surface of a tooth, and other surfaces will be discussed in more detail in FIG. 3B.

In the embodiment of FIG. 3A, the body 301 includes an aperture 324 formed in portion 302-1. The aperture 324 has a specific shape 322 that, when the apparatus 320 is placed correctly on the tooth, will allow the attachment area (i.e., the area at which the attachment will be attached) to be etched without etching other areas of the tooth. The structure illustrated in FIG. 3A, allows the treatment professional to place the apparatus 320 onto the teeth of a patient to provide a mask for purposes of etching in a more accurate position and orientation for placement of an attachment (e.g., the shape of aperture 324 would be appropriate for an attachment such as that illustrated in FIG. 1C (106)), with respect to the tooth surface, than previous techniques.

Similar to FIG. 1B, the embodiment illustrated in FIG. 3B includes multiple surfaces that can be used to assist in the alignment of the etch mask with respect to the intended surface of the tooth to which the attachment is to be secured. For example, one or more of surfaces: 312-1, 312-2, 312-3, 312-M, 314, 316-1, 316-2, 316-3, 316-N, 318, and/or inner surfaces of portions 302-1 and/or 302-2 can be utilized in various embodiments of the present disclosure.

In such an embodiment, the surface of the tooth can be etched with an etching material that can, for example be brushed onto the surface of the tooth by the treatment professional through the aperture 324. In the embodiment of FIGS. 3A and 3B, the shape 322 of the aperture 324 is sized and shaped to be as large or slightly larger or smaller than the attachment that is to be placed on the tooth. However, in some embodiments, the size and/or shape of the aperture may be different than the surface of the attachment that is to be placed in the tooth.

When shaped like the surface of the attachment that is to be placed in the tooth the treatment professional can align the shape of the attachment with the shape of the etched area such that the attachment is at the correct location and in the correct orientation with respect to the surface of the tooth. Although a particular attachment shape and aperture shape are illustrated, any suitable attachment shape and corresponding aperture shape can be utilized in the embodiments of the present disclosure.

The present example also includes a portion of the body (e.g., surfaces 212-1, 212-2, 212-3, 212-M, and/or the inner surface of 202-1) having a contour that is shaped to correspond with a contour of an alignment surface of a tooth (e.g., front surface, back surface, side surface, edge surface, etc.) and when the contour of the body and the corresponding contour is aligned, the etching area is located at the particular position.

In another example embodiment, a dental attachment placement apparatus includes a body that has an attachment mounting structure. The body also includes a surface (e.g., surfaces 212-1, 212-2, 212-3, 212-M, and/or the inner surface of 202-1) having a contour that is shaped to correspond with a contour of an alignment surface (e.g., front surface, back surface, side surface, edge surface, etc.) of a tooth and when the contour of the body and the corresponding contour of the tooth are aligned, a dental attachment, when placed in the attachment mounting structure, is located at the particular position with respect to an exterior surface of the tooth.

In some embodiments, the body includes at least a second surface (e.g., inner surface of 102-2) shaped to correspond with a contour of an alignment surface of a second tooth. Further, the body can include a second attachment mounting structure (e.g., as shown in FIGS. 3, 332-1 and 332-P) for attaching a second dental attachment to an exterior surface of the second tooth (e.g., 434-3).

Another example embodiment provides a dental attachment placement apparatus having a body that includes an attachment mounting structure having an aperture that allows an attachment to be placed through the body and onto an exterior surface of the tooth. The body also includes a surface having a contour that is shaped to correspond with a contour of an alignment surface of a tooth and when the contour of the body and the corresponding contour of the tooth are aligned, a dental attachment, when placed in the aperture, is located at the particular position with respect to an exterior surface of the tooth.

As illustrated in FIGS. 1B and 2B, in some embodiments, the body includes multiple surfaces having contours that are shaped to correspond with contours of multiple alignment surfaces of a tooth. In some such embodiments, when the contours of the body and the corresponding contours of the tooth are aligned, they frictionally hold the apparatus in place against the tooth during securement of the attachment. For example, the inner surface of 102-1 and inner surface 114 can engage the corresponding surfaces of the tooth to hold the apparatus in place while the attachment is being placed and/or secured. This can be beneficial as it, for example, can allow the treatment professional to use both hands to address other tasks while the attachment is in position to be secured or is being secured.

Figure 3C:
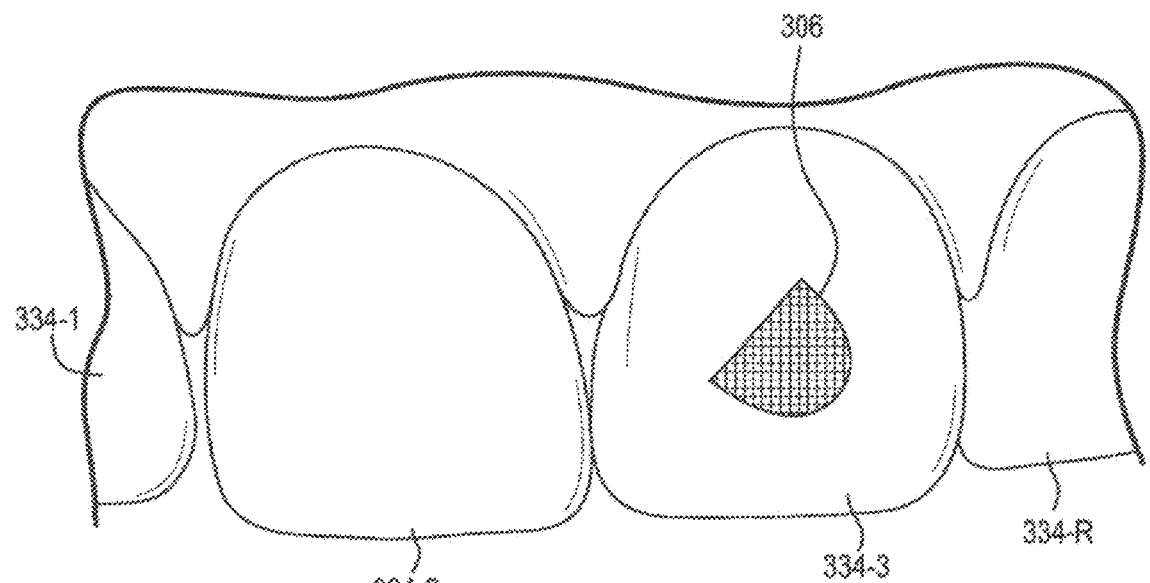
FIG. 3C illustrates a front view of an etched area of a tooth of a patient that has been etched utilizing the dental attachment placement structure of FIGS. 3A and 3B.

In some embodiments, the body can include multiple attachment mounting structures each having an aperture that allows an attachment to be placed through the body and onto an exterior surface of the tooth. For example, in the embodiment shown in FIG. 4, the apparatus 401 includes multiple attachment mounting structures each having apertures (e.g., 432-4 and 432-V) that allows an attachment (406-2 and 406-S) to be placed through the body and onto the exterior surface 436-T of tooth 434-R. FIG. 3C illustrates a front view of an etched area of a tooth of a patient that has been etched utilizing the dental attachment placement structure of FIGS. 3A and 3B. The resultant etched area 306 has been accomplished via the attachment mounting structure illustrated in FIGS. 3A and 3B.

In this manner, the surface of the tooth can be etched at an area that is large enough to secure an attachment, but not un-necessarily large. Also, in this manner, an attachment can be correctly positioned on the surface of tooth 334-3 and oriented such that it can provide the desired force to the teeth of the patient (e.g., 334-1, 334-2, 334-3, 334-R, and/or other teeth of the patient) when combined with the dental appliance that will attach to the attachment.

Figure 4:
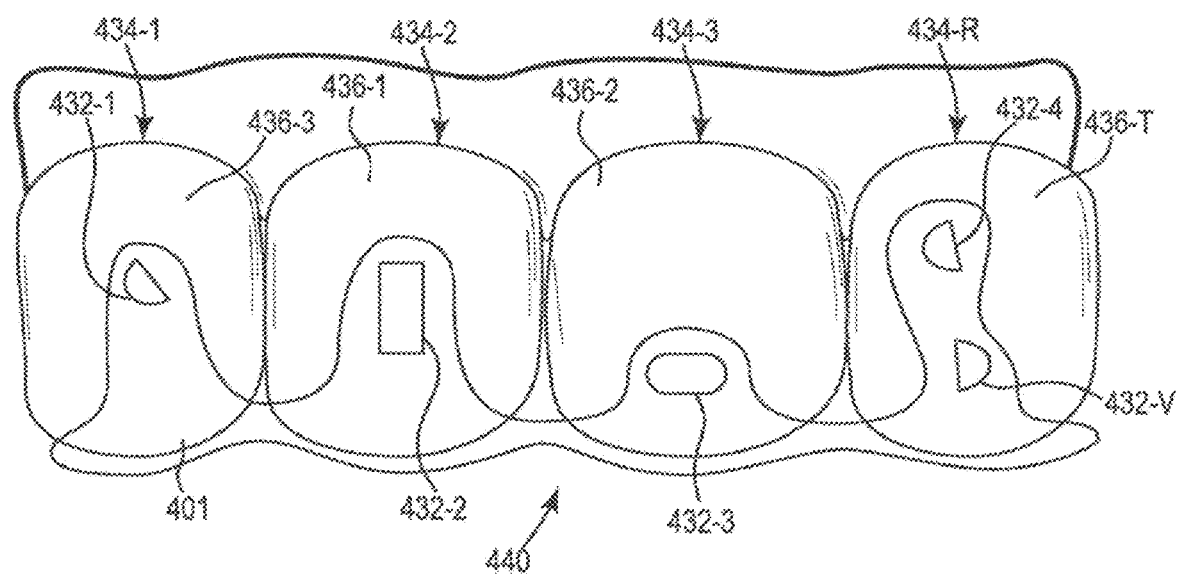
FIG. 4 illustrates a front view of a dental attachment placement structure having multiple attachment placement components provided on the structure according to a number of embodiments of the present disclosure.

FIG. 4 illustrates a front view of a dental attachment placement structure having multiple attachment placement components provided on the structure according to a number of embodiments of the present disclosure. In the embodiment of FIG. 4, the body 401 of apparatus 440 has an attachment mounting structure that includes multiple apertures 432-1, 432-2, 432-3, 432-4, and 432-V that can be used to etch portions of teeth 434-1, 434-2, 434-3, 434-R on surfaces 436-1, 436-2, 436-3, and 436-T.

In order to save fabrication time and materials cost, the apparatus may include multiple etch locations and only some may be used at any given time. In such applications, the apparatus 440 can, for example, be used to etch a location on a tooth at one point in time and can be reused to etch another location on a tooth at another point in time.

Similar to the embodiment of FIG. 2, another feature of the embodiment of FIG. 4, is that in order to save fabrication time and materials cost, an apparatus with less material can be used. In such embodiments, the apparatus can be designed such that a reduced amount or minimized amount of material is used in order to properly etch a surface of a tooth at a desired location.

Figure 5A:
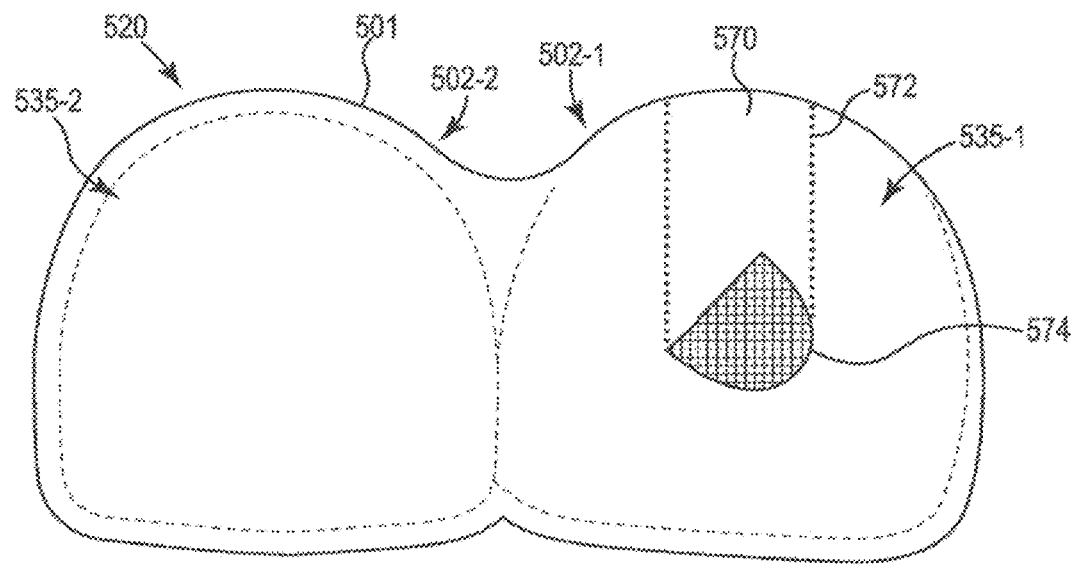
FIG. 5A illustrates a front view of another dental attachment placement structure for etching a tooth according to a number of embodiments of the present disclosure.

FIG. 5A illustrates a front view of another dental attachment placement structure for etching a tooth according to a number of embodiments of the present disclosure. The embodiment of FIG. 5A is similar to that of FIG. 3A.

In the embodiment of FIG. 5A, the apparatus 520 includes a body 501 having at least one surface shaped to conform to one or more of the contours of an exterior surface of a tooth. The body has multiple surfaces, 502-1 and 502-2, each shaped to conform to the multiple contours of an exterior surface of a tooth. Some embodiments may have one or more other surfaces similar to those shown in FIG. 3B to aid in the alignment of the dental attachment placement structure with the tooth. In the example of FIG. 5A, the surface 502-1 is positioned on tooth surface 535-1 and surface 502-2 is positioned on tooth surface 535-2.

In the embodiment illustrated in FIG. 5A, the dental attachment placement structure allows for the surface of the tooth to be etched through the aperture. The etched area is illustrated at 574. Adjacent to the aperture is a releasable portion 570.

The releasable portion can be released by any suitable release mechanism. For example, a series of perforations can be cut into the body 501 to allow the portion 570 to be torn away from the rest of the body 501. This can allow the dental attachment placement structure to also be used as a guide for the placement of an attachment to be placed in the correct position.

For example, once the area is etched as shown in FIG. 5A, an attachment can be secured to the etched area. If an attachment has a surface that is shaped to correspond to the shape of the aperture, then the edges of the aperture can be used as a guide to the correct positioning of the attachment. Once secured, the releasable portion 570 can be removed and the rest of the body 501 can be removed from the teeth while the attachment remains attached to the tooth surface 535-1.

Figure 5B:
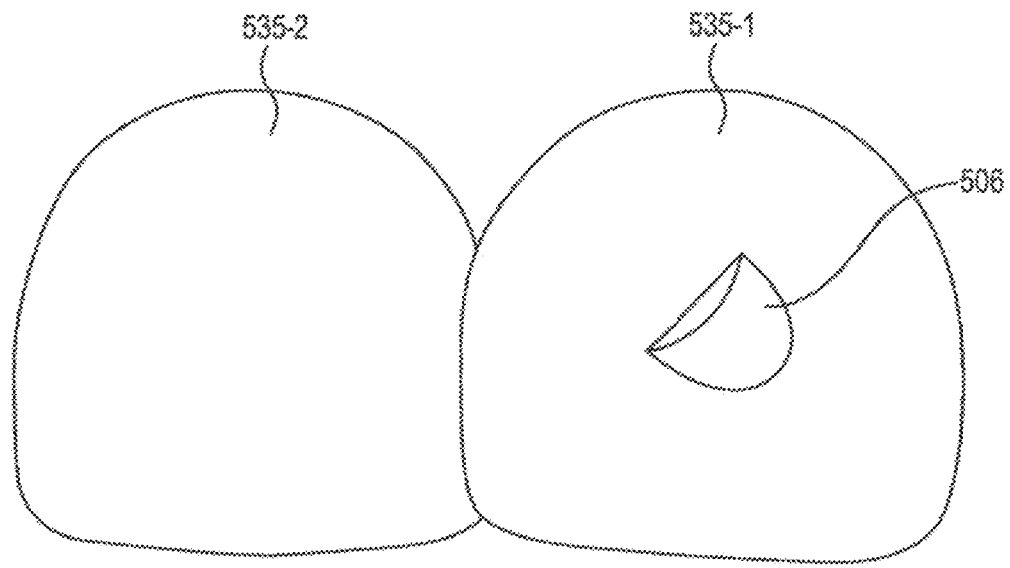
FIG. 5B illustrates front view of a dental attachment attached to a tooth of a patient utilizing the dental attachment placement structure of FIG. 5A.

FIG. 5B illustrates front view of a dental attachment attached to a tooth of a patient utilizing the dental attachment placement structure of FIG. 5A. This figure includes a tooth surface 535-1 of a first tooth and a tooth surface of a second tooth 535-2, and an attachment 506 mounted on the surface 535-1.

As can be seen from this figure, the attachment 506 is positioned and oriented on the surface of the tooth 535-1 in the same position and orientation as the etched area 574, thereby allowing better adhesion of the attachment 506 to the surface of the tooth 535-1. This is because the attachment was placed in the aperture of body 501 while it was positioned on tooth surfaces 535-1 and 535-2, then removed after the attachment 506 was adhered to etched area 574.

Figure 6A:
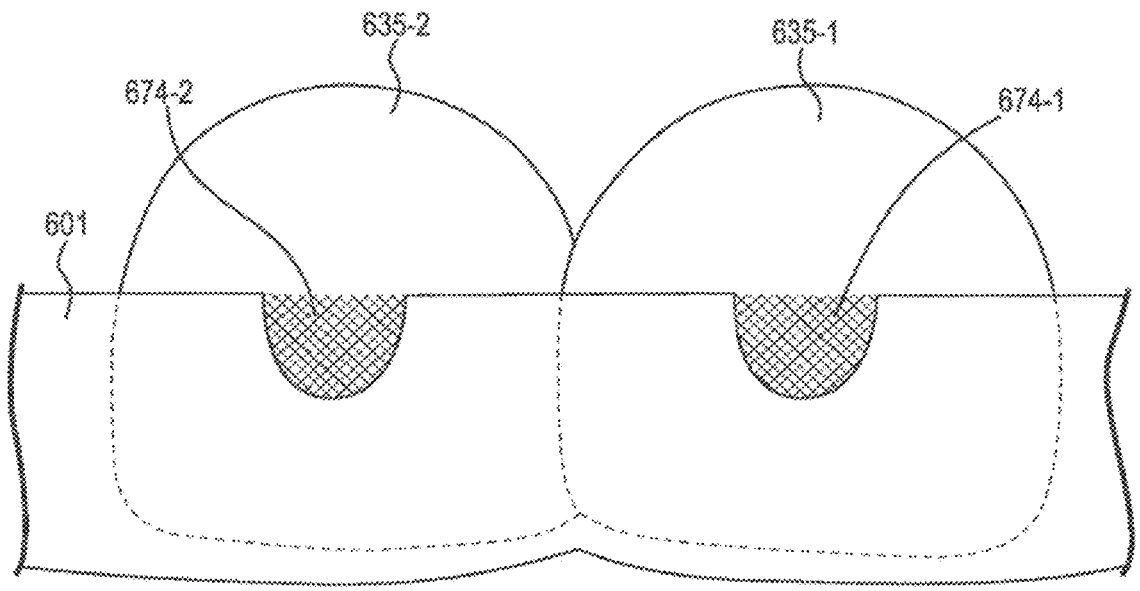
FIG. 6A illustrates a front view of another dental attachment placement structure for etching a tooth according to a number of embodiments of the present disclosure.

FIG. 6A illustrates a front view of another dental attachment placement structure for etching a tooth according to a number of embodiments of the present disclosure. FIG. 6A illustrates an embodiment wherein the body 601 of the dental attachment placement structure has apertures that do not fully surround the area to be etched. In such embodiments, the body can be used as a guide for what area is to be etched (e.g., areas 674-1 and 674-2), and as a guide to placement of one or more attachments (e.g., 606-1 and 606-2), but also allows for removal of the body 601, once the attachment has been secured to the surface of the tooth (e.g., 635-1 and/or 635-2).

Figure 6B:
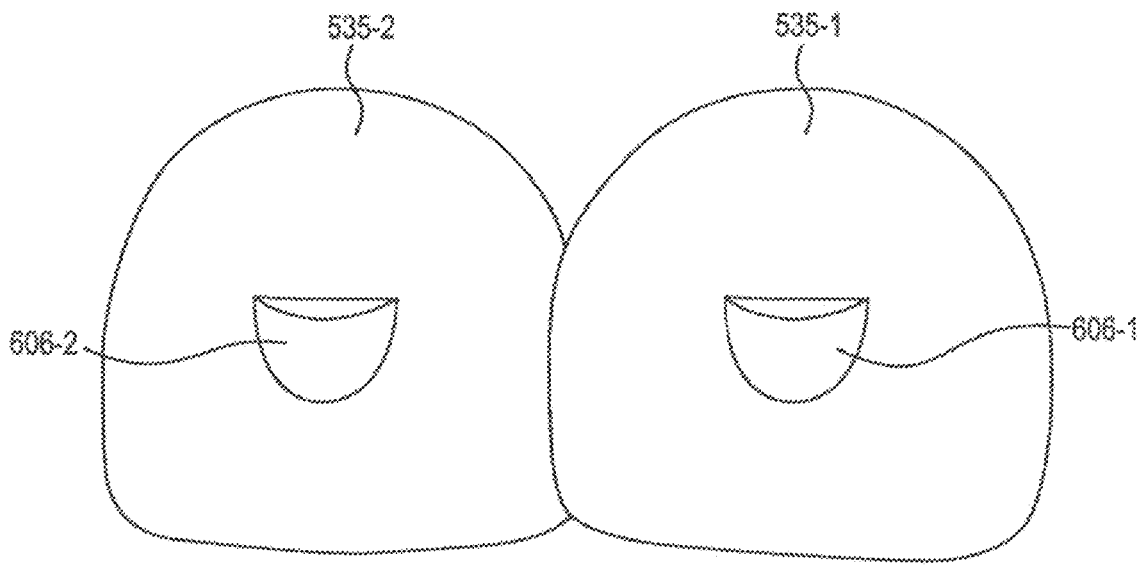
FIG. 6B illustrates front view of multiple dental attachments attached to multiple teeth of a patient utilizing the dental attachment placement structure of FIG. 6A.

For instance, FIG. 6B illustrates front view of multiple dental attachments attached to multiple teeth of a patient utilizing the dental attachment placement structure of FIG. 6A. This figure includes a tooth surface 635-1 of a first tooth and a tooth surface of a second tooth 635-2, and attachments 606-1 and 606-2 mounted on the surfaces 635-1 and 635-2, respectively.

As can be seen from FIG. 6B, the attachments 606-1 and 606-2 are positioned and oriented on the surface of the teeth 635-1 and 635-2 in the same position and orientation as the etched areas 674-1 and 674-2, thereby allowing better adhesion of the attachments 606-1 and 606-2 to the surface of the teeth 635-1 and 635-2. This is because the attachment was placed in the apertures of body 601 while it was positioned on tooth surfaces 635-1 and 635-2, then removed after the attachments 606-1 and 606-2 were adhered to etched areas 674-1 and 674-2.

Figure 7A:
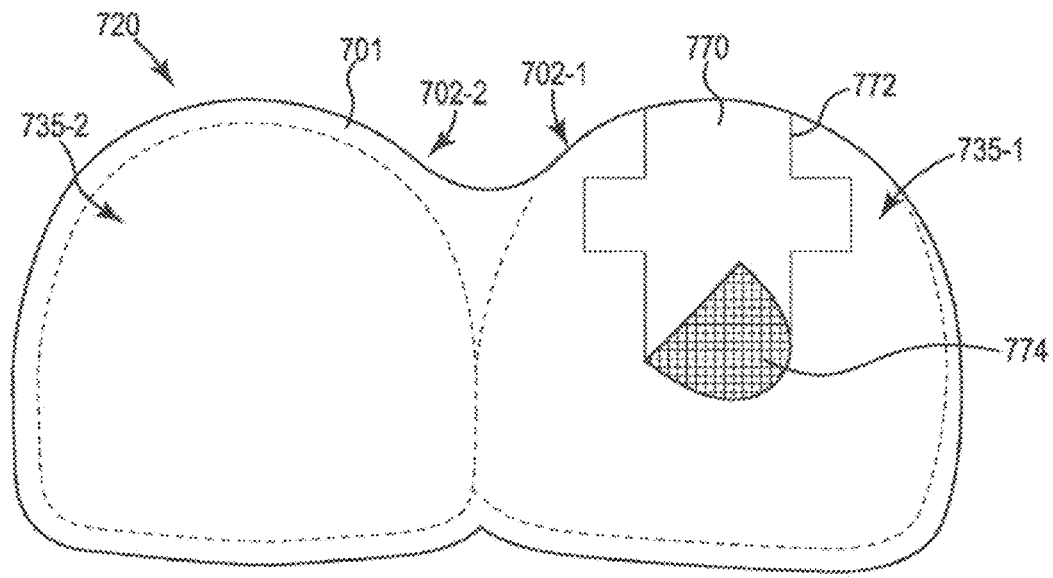
FIG. 7A illustrates a front view of another dental attachment placement structure for etching a tooth according to a number of embodiments of the present disclosure.

FIG. 7A illustrates a front view of another dental attachment placement structure for etching a tooth according to a number of embodiments of the present disclosure. The embodiment of FIG. 7A is similar to that of FIG. 5A.

In the embodiment of FIG. 7A, the apparatus 720 includes a body 701 having at least one surface shaped to conform to one or more of the contours of an exterior surface of a tooth. The body has multiple surfaces, 702-1 and 702-2, each shaped to conform to the multiple contours of an exterior surface of a tooth.

As with other embodiments discussed herein, some embodiments may have one or more other surfaces similar to those shown in FIG. 3B to aid in the alignment of the dental attachment placement structure with the tooth. In the example of FIG. 7A, the surface 702-1 is positioned on tooth surface 735-1 and surface 702-2 is positioned on tooth surface 735-2 to aid in positioning and/or orientation of the dental attachment placement structure with respect to the tooth to which an attachment is to be attached and thereby the positioning and/or orientation of the attachment to the tooth.

In the embodiment illustrated in FIG. 7A, the dental attachment placement structure allows for the surface of the tooth to be etched through the aperture. The etched area is illustrated at 774. Adjacent to the aperture is a removable portion 770.

The removable portion can be held in place by any suitable mechanism. For example, the removable portion can be shaped like a puzzle piece that mates with the rest of the body 701 in a particular orientation based on the removable portion 770 having an irregular shape. As used herein, an irregular shape is a shape that can only be positioned in one way with the rest of the body 501 such that the aperture has a desired shape for etching and/or positioning of an attachment therein. This can allow the dental attachment placement structure to be used for etching of the surface of a tooth and/or to be used as a guide for the placement of an attachment to be placed in the correct position.

For example, once the area is etched as shown in FIG. 7A, an attachment can be secured to the etched area. If an attachment has a surface that is shaped to correspond to the shape of the aperture, then the edges of the aperture can be used as a guide to the correct positioning of the attachment. Once secured, the removable portion 770 can be removed and the rest of the body 701 can be removed from the teeth while the attachment remains attached to the tooth surface 735-1.

In some embodiments, the edges of the removable portion and the edges on the body that correspond to the edges of the removable portion can be slanted such that when the removable portion is positioned into the rest of the body, it can be held in place. This can allow the treatment professional the ability to use their hands to do other things without having to hold the removable portion in place.

Also, in embodiments such as that shown in FIG. 7A, the apparatus can be positioned to accomplish etching (with the removable portion in place). The removable portion can be removed once the etch material and has been applied. Then, the removable portion can be repositioned with the rest of the body for securing of an attachment to the tooth. Once the attachment is secured to the tooth, the removable portion can be removed again to allow for removal of the apparatus for the patient's mouth without having to pull a portion of the apparatus over the attachment.

Figure 7B:
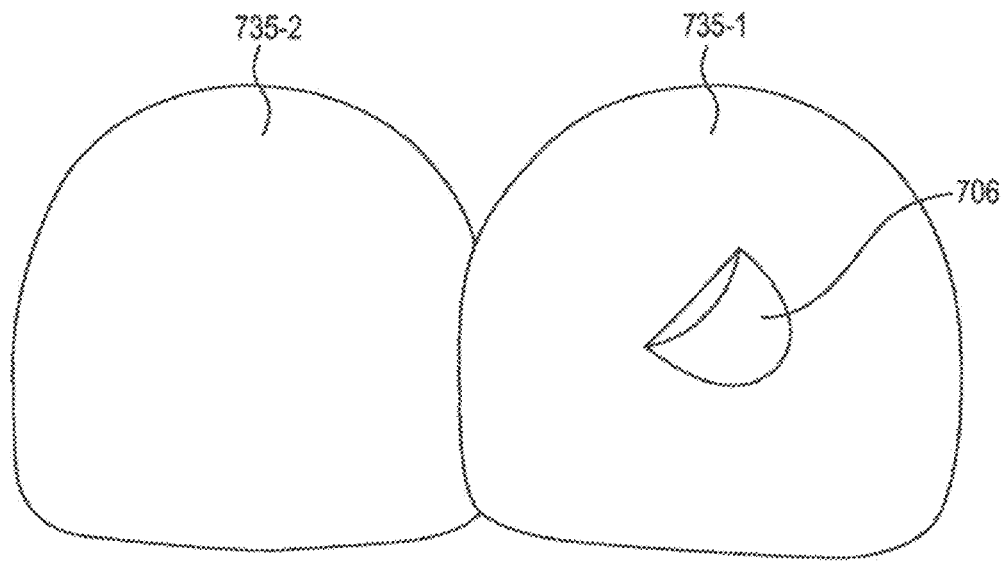
FIG. 7B illustrates front view of a dental attachment attached to a tooth of a patient utilizing the dental attachment placement structure of FIG. 7A.

FIG. 7B illustrates front view of a dental attachment attached to a tooth of a patient utilizing the dental attachment placement structure of FIG. 7A. This figure includes a tooth surface 735-1 of a first tooth and a tooth surface of a second tooth 735-2, and an attachment 706 mounted on the surface 735-1.

As illustrated in this figure, the attachment 706 is positioned and oriented on the surface of the tooth 735-1 in the same position and orientation as the etched area 774, thereby allowing better adhesion of the attachment 706 to the surface of the tooth 735-1. As with the embodiment of FIGS. 5A and 5B, this is because the attachment was placed in the aperture of body 701 while it was positioned on tooth surfaces 735-1 and 775-2, then removed after the attachment 706 was adhered to etched area 774.

FIGS. 8A-10C provide three embodiments that each include different support structures that make the connection between the body of the dental attachment placement structure and the attachment. These embodiments may each have benefits for some implementations and those differences and their benefits are discussed below.

As shown and described in the embodiments of FIGS. 8A-10C, the attachment is located within an aperture and the dental attachment placement structure includes at least one support connecting the attachment to the body. As can be seen from the embodiment of FIG. 8C, the attachment 806 can be connected to the one or more supports 808. The direct connection can be arched as shown to reduce or eliminate contact of the support to the surface of the tooth.

Such an arch may be beneficial, for example, because the treatment professional may not have to maneuver a detachment tool as close to the tooth as an embodiment where the support or the connection between the support and the attachment touch the tooth surface. In some such embodiments, the support can be connected to the attachment such that it can be released from the attachment.

For example, in some embodiments, the junction between the attachment and the support can include a feature to assist in the detachment of the attachment from the support. This feature can be located at or near the transition between the support material and the attachment material.

The feature can, for example, be a physical feature provided at the junction, such as one or more perforations, a portion that is thinner than the rest of the support and/or attachment, or a different material than the attachment and/or the support, among other attachment separation structures discussed herein. The feature can also be the use of a particular material at the junction that allows for a stimulant to be applied to that material that allows the attachment to be more easily removed. Such materials could, for example, make the material more brittle, thereby allowing it to be more easily broken, or cause the material to dissolve or disintegrate. Examples, of stimulants include wavelengths of light, such as UV, or chemical materials that cause the above affects based on interaction with the support material at the junction between the attachment and the one or more supports.

Once the attachment 806 is separated from the body 801, the attachment will remain on the tooth (e.g., attachment is affixed via adhesive to the surface of the tooth) during a portion or all of one or more treatment periods and the dental attachment placement structure body will be removed from the teeth of the patient. For example, this can be accomplished by lifting parts of the body over the attachment or by cutting/breaking the body into pieces and removing it in that manner.

The embodiment also includes a dental attachment placement structure, connected to a dental attachment to hold the attachment in a particular position. A portion of the body has a contour that is shaped to correspond with a contour of an alignment surface of a tooth such that when the contour of the body and the corresponding contour of the tooth are aligned, the aperture is located over the particular position on the surface of the tooth.

The attachment placement surface can include the portion of the body that is shaped to conform to corresponding contours of an alignment surface of the tooth. As stated herein, the alignment surface of the tooth is any shape on the surface of the tooth that can be used in connection with the attachment placement surface to more precisely position an attachment in the surface of the tooth. In this manner, when the contour of the body and the corresponding contour of the tooth are aligned, the aperture is located over the particular position in three dimensions on the surface of the tooth. For example, a ridge on the tooth can mate with a corresponding, but complementary surface of the attachment placement surface.

In some embodiments, a dental attachment placement structure, can include a body that includes a dental attachment placement structure, connected to a dental attachment to hold the attachment in a particular position, the body also can include a surface having a contour that is shaped to correspond with a contour of an alignment surface of a tooth. As used herein, an alignment surface of a tooth is any surface that when mirrored in the shape of a corresponding surface on the body can be used to properly locate the body with respect to the tooth. For example, when the contour of the body that mirrors the contour of the tooth and the corresponding contour of the tooth are aligned, a dental attachment, when placed in the attachment mounting structure, is located at the particular position with respect to an exterior surface of the tooth. Examples, of alignment surfaces on a tooth include: a ridge on a front surface of a tooth, a valley in a front surface, an edge of a tooth, a corner of a tooth, a contour of the gingival line of a tooth, a ridge or valley on a back surface of a tooth, among other such features that can be used to more precisely locate the dental attachment placement structure in relation to the tooth to aid in the correct placement of the attachment.

As discussed elsewhere in the specification the body can include at least a second surface shaped to correspond with a contour of an alignment surface of a second tooth. Such additional surfaces allow for greater accuracy in the placement of the attachment.

Figure 8A:
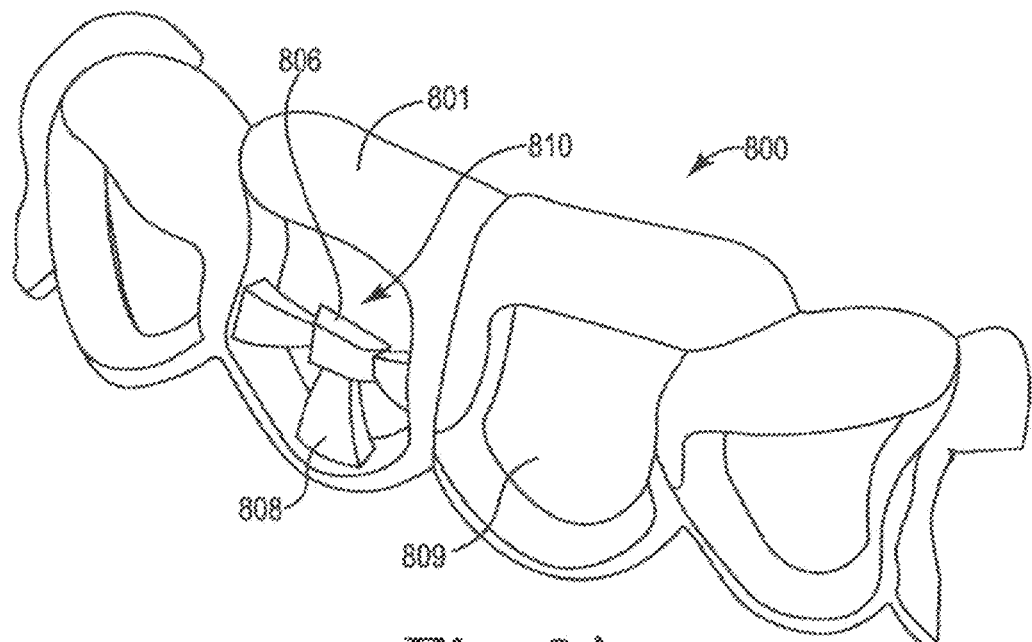
FIG. 8A illustrates an angled front view of a dental attachment placement structure having an attachment placement component provided on the structure according to a number of embodiments of the present disclosure.

FIG. 8A illustrates an angled front view of a dental attachment placement structure having an attachment placement component provided on the structure according to a number of embodiments of the present disclosure, conforming to the surface of the tooth. In the view of FIG. 8A, an attachment placement structure that conforms to the front surfaces of a tooth at a top of the tooth, sides of the tooth and bottom of the tooth (along the gingival line of the tooth). The illustrated structure is shown for a lower jaw, but such embodiments are not limited to use with the lower jaw. The attachment placement structure 800 of FIG. 8A includes a body 801 having several tooth shaped portions, at least one of those portions having an attachment 806 connected thereto by a number of supports 808, the supports separated by one or more apertures 810.

FIG. 8A shows the attachment 806 attached to the body 801 by three supports 808. One feature of the supports shown in FIG. 8A, is that they are arched along their direction of elongation. This feature can allow the surface of the supports that is closest to the tooth to be a distance that is further away from the tooth than the surface of the attachment that is closest to the tooth (the surface of the attachment that is to be attached to the tooth).

This can be beneficial for a number of reasons. For example, being farther away from the tooth reduces the potential for the support to be adhered to the tooth by stray adhesive that has leaked from between the tooth and the attachment during the securing process or that was sloppily applied during application of the adhesive to the surface of the attachment.

Additionally, the spaced nature of the arched support from the tooth may also allow separation of the attachment from the supports in a manner that reduces the potential for damage of the tooth during separation. For example, if the support is to be cut away from the attachment to form the separation, the tip of the cutting device may have space to pass between the support and the tooth during separation where there would be no space if the support were in contact with the tooth.

Further, as can be seen in the embodiment of FIG. 8A, the support can be tapered from a first thickness at its connection to the body 801 to a second, thinner thickness at its connection to the attachment 806. This can be beneficial in various ways. For example, the thinned connection at the attachment end of the support allows more space for a separation tool to be placed, while the thicker end allows a more stable and substantial support member during positioning and separation.

This can be beneficial in that when the structure is placed on the teeth of the patient, force may be applied to the supports and the thicker portion can resist the potential for the support to break during the placement of the structure. This could affect the positioning of the attachment or render the dental attachment placement structure ineffective to assist in placement of the attachment (e.g., the structure may not be able to hold the attachment in proper position for attachment at the correct location or orientation).

The tapering also makes separation of the attachment from the dental attachment placement structure body easier. For example, when a cutting tool is used to separate the attachment from the body, it must cut completely through the support to accomplish the separation.

A thinner support means that less cutting needs to be done. Furthermore, a tapered support may negate the need for a cutting tool and separation of the attachment from the support may only require the user to apply a compressive or tensile force on the thinner support end to initiate the break. Additionally, when the separation between the body and the attachment is accomplished, there may be a little of the support material still attached to the attachment (e.g., if the treatment professional did not cut exactly at the junction between the attachment and the support).

This may leave non-biocompatible material on the attachment and may make the attachment not fit with the dental appliance that is placed over the attachment (the attachment is a different shape in one or more dimensions than the cavity into which the attachment is to be placed). By using a thinner support end at the junction between the attachment and the support, the likelihood that extra support material is left on the attachment is reduced.

The illustration of the embodiment in FIG. 8A also shows that the body may not cover the entire front surfaces of the teeth adjacent to the tooth on which the attachment 806 is to be affixed. For example, an aperture 809 may be formed in the body over a portion that would cover a part of the adjacent tooth.

Having more or less material on the adjacent tooth surfaces provides several benefits and these can be weighed when designing various implementations. For example, having more material will increase the strength of the body which may be beneficial in some implementations, such as where the installation of the dental attachment placement structure may be difficult.

Having more material will increase the rigidity of the body which may be beneficial in some implementations, such as where accurate positioning is important. Further, having used less material for the body may be beneficial for reasons of reducing weight of the structure, reducing cost of manufacture as less materials and time may be used, and improving flexibility of the structure to aid in removal, among other benefits.

Figure 8B:
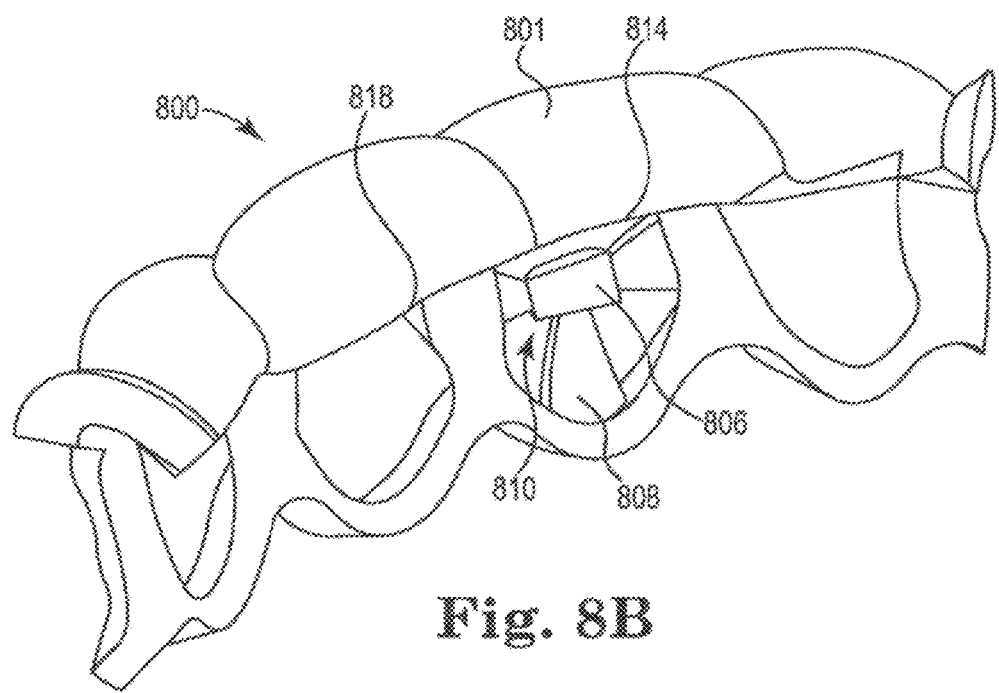
FIG. 8B illustrates an angled back view of the dental attachment placement structure of FIG. 8A.

FIG. 8B illustrates an angled back view of the dental attachment placement structure of FIG. 8A. In this view, the body 801 of the structure 800 has a number of tooth cavities for the placement of a tooth therein. In the example of FIG. 8B, four cavities are shown, however, embodiments are not limited to four teeth and more or less tooth cavities can be provided in various embodiments.

Each cavity is formed from a number of surfaces of the structure that are used to contact a corresponding surface of the tooth onto which the cavity is placed. As shown in FIG. 8A, those surfaces may represent complete surfaces of a tooth or parts of such surface (e.g., the aperture 809).

The apparatus includes a body 801 having a tooth-shaped surface that is shaped to conform to the front surface of a tooth and is to be placed against the front surface of the tooth. This tooth-shaped surface of the body can include an aperture (e.g., aperture 810) to allow placement of an attachment at a particular position on the tooth surface. It will be understood that, in some embodiments, the aperture may not be completely closed around its edge. Such designs should be considered to be within the embodiments of the present disclosure.

As shown in FIG. 8A, FIG. 8B also shows the apertures 810 that provide spaces between the supports 808. In the embodiment of FIG. 8B, the structure also includes a first back side portion 814 that conforms to the back side of the first tooth and a second back side portion 818 that conforms to the back side of the second tooth. As will be discussed with respect to FIG. 8C, a surface of the structure may also be used in conjunction with the biting surface of a tooth for improving the alignment of the attachment prior to affixing it to the tooth.

Also, it should be noted by the reader that the surface on which the line for element number 806 is positioned is the surface on the attachment that is to be attached to the tooth. It is on this surface that an adhesive material is to be placed (the adhesive is not shown). The adhesive can be applied to the entire surface or to a part thereof. The adhesive can be ultra-violet (UV) curable adhesive or any other suitable type of adhesive that can be used to affix the attachment to the tooth surface.

In some embodiments, the attachment can, for example, include an adhesive layer positioned to secure the attachment to an affixing surface of a tooth. In some embodiments, the adhesive is only located on the portion of the attachment that will contact the tooth. In this manner, it is unlikely that the adhesive will secure other parts of the apparatus to the tooth or create excess dried adhesive that may need to be removed from the tooth.

In some embodiments, the surface of the attachment that contacts the tooth may contain a recessed well or pocket in which an adhesive can be applied. This controls the location of where the adhesive is applied and avoids issues surrounding excess adhesive, for example, unwanted flash, unwanted adherence of the positioning structure supports to the tooth.

In some implementations, a release layer is provided over the adhesive. The release layer can be a thin film of plastic, wax paper, or other suitable covering that can be removable by the treatment professional when it is time for the attachment to be placed on the tooth of the patient. This can be beneficial, for example, to allow the adhesive to be applied at or shortly after fabrication of the apparatus, does not expose the adhesive to contaminants that may harden or make the adhesive less effective (e.g., dust).

The use of surfaces (e.g., 814, 818, and/or 812 of FIG. 8C) in conjunction with other surfaces can also allow for use of the corners of one or more teeth to be used to aid in positioning and/or orientation of an attachment. The use of corners can be beneficial in that they can be used to control the positioning of the attachment in more axes of movement than use of the edge surfaces of a tooth.

Figure 8C:
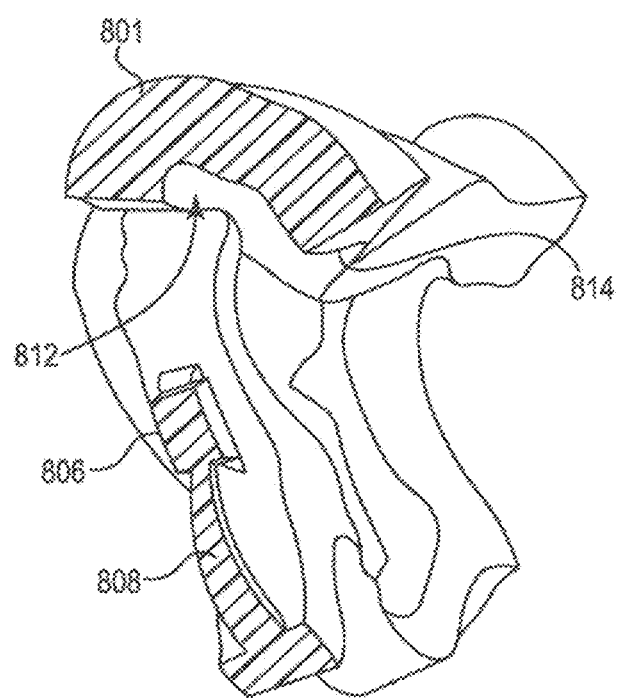
FIG. 8C illustrates a cutaway side view of the dental attachment placement structure of FIG. 8A.

FIG. 8C illustrates a cutaway side view of the dental attachment placement structure of FIG. 8A. FIG. 8C provides a view of the shape of the cavity described above as well and more detail regarding the supports 808 and attachment 806 and their connection.

As discussed above with respect to FIG. 8B, the cavity for placement of a tooth is formed from a number of surfaces of the body 801 of the structure. For example, the cavity, in the embodiment of FIG. 8A-8C is formed from the inside surface that conforms to the front side of the tooth (e.g., buccal side), a surface 812 that contacts and wraps around the tooth's incisal edge (top surface of the tooth in this embodiment, but may be bottom surface, if the structure is designed for the upper jaw), and surface 814 that conforms to the back side of the tooth (e.g., lingual side). In this manner, the three surfaces, when in contact with the tooth, can provide more precise locating of the attachment for placement on the tooth.

Figure 9A:
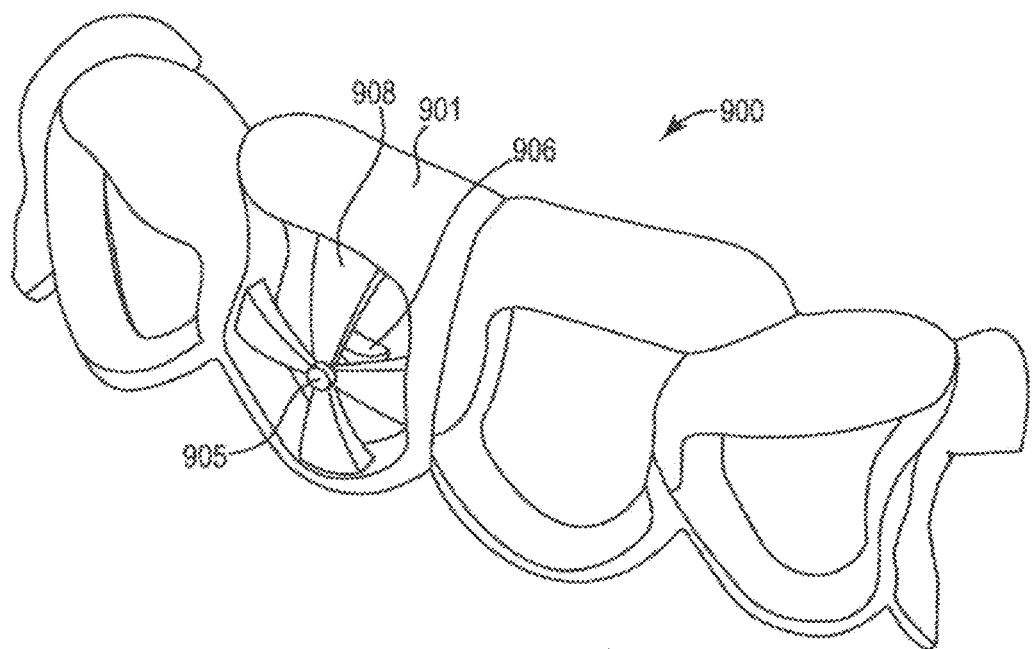
FIG. 9A illustrates an angled front view of a dental attachment placement structure having an attachment placement component provided on the structure according to a number of embodiments of the present disclosure.
Figure 9B:
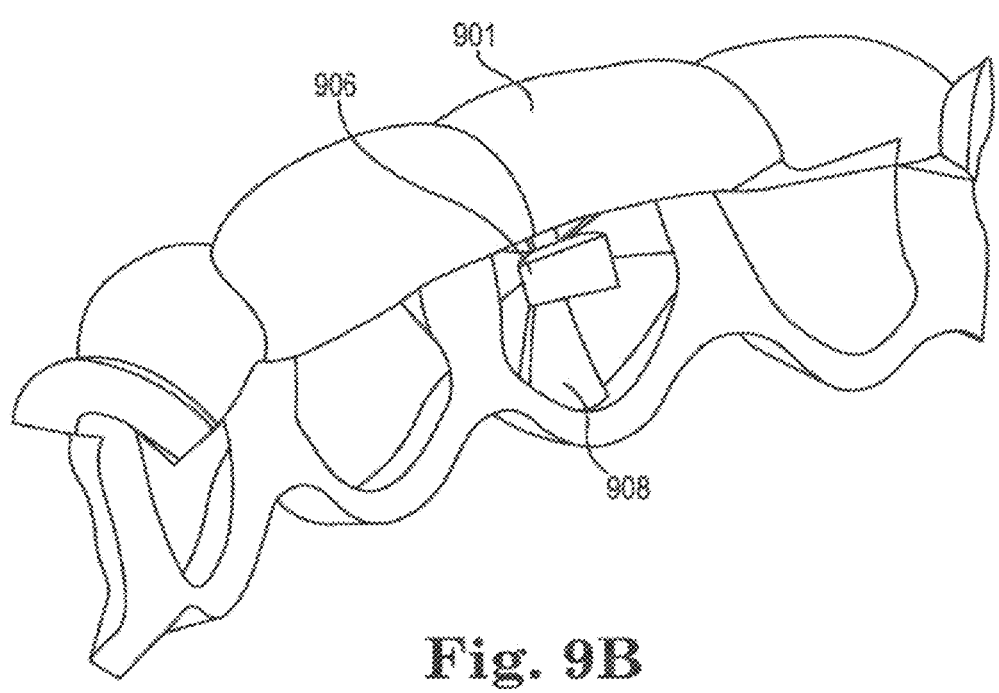
FIG. 9B illustrates an angled back view of the dental attachment placement structure of FIG. 9A.

FIG. 9A illustrates an angled front view of a dental attachment placement structure having an attachment placement component provided on the structure according to a number of embodiments of the present disclosure. FIG. 9B illustrates an angled back view of the dental attachment placement structure of FIG. 9A.

In FIGS. 9A and 9B, the structure 900 includes an attachment 906 that is connected by a single connection member 905 to four attachment supports 908 that are connected to the body 901. In this type of embodiment, the connection that is severed to detach the appliance from the rest of the dental attachment placement structure offers several benefits.

For example, the connection is a single connection allowing the detachment to be made with only one breaking of the connection with the attachment. Also, with a single connection, any residual material from the single connection member is located in one area of the attachment making removal of the extra material easier.

Figure 9C:
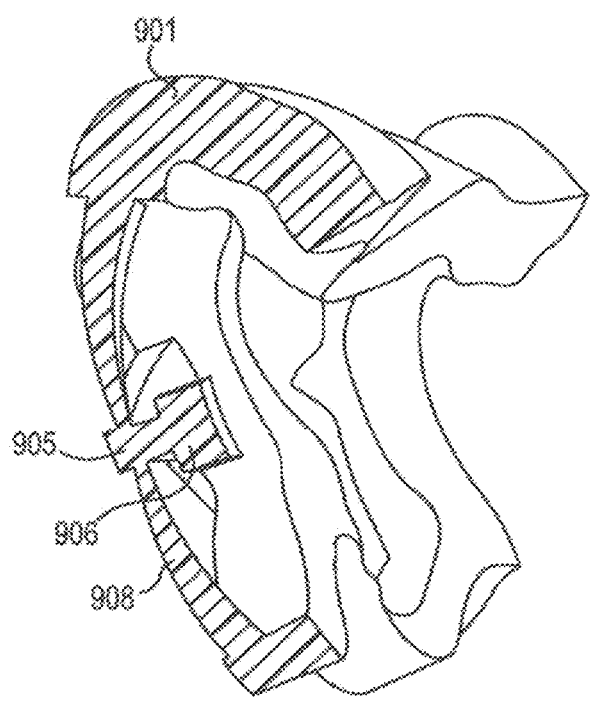
FIG. 9C illustrates a cutaway side view of the dental attachment placement structure of FIG. 9A.

Additionally, in the embodiment shown in FIGS. 9A-9C, the connection is at the top of the attachment which makes detachment and removal of any excess material easier as the connection area is away from the surface of the tooth and more easily accessible. In addition, only one surface of the attachment is affected by the presence of these supports, therefore preserving the integrity of all other attachment surfaces. This is important as these surfaces play a critical role in the orthodontic treatment and require a high degree of dimensional accuracy.

Any suitable number of supports can be utilized. For example, in FIGS. 9A-9C four supports 908 are used, but in other embodiments, for example, those shown in FIGS. 8-A-8C and 10A-10C, other numbers of supports are provided.

In some embodiments, the support functionality can be provided by a material that spans across at least part of the area covering the front surface of tooth. In such an embodiment, the attachment can be attached to the material or to one or more connection members such as the type shown at 905 in FIG. 9A.

In such embodiments, the material may, for example, be cut away to allow access to the connection between the connection member and the attachment in order to detach the attachment. In some embodiments, a stimulant that can be applied as discussed above. In such embodiments, the stimulant can be used, for example, to make the material (or a portion thereof) and/or connection member brittle or dissolve the material and/or connection to detach the attachment therefrom.

FIG. 9C illustrates a cutaway side view of the dental attachment placement structure of FIG. 9A. FIG. 9C, provides a better view of the single connection member 905 that connects the attachment 906 to the supports 908. As shown in FIGS. 9A-9C, in some embodiments, there is a single connection area between the attachment and the attachment placement structure. As stated herein, this, for example, allows the attachment to be separated from the rest of the apparatus more easily and/or with less potential for damage to the tooth or attachment during the separation process.

Figure 10A:
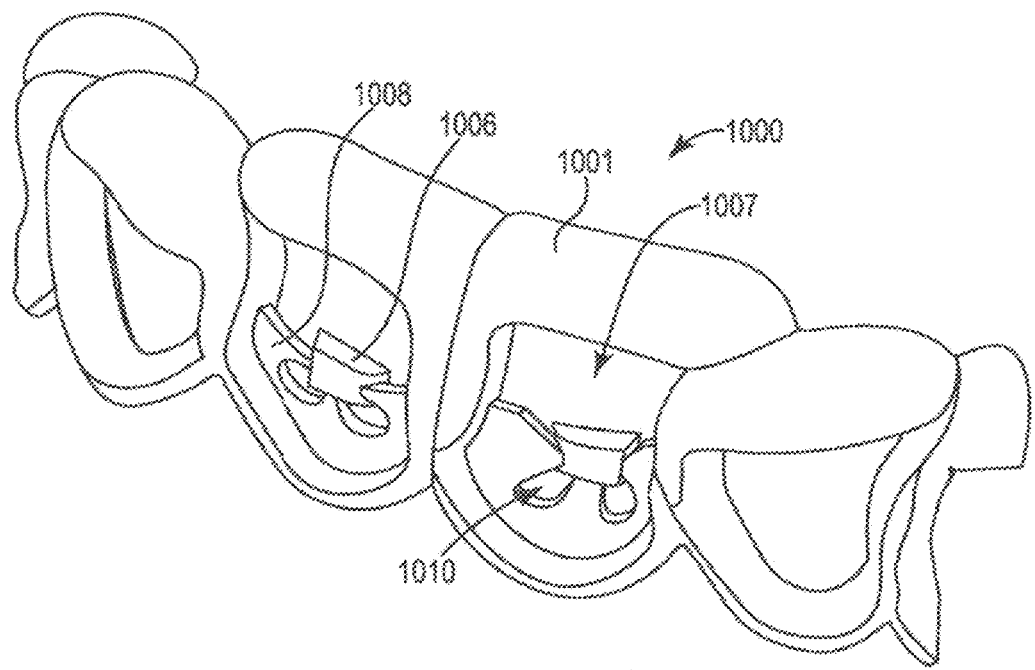
FIG. 10A illustrates an angled front view of a dental attachment placement structure having an attachment placement component provided on the structure according to a number of embodiments of the present disclosure.
Figure 10B:
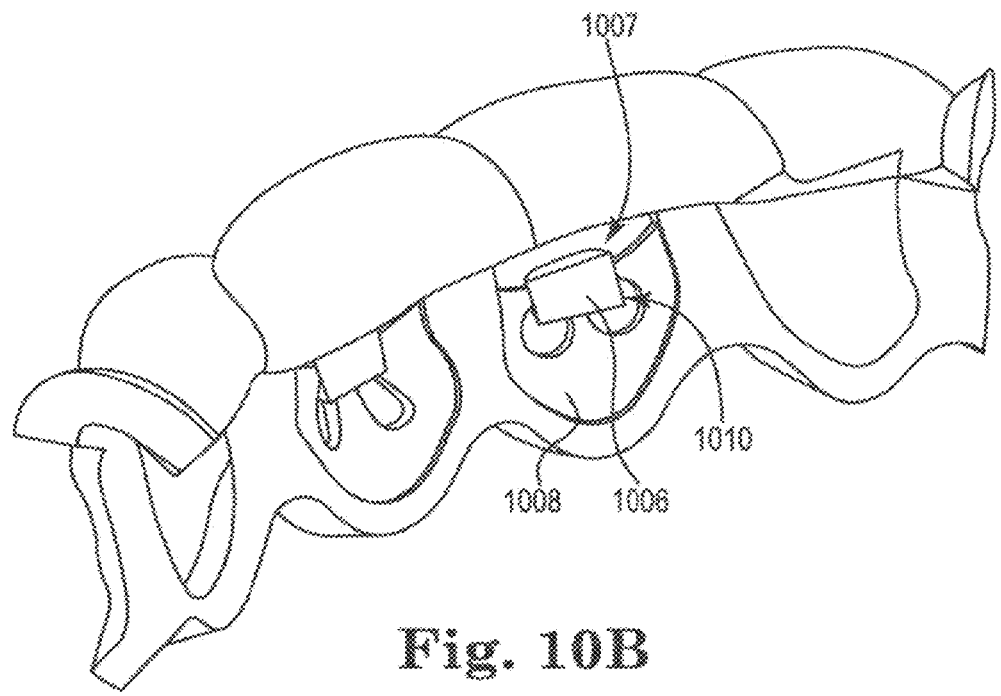
FIG. 10B illustrates an angled back view of the dental attachment placement structure of FIG. 10A.

FIG. 10A illustrates an angled front view of a dental attachment placement structure having an attachment placement component provided on the structure according to a number of embodiments of the present disclosure. FIG. 10B illustrates an angled back view of the dental attachment placement structure of FIG. 10A.

As shown in the embodiment illustrated in FIGS. 10A and 10B, at least one of the attachment mounting structures can have a support connected between the body and a dental attachment. In this manner the supports can be cut instead of a solid layer of material thereby making it easier to release the attachment from the rest of the apparatus.

For instance, in FIGS. 10A and 10B, the supports, that connect the attachment 1006 to the body 1001 of the structure 1000, can be formed individually or can be formed as a sheet of material and then apertures, such as apertures 1010 can be formed in the sheet of material. This sheet of material can be formed with the body 1001 or can be attached to the body after fabrication. The support structure can be fabricated as shown in FIGS. 10A and 10B or can be fabricated to fill the entire inside area of inside shape of the tooth of the body 1001 and then a part of the support can be removed to form aperture 1007.

The body can also include an additional attachment mounting structure (e.g., a second attachment mounting structure) for attaching one or more dental attachments to an exterior surface of another tooth. This allows elements of the patient's mouth to be used to further corroborate the position of the appliance. This is, for example, because the surfaces and edges of the apparatus, when they contact the mouth of the patient at surfaces and edges of the tooth or teeth may contact those surface and/or edges of the apparatus.

For example, as shown in FIGS. 10A and 10B, more than one attachment can be provided on the structure for attachment to a user's teeth. In such embodiments, the supports can be the same type of configuration, as shown with respect to supports 1008 in FIG. 10A, or can be different types of configurations (e.g., a support type from 8A-8C could be utilized, and/or from another embodiment shown herein).

Figure 10C:
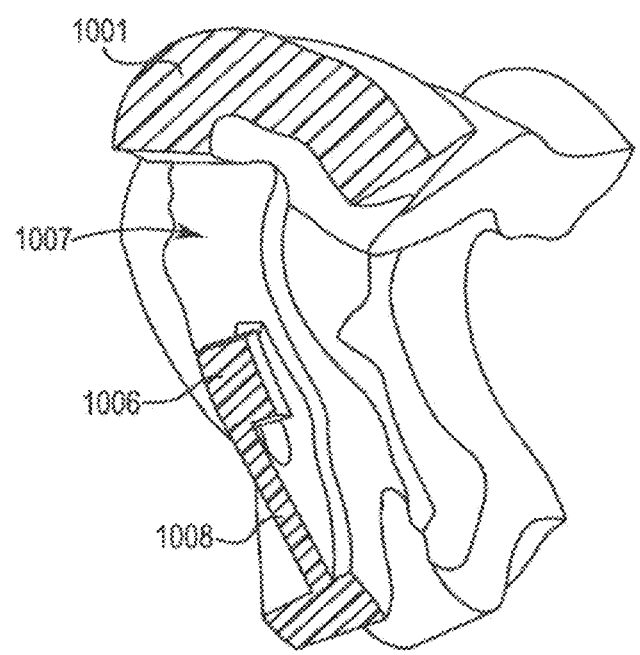
FIG. 10C illustrates a cutaway side view of the dental attachment placement structure of FIG. 10A.

In some embodiments, having more support material (e.g., the support structure of FIGS. 10A-10C compared to the thinner supports of FIGS. 8A-8C) may provide benefits in certain implementations. For example, a more stable structure may provide for better positioning of the attachment, due to its rigidity or other characteristics.

FIG. 10C illustrates a cutaway side view of the dental attachment placement structure of FIG. 10A. FIG. 10C better shows the arrangement of the support structure 1008 and the aperture 1007 formed with respect to the attachment 1006 and body 1001. In this embodiment, the support structure is not arched, which may be easier to manufacture, among other benefits, and its connections to the attachment 1006 are away from the surface that will contact the tooth of the patient. As stated elsewhere, this may be beneficial in allowing for easier detachment of the attachment 1006 from the support structure 1008 and less potential for damaging the tooth during the detachment process, among other benefits.

In one method of forming a structure as discussed in embodiments disclosed herein, the method includes forming an attachment out of an attachment material and a dental attachment placement structure body, connected to the attachment to hold the attachment in a particular position wherein there is a single connection area between the attachment and the attachment placement structure. In some embodiments, the dental attachment placement structure can be printed using the three-dimensional printing apparatus.

Another strategy method can include printing the dental attachment placement structure out of a second material that is different than the attachment material. Such embodiments can be beneficial in several ways. For example, the body can be made from a material that is easier to break, thereby making the separation occur on the body rather than on the attachment (which could deform the attachment in a manner that would make it unusable). The body material could also be made from a less expensive material or a non-biocompatible material (it could be compatible for the short time it is in the mouth of the patient, but may not be biocompatible over the course of a longer period, such as the treatment period).

In some embodiments, printing the attachment and dental attachment placement structure is done such that they are connected to each other at least one point when printed. For instance, the attachment is connected by three points in FIGS. 8A-8C, one point in FIGS. 9A-9C, and three points in FIGS. 10A-10C.

In another method of forming a dental attachment placement structure, the method includes receiving dental data of a patient's teeth to form a virtual dental model of a patient's dentition. From this dental data, a treatment plan for moving one or more of a patient's teeth, that includes the use of at least one attachment that is affixed to a tooth of the patient, can be created.

In this treatment planning process, the process further includes, locating a position and orientation of an attachment on the surface of a tooth of the patient. Then, a dental attachment placement structure can be designed, including a body, a number of supports, and an attachment connected to the number of supports, wherein the shape of the body is based on the virtual dental model.

In various embodiments, the attachment can be printed to include one surface of the attachment with a contour that will mate with a corresponding contour of an exterior surface of a tooth. In this manner, the attachment can be fitted closely to the surface of the tooth which may increase its ability to be secured to the surface of the tooth. In such implementations, more force may be applied to the attachment without it coming loose from the surface of the tooth, among other benefits.

Some embodiments can provide printing one surface of the dental attachment placement structure with a contour that will mate with a corresponding contour of an exterior surface of a tooth. Such embodiments may be able to more accurately place the attachment on the tooth surface due to the mating nature of the surface of the structure and the tooth surface, among other benefits.

As shown in FIG. 8C, for example, in some embodiments, the dental attachment placement structure includes printing multiple surfaces of the dental attachment placement structure having contours that will mate with corresponding contours of exterior surfaces of one or more teeth. As stated elsewhere herein, the more surfaces that can be used to align the placement structure with respect to the tooth on which the attachment is to be applied, the more accurate the placement of the attachment should be.

As can be appreciated by the discussion of the different embodiments described herein, in can be noted that each of these types of attachment mounting structures can provide an accurate mechanism for positioning and orienting the attachment with respect to the surface of the tooth to which the attachment is to be secured, but one type may have benefits over another in some applications based on one or more characteristics (e.g., whether etching is desired, space available for placement of the attachment, number of attachments to be placed on a single tooth, type of securement that will be used, etc.).

As discussed herein, the dental attachments are structures that are specifically shaped to provide particular forces to move one or more teeth of a patient. They can be used to move a tooth directly (e.g., to move a tooth to which they are attached) or indirectly (e.g., to act as an anchor and to direct force elsewhere to move a tooth toward another location in a patient's mouth). As described herein, the attachment can be used to apply a force to one or more teeth when used in conjunction with, for example, a cavity formed in an aligner. The cavity can be shaped to have at least one surface that contacts a surface of the attachment, with the aligner providing the force to the attachment, which is then used to move the one or more teeth. In order to impart a force accurately, the attachment should be placed at a precise position on a surface of a tooth and in a particular orientation to the tooth, such that when the aligner is placed over the teeth, the specialized cavity having the surface therein will contact the desired surface of the attachment in a manner that will accurately impart the desired force at the desired force vector.

In some cases, the attachment is configured to be used in conjunction with an alignment device instead of, or in addition to, an aligner. For example, the attachment may be adapted to engage with an elastic band or brace to provide more leverage and more force on the teeth. In a specific example, the attachment includes a hook or groove that an elastic band can hook around. Such attachment features are sometimes referred to as power arms or buttons. The elastic band can hook around two of the attachments to apply a pulling force that applies a force pulling the two attachments together. Accurate positioning and orientation of such attachment features on the tooth surfaces can be important in order to apply the forces in a desired direction.

The accurate positioning of an attachment is referred to herein as registration, which describes a condition of correct alignment or proper relative position and orientation with respect to a surface of a tooth. This term can be used to describe the proper positioning of an attachment, but can also be used to describe the proper fit between an attachment placement structure and a surface or edge of a tooth used to assure proper positioning and orientation of the attachment placement structure. As described herein, this can involve the use of a contoured surface on the attachment placement structure having unique undulations or grooves that match the unique undulations or grooves on the surface of a particular tooth of a patient, wherein registration refers to the alignment of the undulations or grooves of the surface of the attachment placement structure with those of the tooth surface and when aligned, and which indicates that the attachment placement structure is in the correct position and orientation for placement of the one or more attachments.

This contoured surface can be formed based on a computer model (e.g., 3D or 2D) of at least a portion of a patient's dentition. In some cases, the more features (e.g., undulations, grooves, surfaces of a tooth, edges of a tooth, number of surfaces or edges of other teeth), the more accurate the positioning and orientation of the attachment can be.

In some embodiments, the attachment placement structure is formed with the one or more attachments attached thereto. Such technologies can be particularly useful in some such embodiments as the two can be fabricated during the same process. For example, the attachment placement structure and attachments can be formed together using one or more of an additive manufacturing (3D printing) process, a subtractive manufacturing process (e.g., machining, cutting, milling, drilling, or etching), and a molding process.

In some embodiments, the body of the attachment placement structure can be in the form of a frame with the one or more attachments extending from the frame. In addition to the attachment(s), the frame can support other features for placing and aligning the attachment placement device on a dental arch. For example, one or more registration anchors used to register the position of the attachment(s) can also extend from the frame. In some embodiments, one or more retention supports used to support the position of the attachment placement device extend off the frame.

An advantage of a such a frame structure is that the attachment placement device can be made of a minimal amount of material and may be more easily fabricated. In some cases, the attachment placement device can be 3D printed without the use of supports used in conventional 3D printing processes. This can eliminate the need to remove such supports after the printing process, thereby decreasing the time and cost of manufacture. Thus, a portion of the attachment placement device may have a surface having a shape corresponding to a build plate used during a 3D printing process. In some cases, this surface is (e.g., substantially) flat. The frame structure may also allow for easier access to the parts of the dental arch during placement of the attachment as the frame may take up less space around the teeth compared to an attachment placement structure that covers and occludes more of the dental arch. Thus, the treatment professional can access portions of the teeth and/or gums that would not be accessible using a higher coverage placement apparatus.

Figure 12A:
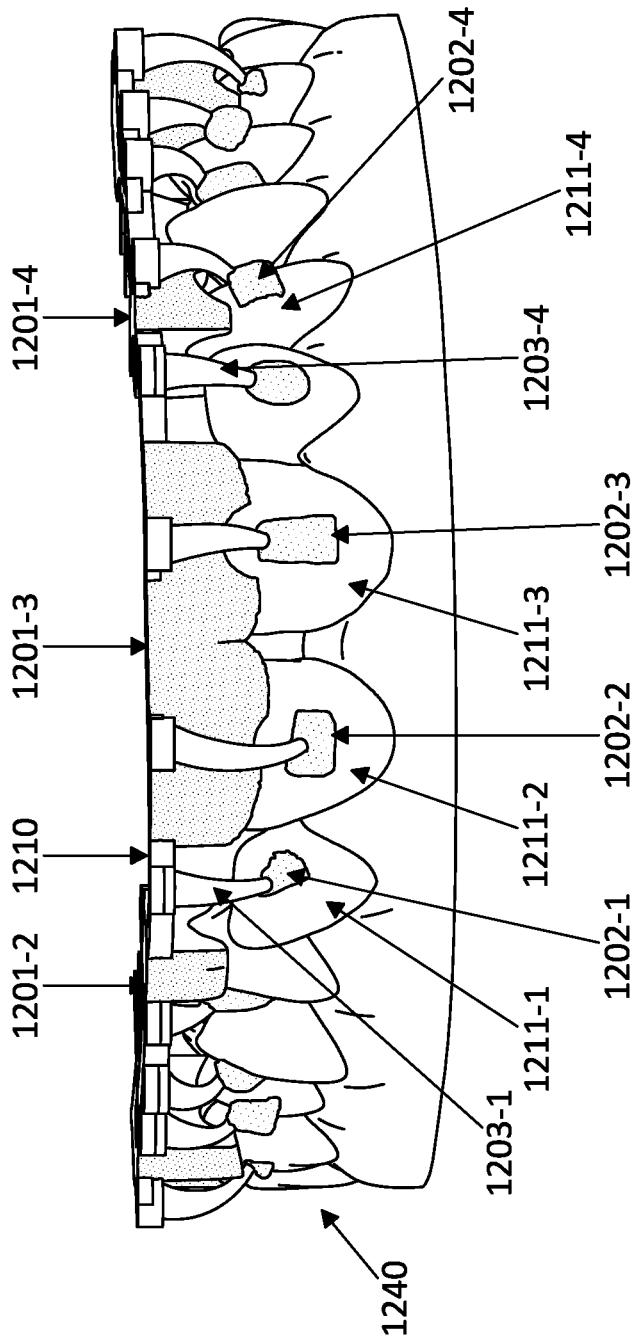
FIG. 12A illustrates a front view of a dental attachment placement structure that includes a frame according to a number of embodiments of the present disclosure.

FIG. 12A illustrates a front view of a dental attachment placement structure according to a number of embodiments of the present disclosure. The structure illustrated includes several components that when used together can be beneficial in the accurate placement and orientation of one or more attachments on one or more buccal tooth surfaces of a dental arch 1240. The features illustrated in this figure are a frame 1210 (also referred to as a body) configured to extend over at least a portion of the dental arch. The frame 1210 may be a solid structure that follows the shape of the dental arch of the patient, or a portion of the dental arch. Thus, the frame 1210 can have an arch shape in accordance with a shape of the patient's dental arch. The frame 1210 can support one or more extending structures that cooperate with the frame 1210 to register the one or more dental attachments (examples of which are identified as 1202-1, 1202-2, 1202-3, and 1202-4) to predetermined tooth surface position(s). The dental attachment(s) may be attached to the frame 1210 via one or more attachment supports (examples of which are identified as 1203-1 and 1203-4). This can allow the dental attachment to extend a distance from the frame 1210 and to access the predetermined position on a corresponding tooth surface. If multiple attachments are used, the attachment supports may extend in the same direction with respect to the frame. For instance, attachment supports may extend in a downward (or upward) direction from the frame to position the supports below (or above) the frame.

The dental attachment may be removably attached to the attachment support such that the attachment can be detached from the dental attachment placement structure, for example, after the attachment is affixed to the tooth surface. An attachment may be attached to an attachment support at an interface region between the attachment and attachment support. This interface region may be configured for easy detachment. For example, the attachment support may have a thicker end close to the frame that tapers to a lesser thickness at the interface region for easier detachment. In some embodiments, detachment is accomplished using a detachment tool, as described herein. In a number of embodiments, the interface region is sufficiently frangible to allow the attachment to break away from the attachment support without the use of detachment tool. In some cases, a user may be able to detach the attachment by applying a compressive, tensile or pressing force on the attachment (e.g., by the user's hand).

The frame 1210 may also include one or more registration anchors (examples of which are identified as 1201-2, 1201-3, and 1201-4) that extend from the frame 1210 and that include contact surfaces that register with corresponding one or more teeth. When the contact surfaces of the registration anchor(s) register with corresponding teeth, the dental attachments can also register with the corresponding tooth surfaces. In some cases, the registration anchor contact surface is contoured to complement the undulations and/or grooves of a corresponding surface of one or more teeth. The contoured surface may be adapted to complement the surfaces of any type of one or more teeth, such as one or more incisors, canines, premolars, and molars. The contoured surface may be adapted to complement any side of a tooth, such as one or more lingual, occlusal, buccal, and distal tooth surfaces. In some embodiments, the registration anchor may at least partially encapsulate an incisal edge of a tooth. The registration anchor may and extend over more than one side of a tooth, such as portions of the top (e.g., crown), buccal and/or lingual sides of the corresponding tooth. In the example shown in FIG. 12A, the registration anchors extend over the top and buccal sides of corresponding teeth.

In some cases, the dental attachment is configured to attach to the same tooth as the tooth that the registration anchor is configured to contact. For instance, attachment 1202-4 is aligned with a surface of tooth 1211-4, which is the same tooth that registration anchor 1201-4 is registered with. In some cases, the registration anchor is configured to registered with a different tooth that the tooth that the dental attachment is configured to attach to. For instance, attachment 1202-1 is aligned with a surface of tooth 1211-1, which is different than tooth 1211-2 that registration anchor 1201-3 is registered with. The registration anchor may be configured to registered with multiple teeth. For instance, registration anchor 1201-3 can adapted to registered with surfaces of tooth 1211-2 and tooth 1211-3. When the one or more registration anchors are correctly placed on and registered with corresponding tooth surface(s), the dental attachment placement structure can be properly aligned with the dental arch, and the attachment(s) can be precisely positioned with respect to the tooth surface(s).

Figure 12B:
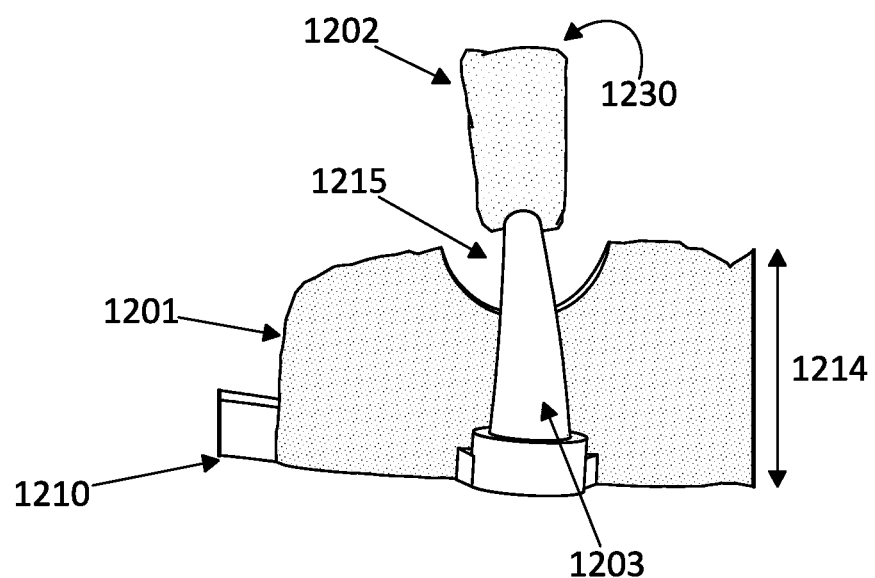
FIG. 12B illustrates a close-up view of a dental attachment of the attachment placement structure of FIG. 12A.

FIG. 12B illustrates a close-up view of an attachment portion of the dental attachment placement structure of FIG. 12A. In this example, the attachment support 1203 extends indirectly from the frame 1210 via registration the anchor 1201. This configuration can allow the attachment 1202 to be connected to the same tooth that the registration anchor 1201 is registered with. In the example shown, the registration anchor 1201 includes a clearance 1215 to provide proper positioning of the attachment 1202 without interference from the registration anchor 1201 and/or attachment support 1203. The shape and depth of the clearance 1214 may vary depending on the desired tooth position for the attachment 1202. The thickness and height 1214 of the registration anchor 1201, as well as its offset from the tooth, may also vary depending on the desired placement of attachment 1202. In some cases, the clearance 1215 provides access for the treatment professional around the attachment 1202 during, for example, the process of affixing the attachment 1202 to the tooth.

In addition to extending the attachment in a downward or upward direction away from the frame and toward the tooth, the attachment support may also align an attachment surface (e.g., 1230) of the attachment with respect to the tooth surface. In some cases, the attachment support points the attachment surface (e.g., 1230) in a direction toward the midline of the frame. For example, the attachment support may have an arched shape that orients the attachment such that the attachment surface is substantially parallel to the target tooth surface. In other embodiments, the attachment support has an angled shape. This arched or angled shape may also provide room for the user's hand or a detachment tool to access the attachment for detachment as the arched shape can bow outward. The shape and size of the dental attachment 1202 can vary depending on desired force characteristics and the shape and type of corresponding dental appliance (e.g., aligner), as described herein.

Figure 12C:
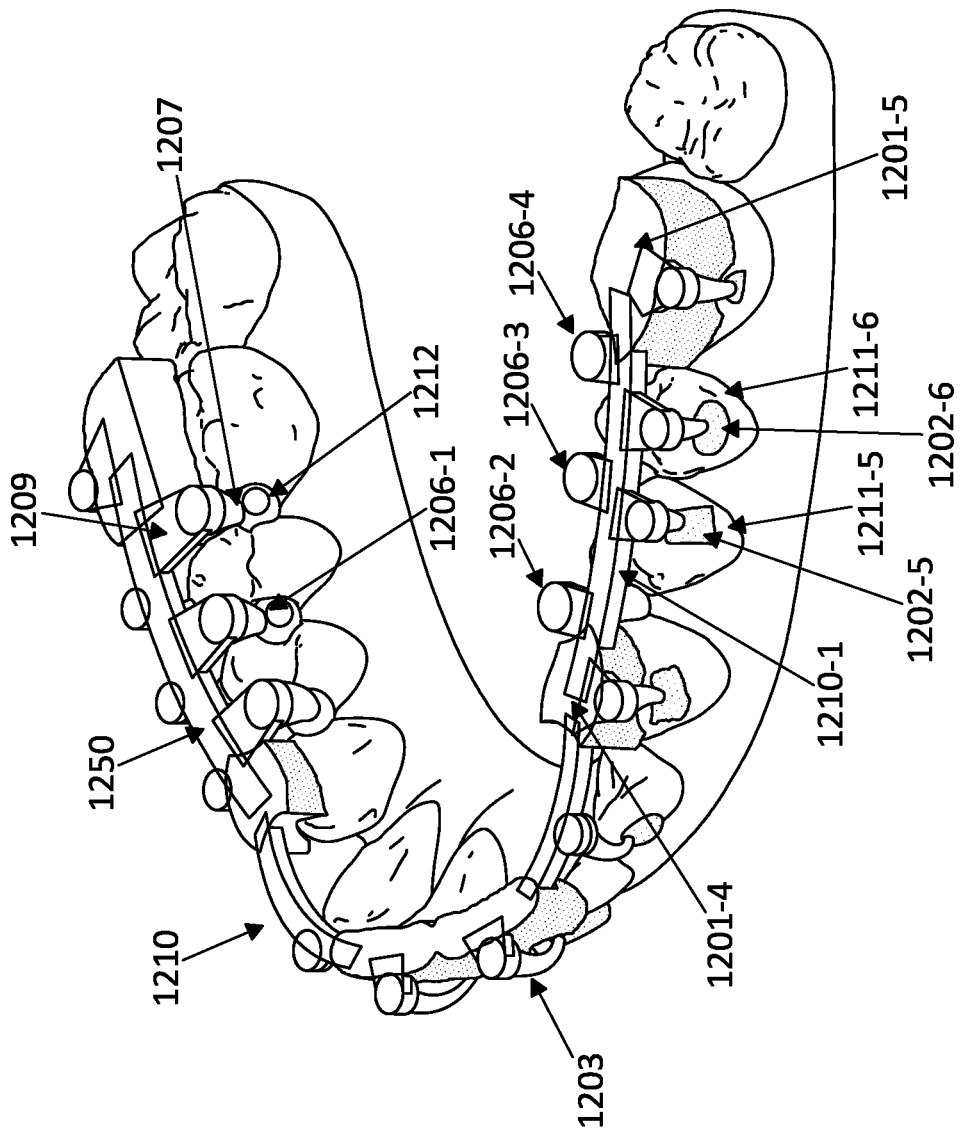
FIG. 12C illustrates a perspective side view of the dental attachment placement structure of FIG. 12A.
Figure 12D:
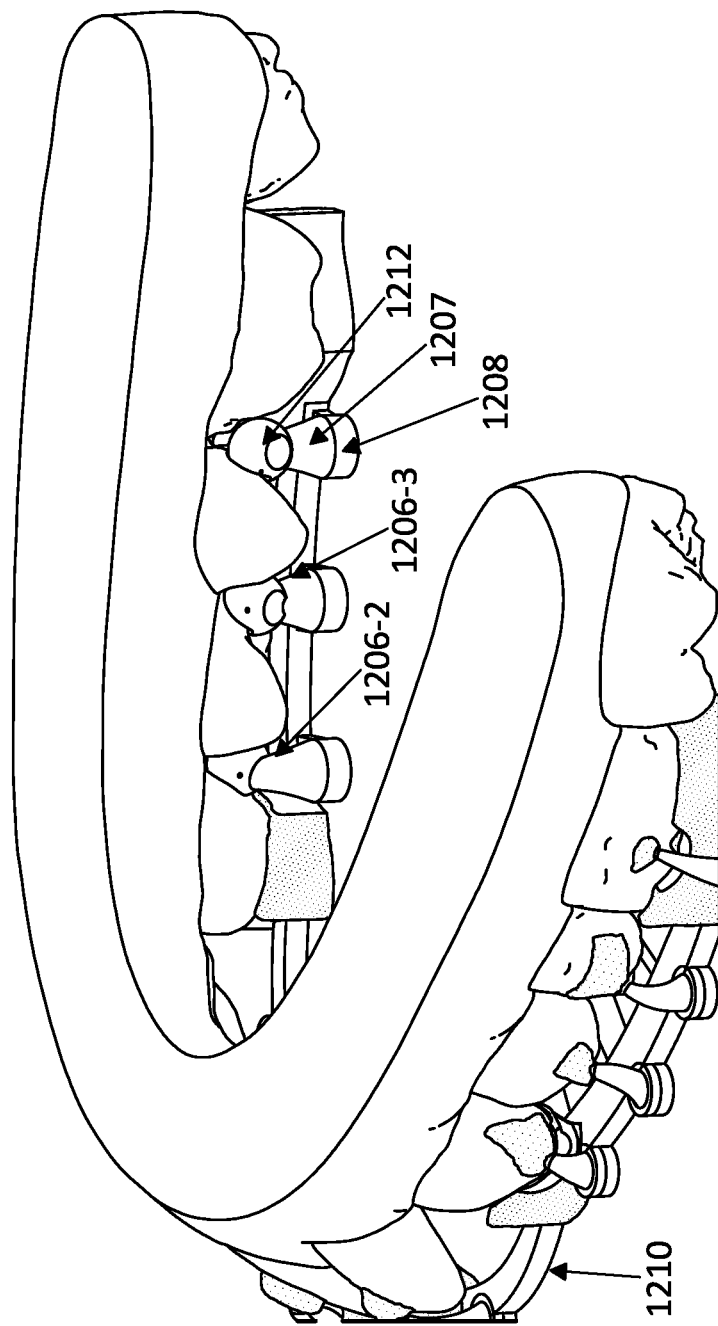
FIG. 12D illustrates an alternative perspective side view of the dental attachment placement structure of FIG. 12A.

In some embodiments, the dental attachment placement structure includes one or more retention supports that extends from the frame and is configured to maintain the dental attachment(s) at the predetermined position(s). FIGS. 12C and 12D illustrate top and bottom perspective views of the dental attachment placement structure of FIG. 12A on a dental arch, showing exemplary retention supports, examples of which are identified as 1206-1, 1206-2 and 1206-3. A retention support can include a contact portion 1212 that is configured to contact one or more teeth and/or gums of the dental arch. In the example shown, the contact portion 1212 is shaped and sized to contact an interproximal region between the teeth. The contact portion can have any shape. In some cases, the contact portion has a substantially spherical shape, as shown. Other non-limiting examples shapes can include a polyhedron (e.g., tetrahedron or cube), cone, cylinder and ovoid shapes. The retention support may include an arched or angled portion that extends the dental contact portion a distance from the frame. For example, the retention support may include a horizontal portion 1209 that extends in a horizontal direction with respect to the frame 1210, and a vertical portion 1207 that extends in a vertical direction with respect to the frame 1210, which position the dental contact portion 1212 on a surface (e.g., lingual surface) of the dental arch.

In some cases, the retention support extends from a different side of the frame than the attachment support. For example, the retention support can extend from a first side of the frame and the attachment support may extend from a second side of the frame. In the example shown in FIGS. 12C and 12D, the retention supports extend from a lingual side of the frame such that the retention supports can contact a lingual portion of the dental arch, and the attachment supports (e.g., 1203) extend from a buccal side of the frame such that the attachments (e.g., 1202) can register at positions on buccal surfaces of the teeth. The retention support can support the lingual side of the frame to stabilize the position of the dental attachment placement structure on the dental arch in three-dimensions.

The frame (e.g., 1210) can be shaped and sized for following at least a portion of the dental arch. In some instances, the frame has an arched shape (e.g., U-shaped) in accordance with the dental arch. In other embodiments, the frame covers only a portion of the dental arch. The frame may be one continuous piece or may include multiple pieces that are joined together. Such sections may have a curved (e.g., arched) shape or be straight and joined together to provide a generally curved (e.g., arched) shape. Although the example shown shows frame 1210 that is adapted to follow along occlusal sides of the teeth (e.g., top of the dental arch), other examples are encompassed by the instant disclosure. For example, the frame may be adapted to follow along the lingual and/or buccal sides of the teeth (e.g., inside of the dental arch and/or outside of the dental arch). In some embodiments the frame is adapted to follow along multiple sides of the teeth (e.g., two or more of the occlusal, lingual and buccal sides). In some cases, the dental attachment placement structure includes more than one frame. For example, two or more frames may be adapted to follow along one or more of the occlusal, lingual and buccal sides of the teeth. Such examples may be included in any of the dental attachment placement structures described herein.

In some embodiments, the registration anchors register with only a subset of the teeth of the dental arch. In some examples, two or more registration anchors are used to span the frame over one or more teeth. For instance, registration anchors 1201-4 and 1201-5 extend from the frame 1210 such that they are separated by a gap portion 1210-1 of the frame. The registration anchors 1201-4 and 1201-5 are configured to register with non-adjacent teeth such that the gap portion 1210-1 of the frame spans teeth 1211-5 and 1211-6. This can allow the gap portion 1210-1 of the frame to suspend over the dental arch and allow dental attachments 1202-5, 1202-6 and retention supports 1206-2, 1206-3, 1206-4 to be positioned over their respective target teeth. This allows the dental attachment placement structure to occlude less of the dental arch than a dental attachment placement structure that covers more tooth surfaces. For instance, the treatment professional can more easily access regions around the intervening teeth 1211-5 and 1211-6 for attaching the attachments 1202-5 and 1202-6.

As described herein, the dental attachment placement structure can be formed using additive manufacturing techniques. In some cases, this involves printing portions of the dental attachment placement structure on a build plate (sometimes referred to as a build platform or base plate) of an additive manufacturing machine without the use of supports. As known, manufacturing supports are often used in 3D printing to support the 3D object on a build plate during the printing process. Such manufacturing supports are typically used to support portions of the 3D object, such as overhangs, which tend to deform during the printing process and are generally removed from the 3D object after the printing process is complete. Such manufacturing supports adds extra material and adds extra manufacturing time and expense for removing the supports. In some embodiments, the dental attachment placement structure is printed without the use of manufacturing supports, thereby saving material, time and money. In the example shown in FIG. 12C, the frame 1210 can have a surface 1250 (e.g., top or bottom surface) that can be formed on a build plate without the use of manufacturing supports to provide the advantages described above. The surface 1250 may be a substantially flat surface in accordance with a flat build plate surface. The flat surface 1250 may correspond to a top (or bottom) surface of the dental attachment placement structure, where the attachment support(s) (e.g., 1203) and/or retention support(s) (e.g., 1206-1, 1206-2, 1206-3, 1206-4) extend with respect to a bottom (or top) surface of the frame. In some cases, portions of the attachment support(s) and/or retention support(s) can also be built on the build plate and have a correspondingly flat surface.

To use the dental attachment placement apparatus, a treatment professional can position the one or more registration anchors on corresponding tooth surfaces. In the embodiment shown in FIGS. 12A-12D, the registration anchors start at the frame and extend until the anchors encapsulate at least a portion of an incisal edge and extend over one or more sides of corresponding teeth. This positions the one or more dental attachments against corresponding tooth surfaces at predetermined positions. The one or more retention supports can also be positioned on (and in some cases, registered with) surfaces of one or more teeth (e.g., on a lingual side of the dental arch) to maintain the position of the dental attachments. The dental attachment can be affixed to the predetermined position on the tooth surface using, for example, one or more adhesives, as described herein. The dental attachments can be detached from the dental supports such that only the dental attachments from the structure remain coupled to the patient's dental arch.

Figure 12E:
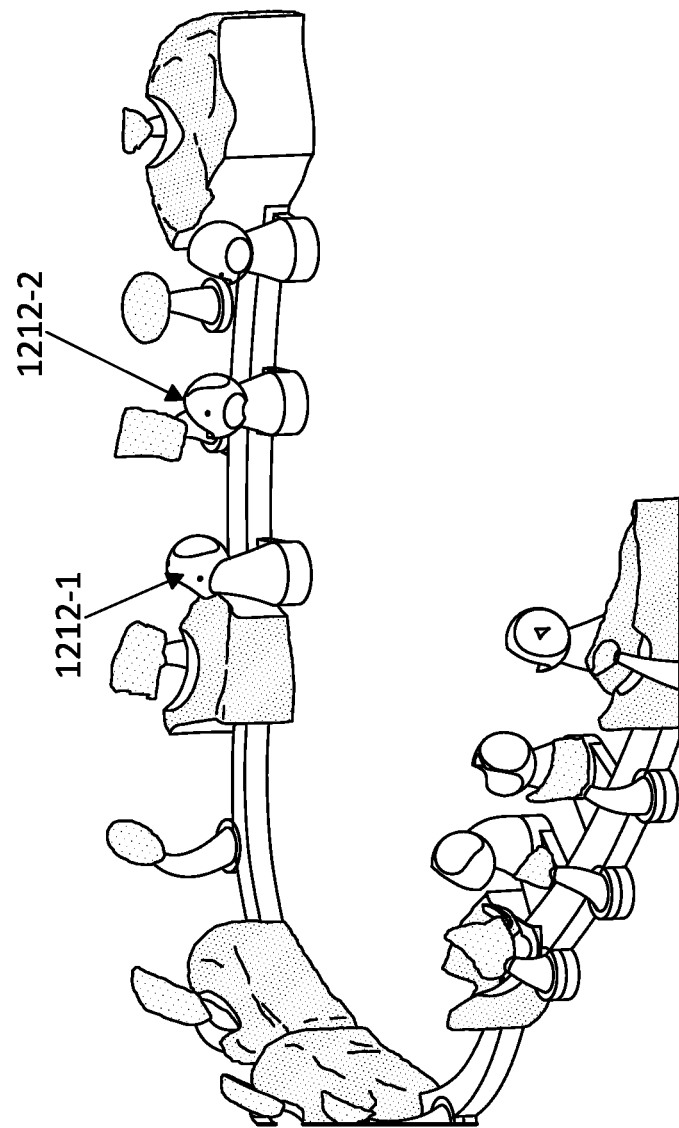
FIG. 12E illustrates a perspective side view of the dental attachment placement structure of FIG. 12A without a dental arch.
Figure 12F:
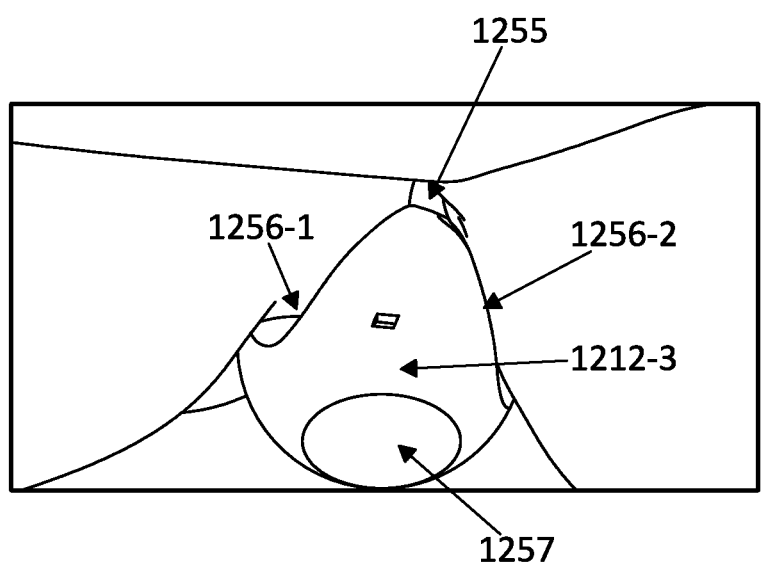
FIG. 12F illustrates a close-up view of a contact portion of a retention support of the dental attachment placement structure of FIG. 12A.

FIG. 12E illustrate a perspective view of the dental attachment placement structure of FIG. 12A without a dental arch, showing aspects of various contact portions (e.g., 1212-1 and 1212-2) of retention supports. 12F shows a close-up view of a contact portion 1212-3. The contact portion can be configured to be placed in the interproximal region 1255 between adjacent teeth. The contact portion can include one or more conforming surfaces (e.g., 1256-1 and 1256-2) that is configured to conform to the shape of teeth and/or gums. The conformed shape may allow the contact portion to grip onto a surface of the dental arch (e.g., on the lingual side). The shape of the contact portion 1212 can be determined based on virtual model. For instance, a virtual sphere (or cone, tetrahedron, etc.) can be placed in a virtual model of the interproximal region (based on a scan of the patient's dentition) and subtracting regions from the virtual sphere where the teeth would be. In this process, in some embodiments, the gingiva may also be taken into account. In some instances, the virtual model of the gingiva can be enlarged by a scaling factor (e.g., making the gingiva 10% larger), and thus any portions of the virtual sphere that are contacting the scaled-up gingiva are subtracted from the sphere. In this manner, the contact portion of the retention feature can be formed such that its surfaces will match those of the teeth that it will be in contact with and without interfering with (e.g., contacting) the gingiva, which may cause discomfort to the patient. In some embodiments, the contact portion of the retention feature includes one or more chamfered surfaces (e.g., 1257), e.g., to reduce the amount of protrusion of the contact portion from the dental arch, which may also increase the comfort to the patient.

Figure 12G:
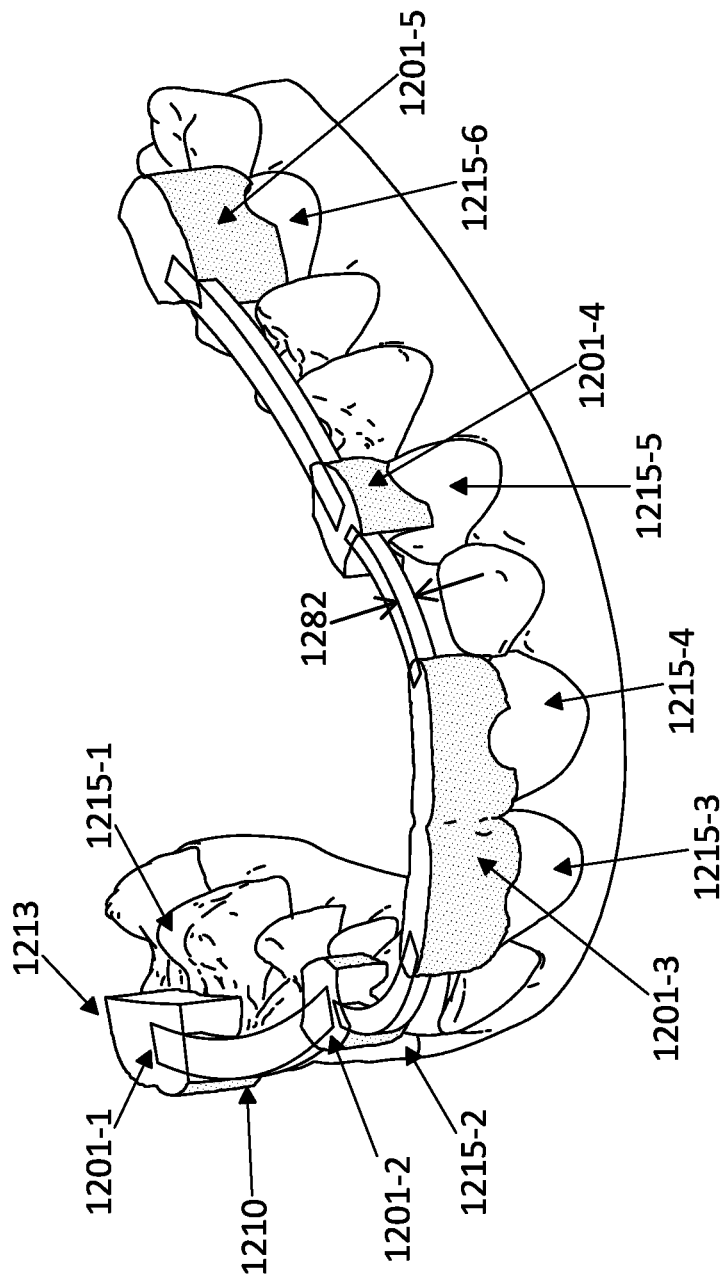
FIG. 12G illustrates a perspective side view of the frame and registration anchors of the dental attachment placement structure of FIG. 12A.
Figure 12H:
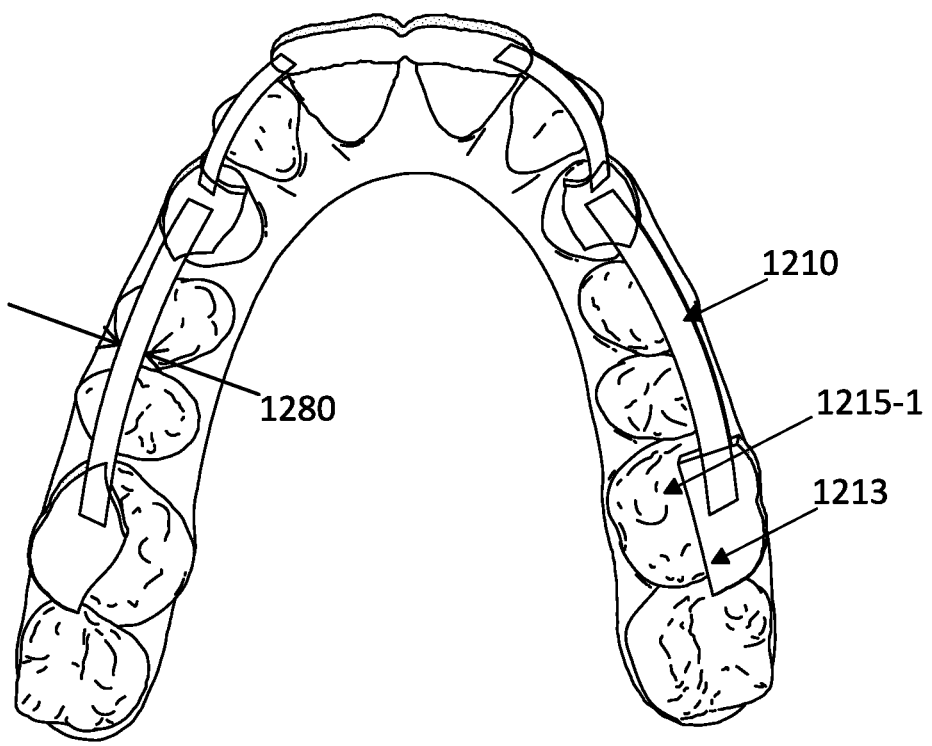
FIG. 12H illustrates an alternative perspective side view of the frame and registration anchors of the dental attachment placement structure of FIG. 12A.
Figure 12I:
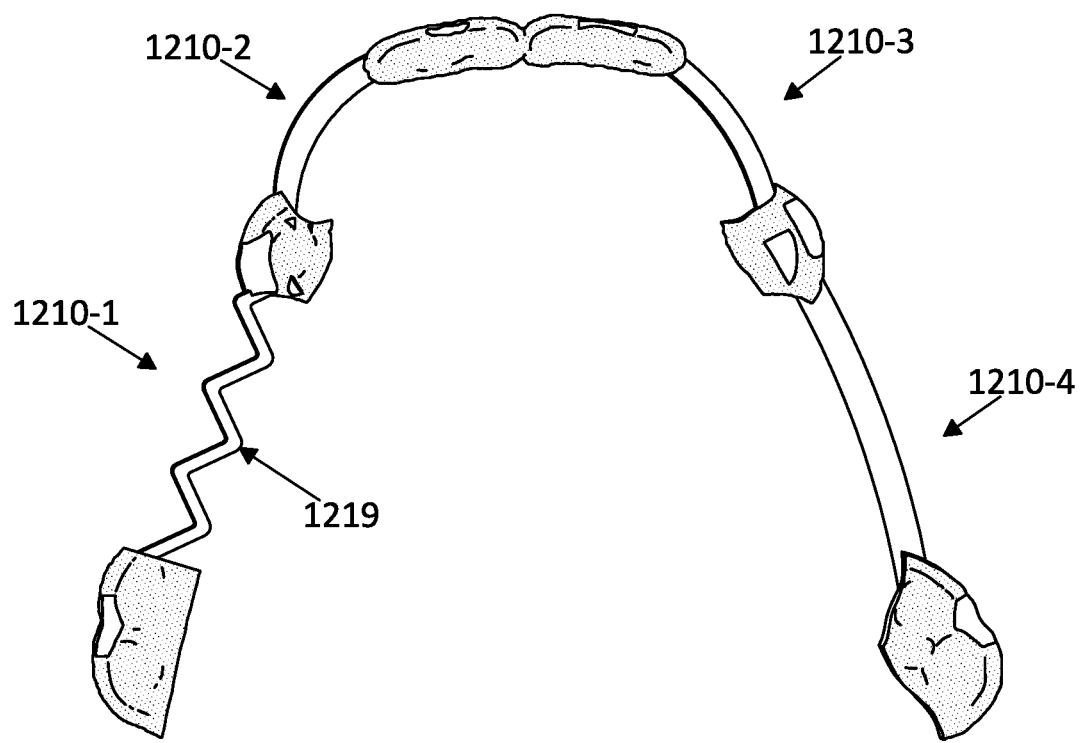
FIG. 12I illustrates an overhead view of an alternative of the dental attachment placement structure of FIG. 12A having a flexible frame portion.

FIGS. 12G and 12H show alternative views of the dental attachment placement structure of FIG. 12A without the dental attachments and retention supports to allow certain features to be examined and discussed more closely and to aid the reader's understanding. One or more registration anchors (e.g., 1201-1, 1201-2, 1201-3, 1201-4 and 1201-5) can be configured to register with one or more corresponding anchor teeth (e.g., 1215-1, 1215-2, 1215-3, 1215-4, 1215-5 and 1215-6). According to some embodiments, the buccal aspect 1213 (i.e., the tallest point of the buccal surfaces of a tooth) of the one or more anchor teeth can be used as the outermost limit of the dental attachment placement structure. A thickness (e.g., 1280) and width (e.g., 1282) of the frame (or portions of the frame) can be varied such that distance between the frame and the buccal aspect 1213 is as small as practical, thereby minimizing the distance between the frame and the dental arch.

In some embodiments, one or more portions of the dental attachment placement structure is flexible in order to reduce stress concentrations in portions of the structure. Since the dental attachment placement structure may be made of brittle material (e.g., some composite materials), such flexible features can allow the structure to be more resilient and less prone to breakage while still being made of material(s) having desirable properties such as stiffness. The flexible features can reduce the occurrence of breakage during handling (e.g., during manufacture and shipping) of the structure. Having flexible features may allow more structures to be printed (e.g., on a build plate) per 3D printing run. The flexible features may also allow the structures to bend in ways that reduce the dimensions of the structures for more efficient packaging. The flexible features may also provide some tolerance so that the structure can fit on the patient's dental arch more easily. FIGS. 12G-12K show examples of the dental attachment placement structure 12A with various flexible features, in accordance with some embodiments. FIGS. 12G-12K do not show certain features, such as dental attachments and retention supports for simplicity; however, such features can be included.

FIG. 12G illustrates an overhead view of the dental attachment placement structure where a portion 1210-1 of the frame is modified to have a zigzag or "Z" shape as an alternative to an arch shape. In other examples, the flexible portion can have a sinusoidal or "S" shaped pattern. Such geometries may allow the flexible portion 1210-1 to bend or twist in response to forces (e.g., pushing, pulling, twisting) that may be applied to the frame, thereby distributing the stress and reducing stress concentrations. One or more of portions 1210-1, 1210-2, 1210-3 and 1210-4 of the frame may include such modified curved geometry, depending on particular needs. These types of changes in geometry of the frame allow the frame (or portions thereof) to be flexible without changing the material of the frame. That is, flexible portion 1210-1 may be made of the same material as one or more of portions 1210-2, 1210-3 and 1210-4 of the frame, attachment supports, attachment supports and retention anchors. This solution may be more cost effective than manufacturing the structure with different materials having different degrees of flexibility.

Figure 12J:
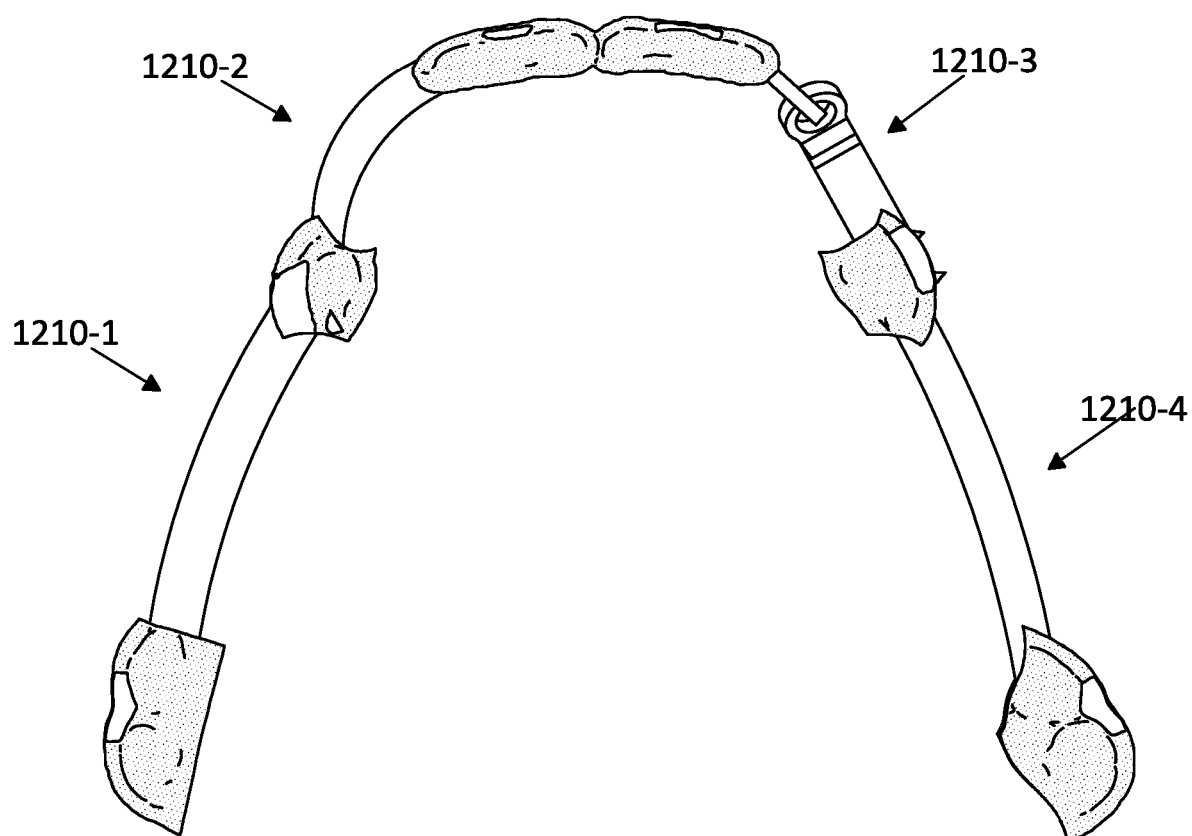
FIGS. 12J and 12K illustrate an overhead view and perspective side views of another alternative of the dental attachment placement structure of FIG. 12A having a flexible frame portion.
Figure 12K:
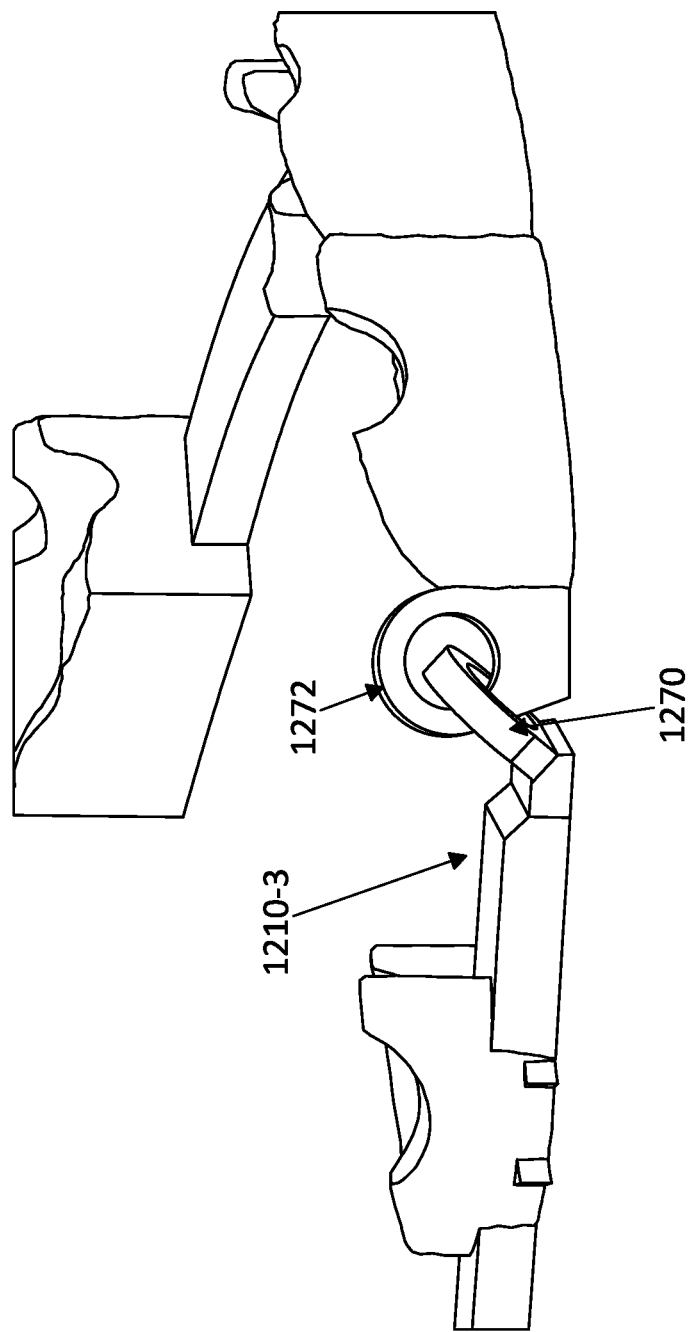

FIGS. 12J and 12K illustrate a link joint alternative to the arch-shaped frame portions of FIG. 12A. The link joint can include interlocking links, such as a first link 1270 and second link 1272 denoted in FIG. 12K. The link joint can include any number of interlocking links (e.g., 2, 3, 4, 5, 6, 10, 20). The interlocking nature of the link joint may allow the links to move with respect to each other while remaining connected with each other. As with a zigzag or sinusoidal geometry, the link joint geometry can give the frame portion 1210-3 flexibility for resisting breakage when a force (e.g., pushing, pulling, twisting) are applied to the frame. The link joint can be placed anywhere along the frame as needed, including one or more of portions 1210-1, 1210-2, 1210-3 and 1210-4 of the frame. It should be noted that the linked link joint geometry may efficiently be formed using a 3D printing process, whereby the interlocking links can be formed intact (i.e., linked).

Figure 12L:
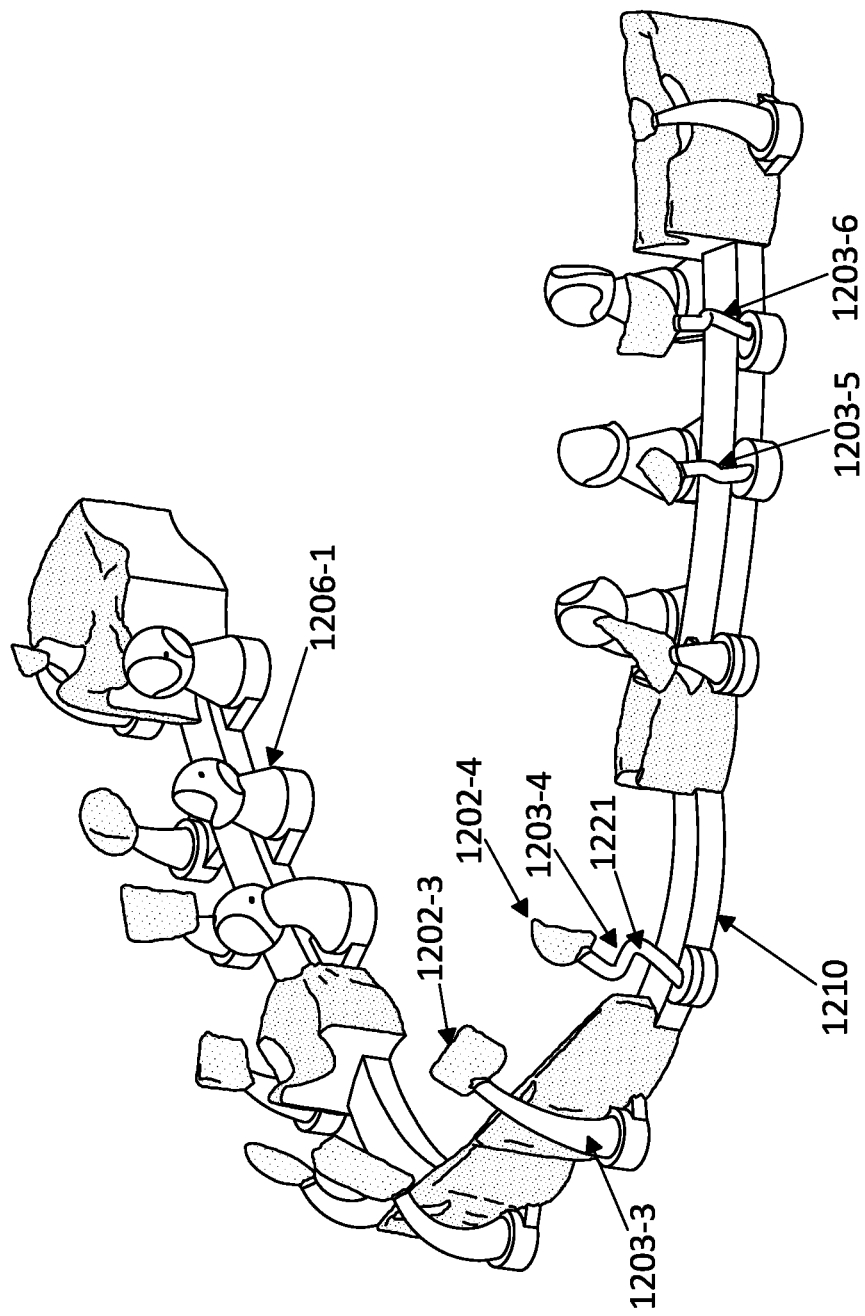
FIG. 12L illustrates a perspective side view of an alternative of the dental attachment placement structure of FIG. 12A having a flexible attachment support.

The dental attachment placement structure may have flexible portions other than the frame. FIG. 12L illustrates an alternative example of the structure of FIG. 12A having flexible attachment supports 1203-4, 1203-5 and 1203-6. As opposed an attachment support which tapers from a thicker diameter near the frame to a thinner diameter near the attachment (e.g., 1203-3), the flexible attachment supports may be thinner in diameter and have a sinusoidal or zig-zag shape that provides increased flexibility and resilience in response to an applied force (e.g., pushing, pulling, twisting). Having a more flexible attachment support can also allow for more maneuverability of the attachment (e.g., 1203-4) by the treatment specialist during placement and affixing of the attachment, and may reduce the risk of the attachment support being accidently adhered to the tooth surface. The flexible attachment support can have any shape and is not limited to the sinusoidal or zig-zag shape shown in FIG. 12K. For example, a spring (e.g., spiral), arc, bow or hook shape may also provide a desired amount of flexibility. The dental attachment placement structure can have any number of flexible attachment supports (e.g., 1, 2, 3, 4, 5, 8, 10). In some cases, one or more of the retention supports (e.g., 1206-1) may have a flexible geometry (e.g., sinusoidal or zig-zag shape).

Figure 18:
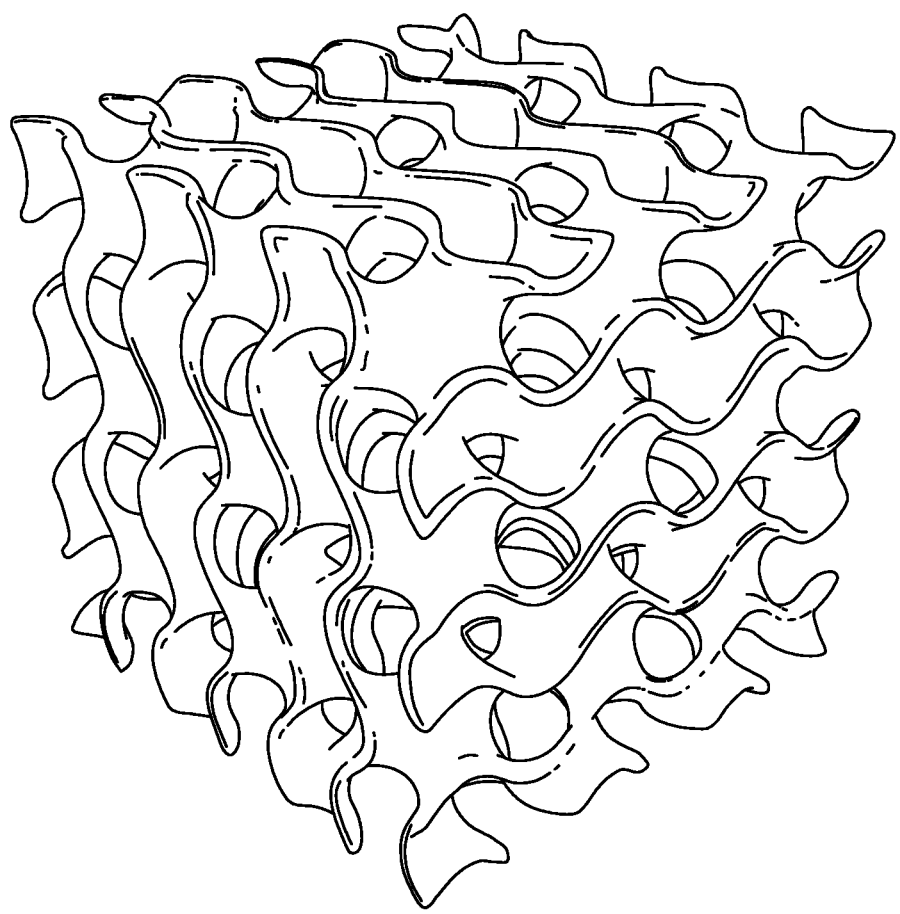
FIG. 18 illustrates an angled side view of lattice structures that can be incorporated into a portion of a dental attachment placement structure, such as an attachment, according to some embodiments.

According to some embodiments, the material forming the one or more features of the dental attachment placement structure provides flexibility. FIG. 18 illustrates a perspective view of an example of a lattice structure that can be incorporated into one or more portions of any of the dental attachment placement structures described herein. The lattice structure can include cavities that can increase the flexibility and/or reduces material consumption and weight of the structure. The lattice structure is incorporated into one or more of the frame, registration anchors, attachments, attachment supports, retention supports, or other portion of a dental attachment placement structure. As such, the rigidity or flexibility of the elements can be adjusted based upon the desired implementation.

A dental attachment placement structure may include any combination of the flexible features of FIGS. 12G-12L and 18. For example, the structure can include one or more flexible frame portions 1219 (e.g., FIG. 12I), one or more flexible attachment supports 1221 (e.g., FIG. 12L) and/or one or more flexible retention supports. The number of flexible features can vary depending on particular needs. Generally, the structure may have some flexibility to resist breakage and rigid enough to support and maintain the attachment(s) when placed on a patient's dental arch. In some embodiments, the flexible features are made of the same material as other portions of the structure, as described above. The flexibility may arise, at least in part, due to the shape; e.g., sinusoidal, zigzag, etc. shapes may be used. In some embodiments, the flexible features are made of a different material (e.g., more flexible) than other portion of the structure.

Figure 12M:
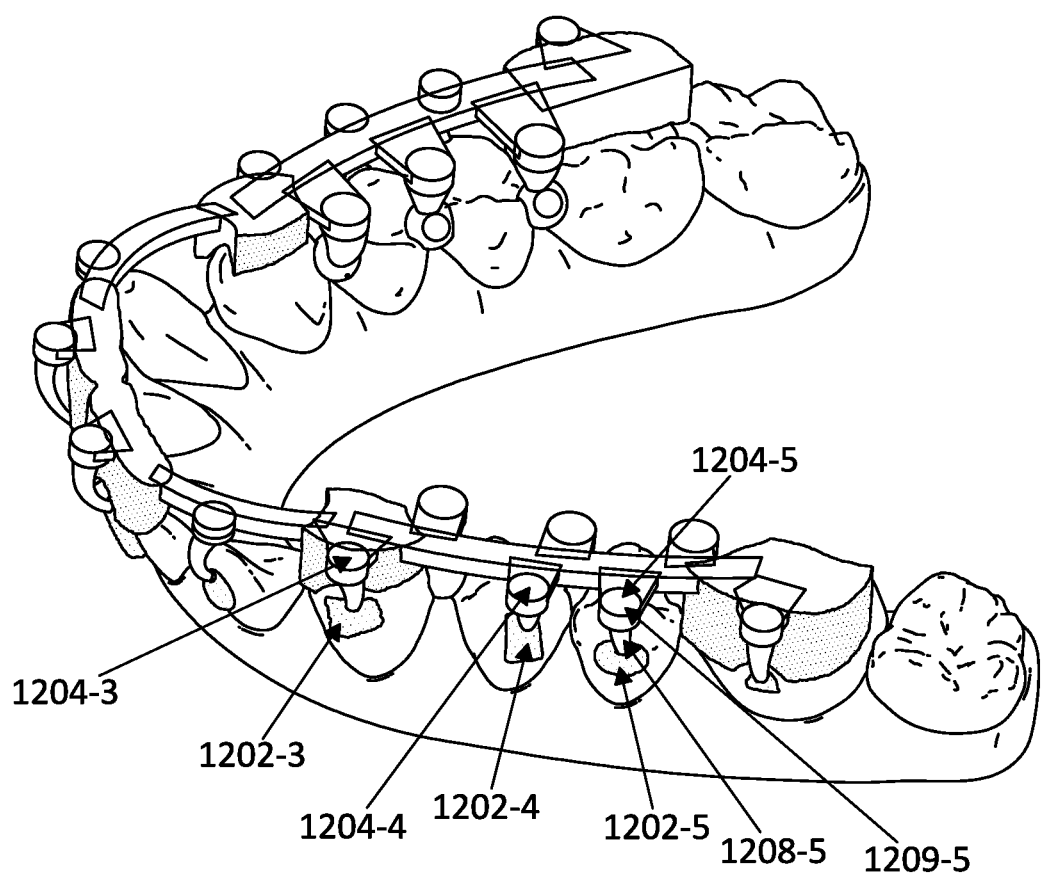
FIGS. 12M and 12N illustrate various perspective side views of the dental attachment placement structure of FIG. 12A showing aspects of the attachment supports.
Figure 12N:
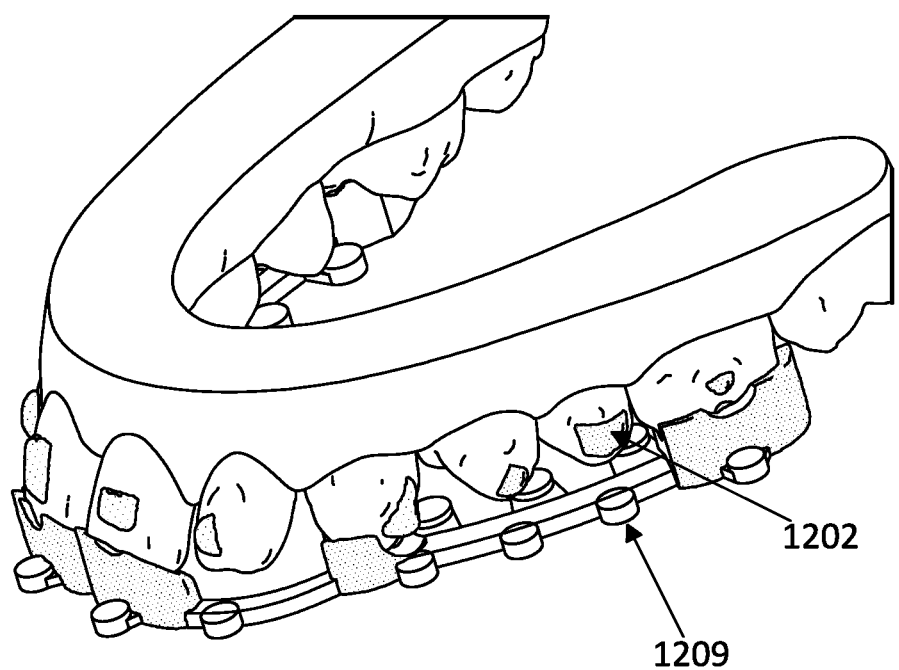

As described herein, the dental attachment placement structure can be formed based on a virtual model. According to some embodiments, the location and orientation of the frame and other features of the structure are determined based on the location of the dental attachments in the virtual model. FIGS. 12M and 12N illustrate one example of how features of the dental attachment placement structure of FIG. 12A can be formed from a virtual model. The side perspective view of FIG. 12M illustrates a side perspective view of the structure showing how the attachment support 1204-5 that supports attachment 1202-05 can include a base portion 1209-5 and a bridge portion 1209-5. Although not necessary in all embodiments, the base portion 1209-5 can be a solid, extruded, circular structure. The diameter and thickness of the attachment support may vary. The base portion 1209-5 may have a greater thickness (e.g., diameter) than the bridge portion 1208-5.

To determine the location and orientation of the frame 1210, a center of the attachment 1202-3 can be located and projected vertically until it intersects with the plane of the frame 1210. This point can be used as a reference (e.g., correspond to the center of a circle) used to create the base portion 1209-5, thereby informing the location and orientation of the frame 1210. The bridge portion 1209-5 can be formed to connect the base portion 1209-5 to the frame or registration anchor. The dental attachments 1202-4 and 1202-5 can likewise be used to create corresponding base portions and bridge portions for connecting the attachment supports 1204-4 and 1204-5 to the frame or a registration anchor, as well as the remaining dental attachments and attachment supports, until the location and orientation of the entire frame 2101 is determined. During, for example a 3D printing process, the attachment support may be centered under the dental attachment. FIG. 12N illustrates a different view of a base portion 1209 of an attachment support (without the bridge portion) with respect to a corresponding attachment 1202.

Figure 13A:
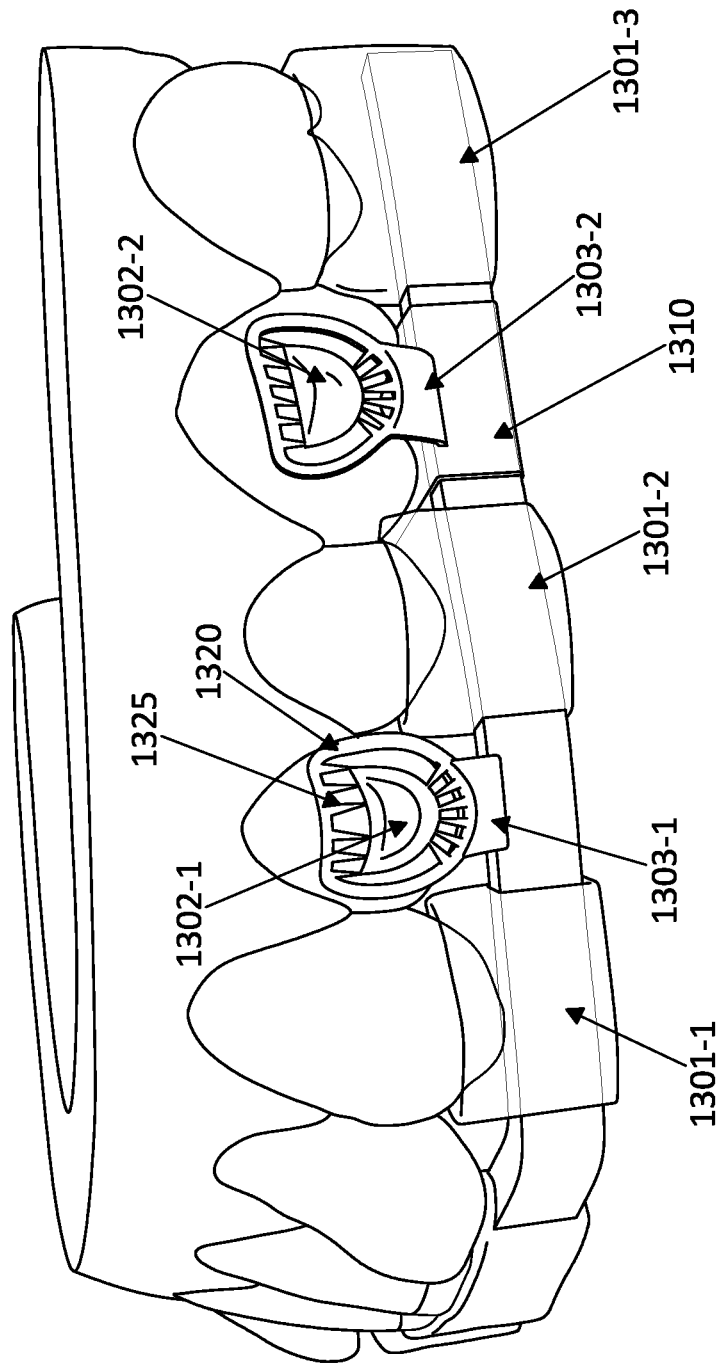
FIG. 13A illustrates a buccal side view of a dental attachment placement structure showing an attachment frame that supports a dental attachment according to a number of embodiments.
Figure 13B:
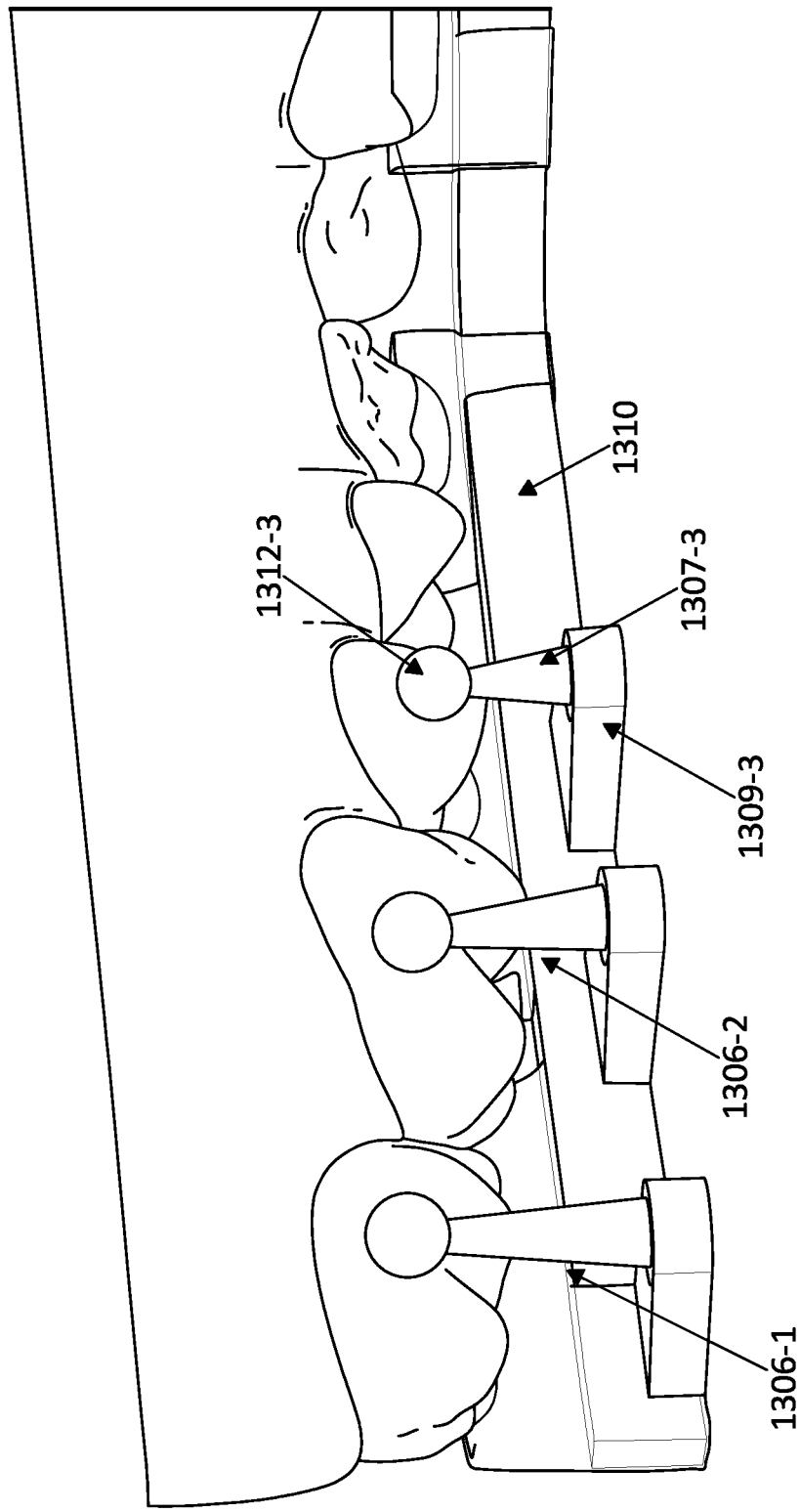
FIG. 13B illustrates a lingual side view of the dental attachment placement structure of FIG. 13A showing an attachment frame and retention supports according to some embodiments.

FIG. 13A shows a buccal side view and FIG. 13B shows a lingual side view of an alternative dental attachment placement structure according to a number of embodiments. The dental attachment placement structure can have similar features of the dental attachment placement structure of FIGS. 12A-12N, such as a frame 1310, one or more attachments (e.g., 1302-1 and 1302-2), one or more attachment supports (e.g., 1303-1 and 1303-2), one or more registration anchors (e.g., 1301-1, 1302-2 and 1301-3), and one or more retention supports (e.g., 1306-1 and 1306-2). The one or more retention supports can include a contact portion (e.g., 1312-3), a horizontal portion 1309-3 that extends in a horizontal direction with respect to the frame 1310, and a vertical portion 1307-3 that extends in a vertical direction with respect to the frame 1310.

As illustrated in Figured 13A, an attachment may be supported by an attachment frame (e.g., 1320) attached to the attachment support (e.g., 1303-1) and which may at least partially surround a perimeter of the attachment (e.g., 1302-1). The attachment may be connected to the attachment frame via one or more struts (e.g., 1325), which may correspond to a frangible portion of the attachment frame. For example, an interface region between a strut and the attachment may be sufficiently frangible such that the attachment can be detached from the attachment frame without the use of a detachment tool (e.g., by the user's hands). In some instances, the struts have a tapered geometry, whereby a thickness of the strut tapers down from the attachment frame to the attachment. The attachment frame can include any number of struts (e.g., 1, 2, 3, 4, 5, 10, 20). In some cases, the struts at least partially surround the perimeter of the attachment to maintain the attachment in position within the attachment frame. The attachment frame may be configured to protect the attachments and/or struts from being detached and/or damaged during manufacturing, handling and shipping.

As illustrated in Figured 13B, the one or more retention supports (e.g., 1306-1 and 1306-2) can be configured to contact a tooth surface between interproximal regions (e.g., a single tooth). In some cases, the one or more retention supports is configured to contact a crown surface of one or more teeth. These non-interproximal regions contact configuration can provide greater retention through increased surface contact with the one or more teeth. Further, this may provide a more accurate registration surface for the contact portion (e.g., 1312-3) since in some cases a digital scan of the interproximal region may be less accurate than a scan of a tooth surface between interproximal regions. In some embodiments, the dental attachment placement structure includes a combination of one or more retentions supports configured to contact one or more interproximal regions and one or more retentions supports configured to contact a tooth surface between one or more interproximal regions.

Figure 13C:
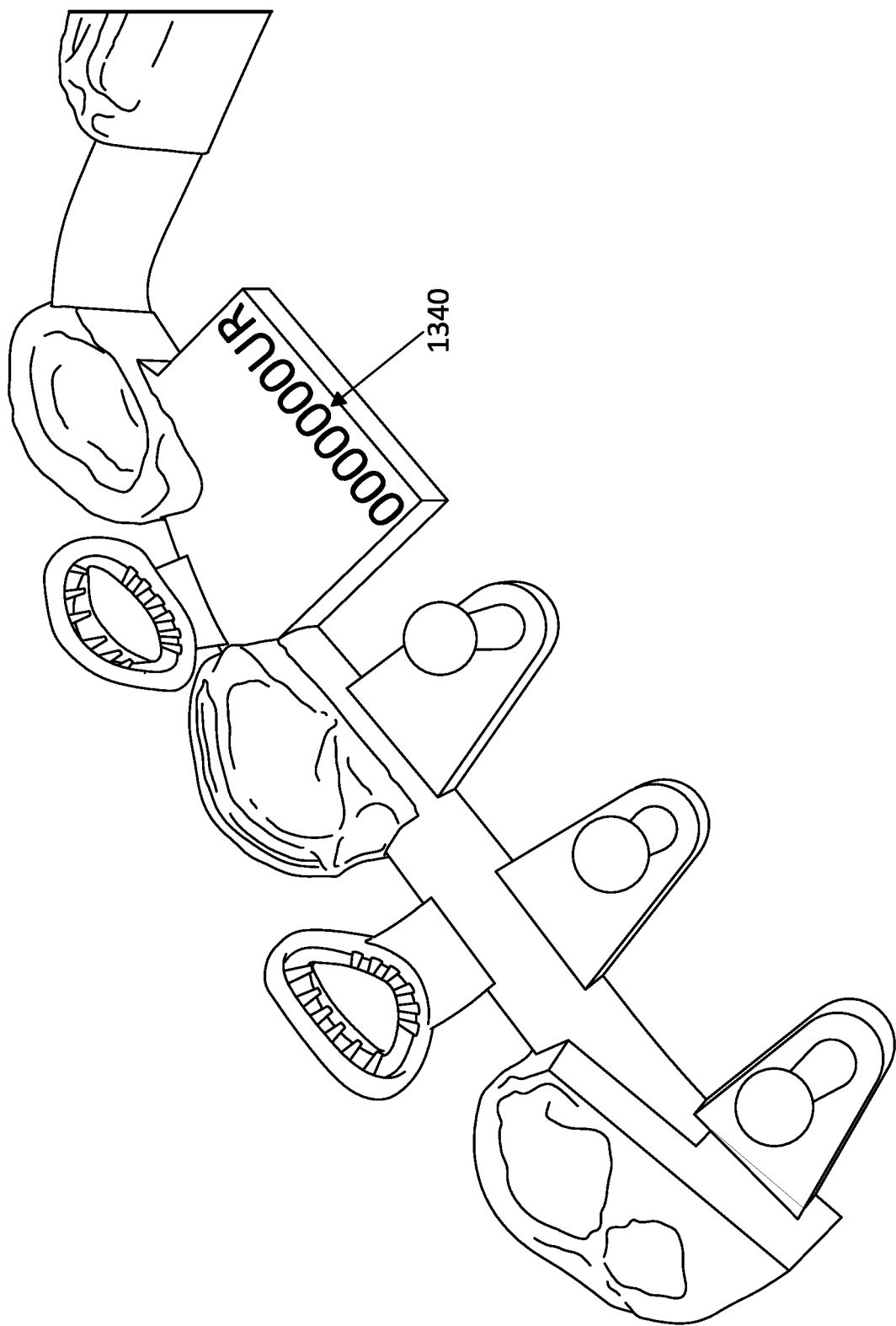
FIG. 13C illustrates an overhead view of the dental attachment placement structure of FIG. 13A showing a device identifier according to some embodiments.

FIG. 13C illustrates an overhead view of the dental attachment placement structure of FIG. 13A showing an identifier 1340 according to some embodiments. The identifier may be a device identifier 1340 that uniquely identifies the model, lot number, specific device, patient or other identifying characteristic of the dental attachment placement structure. The identifying may include one or more number, letters and symbols. In some cases, the identifier is integrated into the device during manufacture. For example, the identifier may be added in a virtual model of the dental attachment placement structure such that the identifier is integrated into the structure when 3D printed. In some cases, the identifier is added after forming the dental attachment placement structure.

FIG. 13D illustrates a side view of the dental attachment placement structure of FIG. 13A showing an exemplary attachment surface 1350 of an attachment 1302-2 according to some embodiments. The attachment surface may be textured surface to provide more surface area and to increase the shear bond strength between attachment and the surface of the target tooth. In some embodiments, the textured surface is a grid pattern, as shown in the inset view of FIG. 13D. Other examples of textured surfaces can include one or more lines or bars (e.g., horizontal, vertical, diagonal and/or radial), cross hatches, circular, zig-zag, sinusoidal, and polygonal (e.g., squares, rectangles, triangles, hexagons) patterns. In some cases, the textured surface is added to a virtual model of the dental attachment placement structure and integrated into the structured during manufacture (e.g., 3D printing). In some cases, the textured surface is added after forming the dental attachment placement structure.

In some embodiments, one or more of the dental attachments includes an auxiliary feature to provide a particular function according to a treatment plan. The one or more auxiliary features may be used in conjunction with one or more orthodontic appliances, such as an aligner, elastic band, brace and/or bracket, to apply prescribed forces to the patient's teeth. According to some embodiments, the dental attachment placement structure includes attachments with integrated auxiliary features for easier and more accurate placement of the auxiliary features on the dental arch. Examples of auxiliary features can include one or more of a power arm, hook, button, spring, brace, bracket, wire, rod, band, blade, coil, elastic, ring, track, link and chain.

Figure 14A:
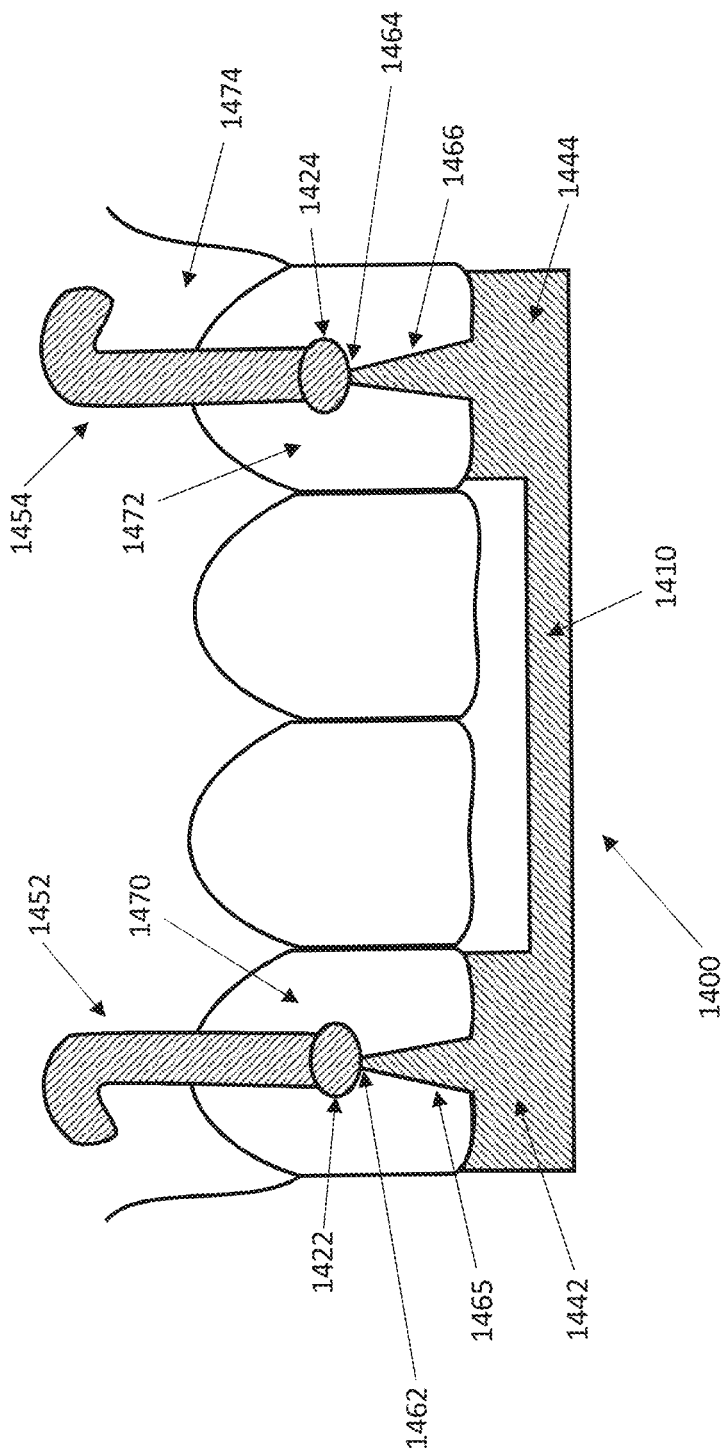
FIG. 14A illustrates a side view of a dental attachment placement structure having dental attachments with power arms according to a number of embodiments.
Figure 14B:
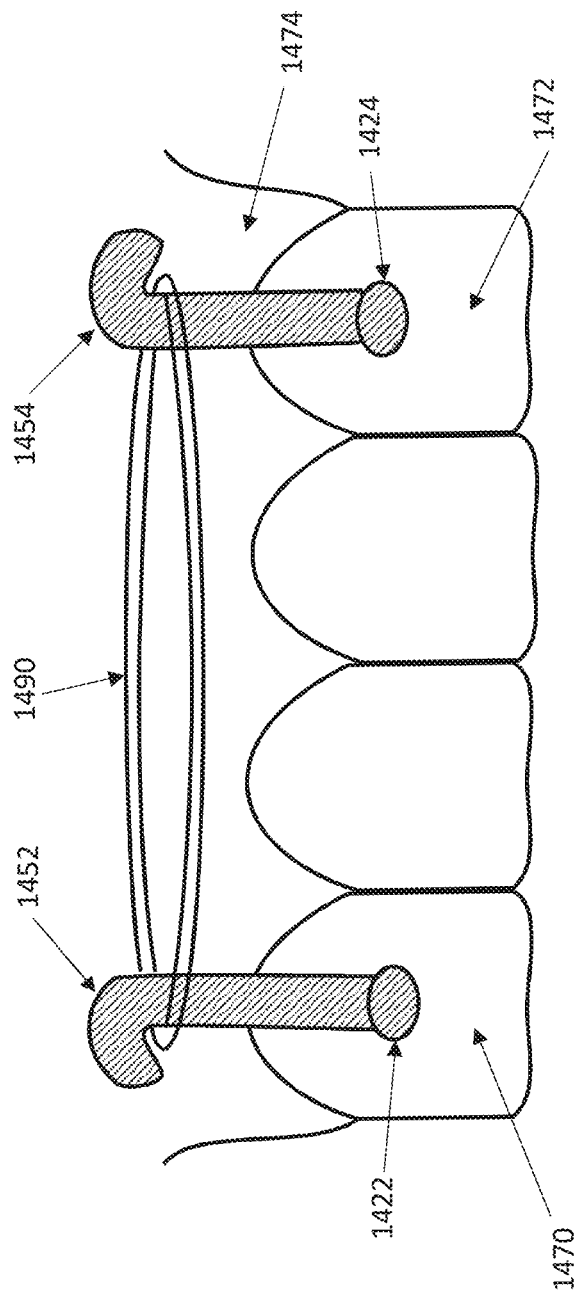
FIG. 14B illustrates the dental attachments with power arms of FIG. 14A after the dental attachment placement structure is removed and a resilient member is coupled thereto.

FIGS. 14A and 14B illustrate side views of exemplary dental attachments having power arm auxiliary features being attached to a dental arch using a dental attachment placement structure 1400. The dental attachment placement structure 1400 can include similar features as the structures of FIGS. 12A-12N and 13A-13D such as one or more frames (e.g., 1410), one or more dental attachments (e.g., 1422 or 1424), one or more registration anchors (e.g., 1442 or 1444), and one or more retention supports. One or more of the attachments can include an auxiliary feature (e.g., 1452 or 1454) that extends from the attachment. In the example shown, the auxiliary feature is an elongated hook, also referred to as a power arm. In some cases, the auxiliary feature is added to a virtual model of the dental attachment placement structure and integrally formed with the structure (e.g., using 3D printing). The placement, size, angle and other aspects of the auxiliary feature can be determined (e.g., calculated) depending on a desired movement of teeth according to a treatment plan.

Once the dental attachment placement structure is formed, it may be positioned on the patient's dental arch, such as shown in Figured 14A. For example, registration anchors 1442 and 1444 can be placed on and adjusted to register with corresponding teeth 1470 and 1472, respectively. The retention supports (if any) may also be positioned on an opposing (e.g., lingual) side of the dental arch for support. Once registered in the predetermined position of a tooth, the attachment can be affixed to the tooth using methods described herein, such as using an adhesive. The attachment and auxiliary feature can be detached from the dental attachment placement structure at an interface region (e.g., 1462 or 1464) between the attachment and an attachment support (e.g., 1465 or 1466). In some embodiments, the interface region may be frangible such that the attachment may be removed without a detachment tool. In some embodiments, the attachment is configured to be removed using a detachment tool.

FIG. 14B shows the dental attachments with the auxiliary features on corresponding teeth after the dental attachment placement structure is removed and a resilient band 1490 is hooked onto the auxiliary features. In some embodiments, the auxiliary feature is configured to extend above (or below) the gum line such that a portion of the auxiliary feature extends in the direction of the gingiva 1474 and the root of the tooth. This may allow the auxiliary feature to increase the moment arm of the auxiliary feature, as desired in some power arm applications. For example, the longer the auxiliary features 1452 and 1454, and the higher the band 1490 is placed on the auxiliary features 1452 and 1454, the greater the pulling force for pulling teeth 1470 and 1472 together. In some embodiments, the attachments (e.g., 1422 or 1424) and/or auxiliary features (e.g., 1452 or 1454) are also used in conjunction with one or more additional orthodontic devices, such as an aligner, to move teeth in the dental arch according to a treatment plan.

Figure 15:
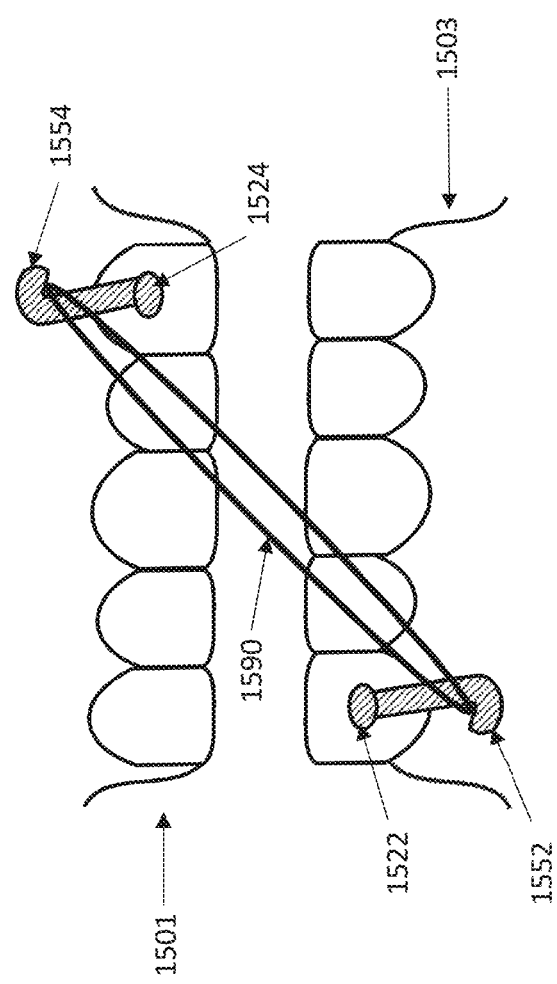
FIG. 15 illustrates dental attachments with power arms attached to opposing dental arches and a resilient member coupled thereto.

FIG. 15 illustrates another example of an application of dental attachments with auxiliary features. A first auxiliary feature 1552 can be attached to a first dental attachment 1522 on a tooth of a first dental arch 1503 of the patient. A second auxiliary feature 1554 can be attached to a second dental attachment 1524 on a tooth of a second dental arch 1501 of the patient. An elastic band 1590 can be hooked onto the first and second auxiliary features to provide a pulling force to pull corresponding teeth in toward each other. The angles of the first and second auxiliary features may vary depending on a desired force direction. In some embodiments, the attachments and/or auxiliary features are also used in conjunction with one or more additional orthodontic devices, such as one or more aligners, to move teeth in the first and/or second dental arches according to a treatment plan.

Figure 16:
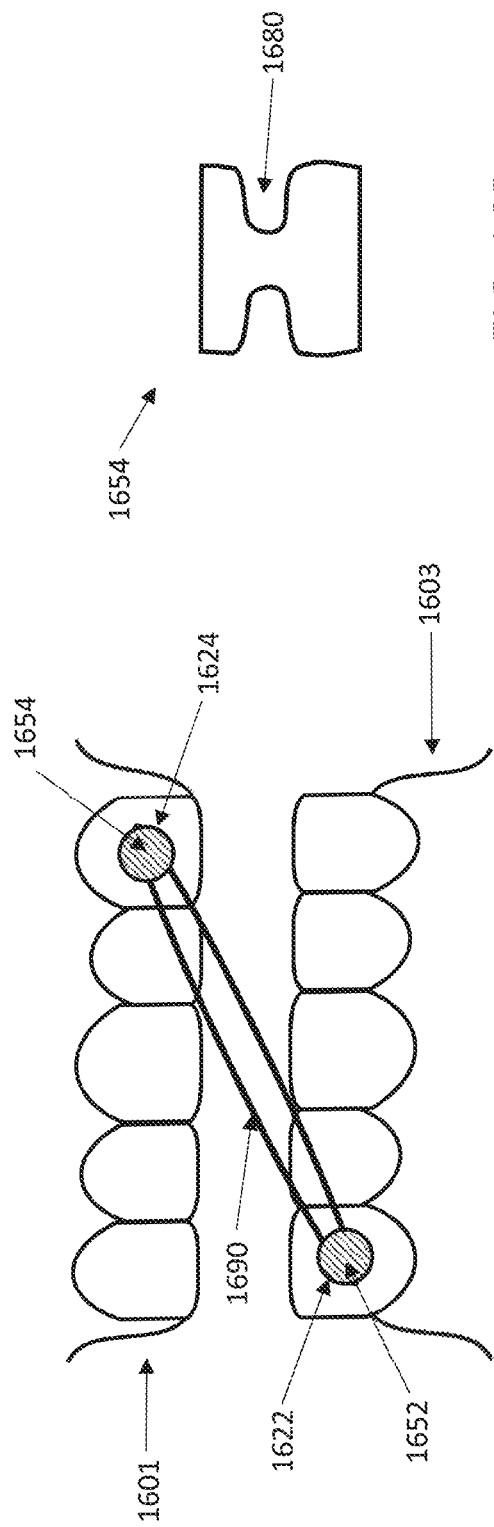
FIGS. 16A and 16B illustrate dental attachments with button auxiliary features attached to opposing dental arches and a resilient member coupled thereto.

FIG. 16A illustrates a further example of dental attachments with auxiliary features. The dental attachment (e.g., 1622 or 1624) can include an auxiliary feature (e.g., 1652 or 1654) in the form of a button. FIG. 16B shows an example section view of the button auxiliary feature 1654, showing a groove 1680 that an elastic band 1590 can be hooked around. The elastic band 1590 can be hooked around the button auxiliary features 1652 and 1654 to apply a pulling force toward corresponding teeth on opposing dental arches 1601 and 1603. In some embodiments, the attachments and/or auxiliary features are also used in conjunction with one or more additional orthodontic devices, such as one or more aligners, to move teeth in the first and/or second dental arches according to a treatment plan.

Figure 17:
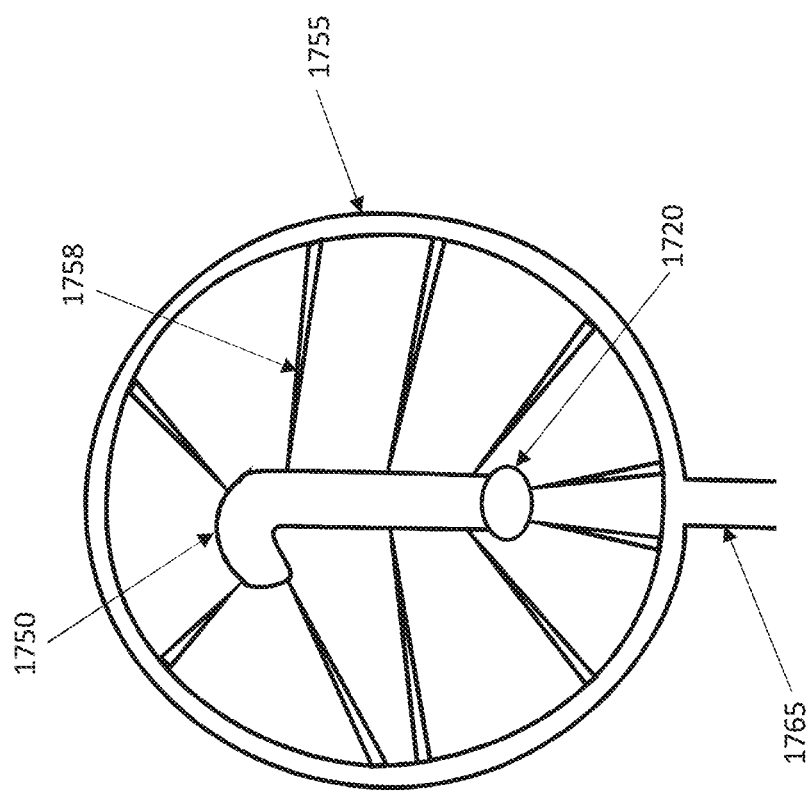
FIG. 17 illustrates a power arm functional feature with an attachment frame and retention supports according to some embodiments.

In some embodiments, the auxiliary feature and attachment are supported by an attachment frame, such as illustrated in in the example of FIG. 17. The dental attachment (e.g., 1720) with auxiliary feature (e.g., 1750) attached thereto can be supported by an attachment frame (e.g., 1755), which is connected directly or indirectly to the frame. In some cases, the attachment frame is directly or indirectly connected to the frame by an attachment support (e.g., 1765) that extends from the frame. The attachment frame may surround at least a portion of the attachment and/or the auxiliary feature and be connected to the attachment and/or the auxiliary feature by one or more struts (e.g., 1758). In some embodiments, the one or more struts are frangibly coupled to the attachment and/or the auxiliary feature for easier removal (e.g., with or without the use of a detachment tool). The one or more struts may have a tapered geometry.

As described herein, the dental attachment placement structures described herein can be made of one material or a combination of materials. In some cases, the dental attachment placement structures can be formed of one or more polymers (e.g., polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof). In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

Figure 11:
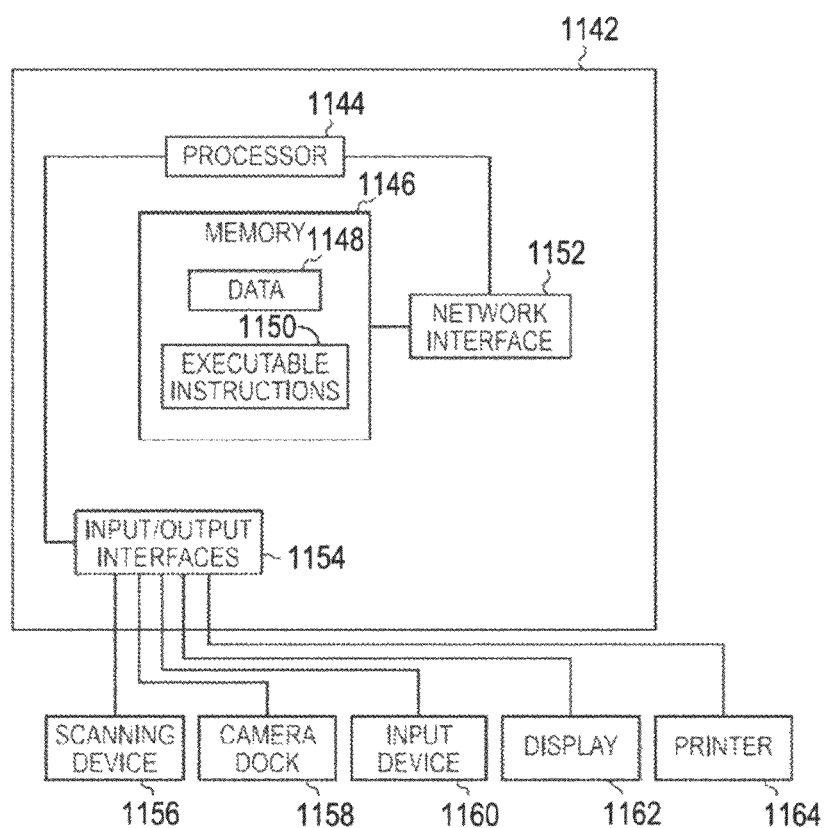
FIG. 11 illustrates a computing device that can be utilized according to one or more embodiments of the present disclosure.

FIG. 11 illustrates a computing device that can be utilized according to one or more embodiments of the present disclosure. For instance, a computing device 1142 can have a number of components coupled thereto. The computing device 1142 can include a processor 1144 and a memory 1146. The memory 1146 can have various types of information including data 1148 and executable instructions 1150, as discussed herein. The processor 1144 can execute instructions 1150 that are stored on an internal or external non-transitory computer device readable medium (CRM). A non-transitory CRM, as used herein, can include volatile and/or non-volatile memory. Volatile memory can include memory that depends upon power to store information, such as various types of dynamic random-access memory (DRAM), among others. Non-volatile memory can include memory that does not depend upon power to store information.

Memory 1146 and/or the processor 1144 may be located on the computing device 1142 or off of the computing device 1142, in some embodiments. As such, as illustrated in the embodiment of FIG. 11, the computing device 1142 can include a network interface 1152. Such an interface 1152 can allow for processing on another networked computing device, can be used to obtain information about the patient, and/or can be used to obtain data and/or executable instructions for use with various embodiments provided herein.

As illustrated in the embodiment of FIG. 11, the computing device 1142 can include one or more input and/or output interfaces 1154. Such interfaces 1154 can be used to connect the computing device 1142 with one or more input and/or output devices 1156, 1158, 1140, 1142, 1164. For example, in the embodiment illustrated in FIG. 11, the input and/or output devices can include a scanning device 1156, a camera dock 1158, an input device 1140 (e.g., a mouse, a keyboard, etc.), a display device 1142 (e.g., a monitor), a printer 1164, and/or one or more other input devices. The input/output interfaces 1154 can receive executable instructions and/or data, storable in the data storage device (e.g., memory), representing a virtual dental model of a patient's dentition.

In some embodiments, the scanning device 1156 can be configured to scan one or more physical dental molds of a patient's dentition. In one or more embodiments, the scanning device 1156 can be configured to scan the patient's dentition, a dental appliance, and/or attachment placement structure directly. The scanning device 1156 can be configured to input data into the computing device 1142. In some embodiments, the camera dock 1158 can receive an input from an imaging device (e.g., a 2D or 3D imaging device) such as a digital camera, a printed photograph scanner, and/or other suitable imaging device. The input from the imaging device can, for example, be stored in memory 1146.

The processor 1144 can execute instructions to provide a visual indication of a treatment plan, a dental appliance, and/or a one or more attachments on the display 1142. The computing device 1142 can be configured to allow a treatment professional or other user to input treatment goals. Input received can be sent to the processor 1144 as data 1148 and/or can be stored in memory 1146. Such connectivity can allow for the input and/or output of data and/or instructions among other types of information. Some embodiments may be distributed among various computing devices within one or more networks, and such systems as illustrated in FIG. 11 can be beneficial in allowing for the capture, calculation, and/or analysis of information discussed herein.

The processor 1144, in association with the data storage device (e.g., memory 1146), can be associated with the data 1148. The processor 1144, in association with the memory 1146, can store and/or utilize data 1148 and/or execute instructions 1150 for creating and/or modeling interactions between an attachment and a tooth; interactions between an attachment and an appliance; and/or combinations of interactions between one or more attachments, one or more teeth and/or other structure in the mouth of the patient, and/or one or more appliances for moving teeth.

The processor 1144, in association with the memory 1146 can, in addition to or alternatively, store and/or utilize data 1148 and/or execute instructions 1150 for creating and/or modeling attachment placement structures and/or attachments, and/or adhesive and/or releasable materials, as well as a virtual modeling of such items with or without an appliance for moving teeth, and/or one or more teeth. The virtual model of the attachment placement structure and/or attachments to attach a dental appliance to the teeth of a patient can be used to create a physical dental appliance, attachment placement structure and/or attachments, for instance, as discussed further herein.

The processor 1144 coupled to the memory 1146 can, for example, include instructions to cause the computing device 1142 to perform a method including, for example, creating a treatment plan based on a virtual model of a jaw of a patient, wherein the treatment plan includes use of an attachment.

In some embodiments, the processor 1144 coupled to the memory 1146 can cause the computing device 1142 to perform the method comprising modeling a virtual dental attachment based on the treatment plan, wherein the virtual dental attachment is constructed to provide one or more forces desired by the treatment plan.

In various embodiments, the processor 1144 coupled to the memory 1146 can cause the computing device 1142 to perform the method comprising creating a virtual dental attachment placement apparatus that includes a surface (e.g., contoured surface) configured to register in accordance with a scan of the patient's dental arch. The computing device 1142 may be configured to determine (e.g., calculate) a desired position of one or more attachments on corresponding teeth based on the virtual dental attachment placement apparatus and the scan of the patient's dental arch. Such analysis can also be accomplished one or more times for a treatment plan. For example, if a treatment plan has 30 stages, it would be possible to have different attachments for each stage or possibly more, if desired. However, in many instances the attachment type, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment placement apparatuses can be created from the virtual dental attachment placement apparatus data that would be utilized to create the attachments needed for the different stages.

Further, the specialized nature of the design of such attachments can also allow the attachments to be made from different materials. In this manner, attachments during a treatment plan or even during one stage can be of a different material that may provide more specialized force distribution than was possible with standard attachments.

In some embodiments, the printer 1144 can be a three dimensional or direct fabrication device that can create a dental appliance directly from instructions from the computing device 1142. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

Figure 19A:
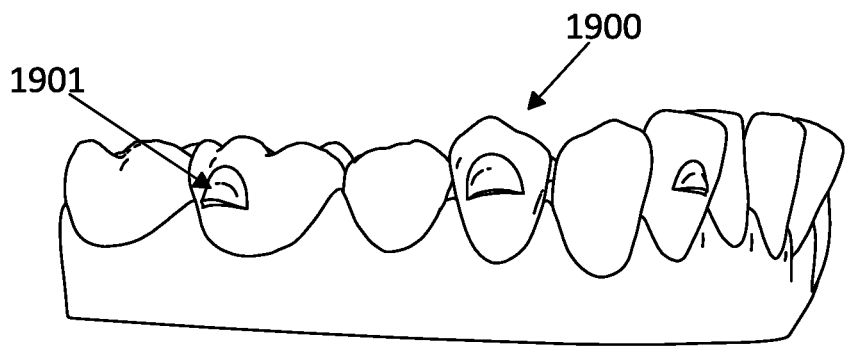
FIG. 19A illustrates an example of dental attachments bonded to a number of teeth of a dental arch.

FIG. 19A shows example dental attachments 1901 bonded to a number of teeth of a dental arch 1900. The dental attachments 1901 can be designed to engage with portions of a dental aligner to apply forces to the teeth in accordance with a dental treatment plan. The dental aligner may be a polymer shell aligner that is configured to interact with the dental attachments 1901 to reposition (e.g., straighten) the teeth. The dental attachments 1901 may be placed at predetermined locations on the teeth in order to apply appropriate forces (e.g., in magnitude and/or direction) in accordance with part of the dental treatment plan. In some cases, the dental treatment plan includes changing the dental attachments 1901 to a different set(s) of dental attachments over the treatment plan. For example, a subsequent set of dental attachments may have different shapes and/or be positioned at different locations on the teeth, and/or on different teeth, compared to a current set of dental attachments 1901. In other cases, the same set of dental attachments 1901 is used over the entirety of the treatment plan.

Figure 19B:
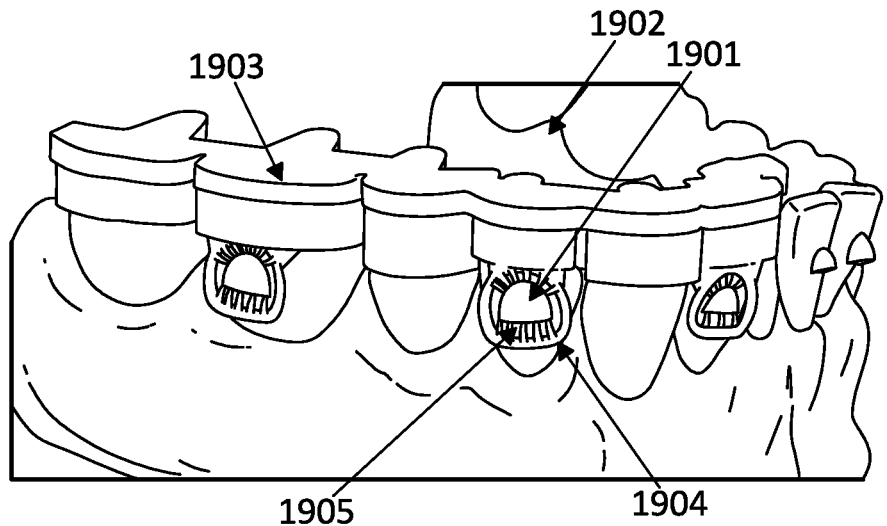
FIG. 19B illustrates an example dental attachment placement apparatus for placing the dental attachments of FIG. 19A onto the teeth of the dental arch.

FIG. 19B shows an example dental attachment placement apparatus 1902, which may be used to properly place the dental attachments 1901 so that they can cooperate with a dental aligner to apply the correct forces on the teeth. The dental attachment placement apparatus 1902 can include a body 1903 (also referred to as a frame or positioner) that may be configured for placement against tooth surfaces of the dental arch. For example, as shown, the body 1903 can include a number of registration surfaces that are configured to mate with surfaces of the patient's teeth to align the body 1903 with respect to the patient's dental arch when the body 1903 is placed on the patient's dental arch. In some cases, the body 1903 is configured to contact occlusal surfaces of the teeth and extend over the occlusal surfaces to contact portions of the buccal and/or labial surfaces of the teeth. In some instances, the body 1903 is configured to contact all teeth of the dental arch. In other cases, the body 1903 is configured to contact only a subset of the teeth (e.g., 1, 2, 3, 4, 5, etc.) of the dental arch. The body may include surfaces that register with the tooth surfaces of the dental arch to retain a relative position of the dental attachment placement apparatus 1902 with respect to the dental arch when placed against the tooth surfaces. In some instance, the body may include one or more cavities shaped to receive corresponding one or more teeth to retain the relative position of the dental attachment placement apparatus with respect to the dental arch when placed against the tooth surfaces.

The body 1903 can include one or more attachment supports (e.g., attachment support structures) 1904 that are coupled to the body 1903 and that are configured to position one or more attachments 1901 adjacent to corresponding one or more teeth. That is, the one or more attachments 1901 can be aligned with one or more bonding surfaces of the one or more teeth when the body 1903 is placed on the patient's dental arch. The dental attachments 1901 may be formed (prefabricated) with the body 1903 and attachment supports 1904 so that the dental attachments 1901 are at a predetermined position with respect to the teeth when the body 1903 is placed on the dental arch. That is, when the body 1903 is properly positioned on the teeth, the attachment supports 1904 can align the attachments 1901 with respect to tooth surfaces for bonding. This helps the dental practitioner to ensure proper alignment of the attachments 1901 when bonding to the teeth. In the example shown, the attachment support(s) 1904 protrude from one side of the body 1903 such the attachments 1901 are positioned for bonding at predetermined positions on the buccal sides of the teeth.

Figure 19C:
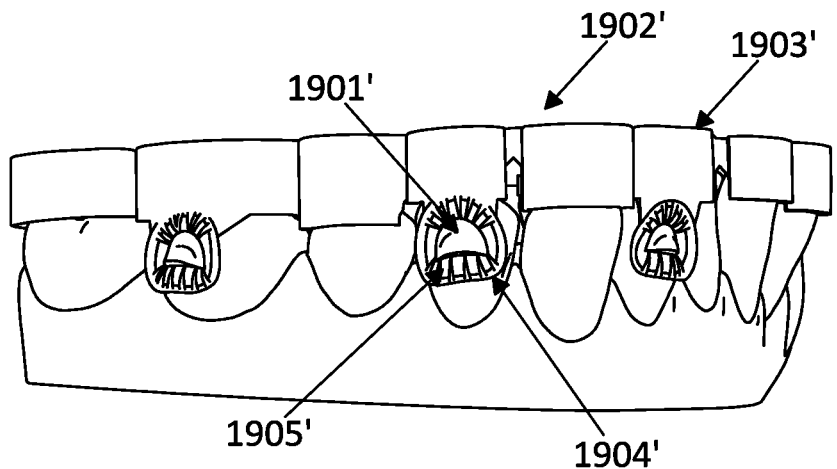
FIG. 19C illustrates an example dental attachment placement apparatus computer model that can be used to form the dental attachment placement apparatus of FIG. 19B.

The dental attachment placement apparatus 1902 may be formed using any manufacturing methods, including one or more of additive manufacturing (e.g., 3D printing), molding, joining, casting and/or other fabrication techniques. In some instances, the dental attachment placement apparatus 1902 is formed based on a computer model. FIG. 19C shows an example dental attachment placement apparatus computer model 1902' that can be used to form the dental attachment placement apparatus 1902. As shown, the computer model 1902' can include a body 1903' (corresponding to the body 1903), one or more attachment supports 1904' (corresponding to the attachment support(s) 1904), one or more supports

1905' (corresponding to the support(s) 1905), and one or more dental attachments 1901' (corresponding to the dental attachment(s) 1901). The computer model 1902' may be manipulated based on changes to the forces required to apply appropriate forces on the teeth at different stages of the treatment plan. For example, the placement and number of the dental attachment 1901 may be modified.

The dental attachment placement apparatus can include a dental attachment replacement system to provide one or more replacement dental attachments for replacing the dental attachments 1901 (referred to herein as first or primary attachments). This may be useful, for example, if one or more of the first or primary dental attachments 1901 is lost or damaged, for example, during transport or handling of the dental attachment placement apparatus 1902. For example, a dental specialist can use the replacement system to replace a dental attachment if it were to fall off during treatment, or if the dental attachment failed to bond. The replacement system can be configured to ensure proper placement of the replacement dental attachments with respect to the tooth/teeth of the dental arch. The replacement system can have little impact to the overall usability and precision of the dental attachment placement apparatus and may not place additional burden on manufacturing of the apparatus and/or on the dental specialist using the apparatus. In some cases, the replacement system may be considered part of the attachment support 1904.

FIGS. 20A-32C illustrate dental attachment replacement systems that can be integrated into any of the dental attachment placement apparatuses described herein, such as the dental attachment placement apparatus 1902 (FIGS. 19A and 19B) or any of the dental attachment placement apparatuses described above with reference to FIGS. 1A-18.

FIGS. 20A-20E show an example dental attachment replacement system 2020 that is configured to replace a first dental attachment 2001 with a second dental attachment 2021. As shown, the replacement system 2020 can be coupled to the body 2003 of the dental attachment placement apparatus. The replacement system 2020 is configured to move the second dental attachment 2021 with respect to the body 2003 to position the second dental attachment 2021 at a predetermined position adjacent to a tooth for bonding to the tooth. In this example, the replacement system 2020 includes a hinge 2006 that is configured to rotate the second dental attachment 2021 with respect to the body 2003. The hinge 2006 can be configured to rotate the second dental attachment 2021 in a direction perpendicular to and toward the tooth.

Figure 20A:
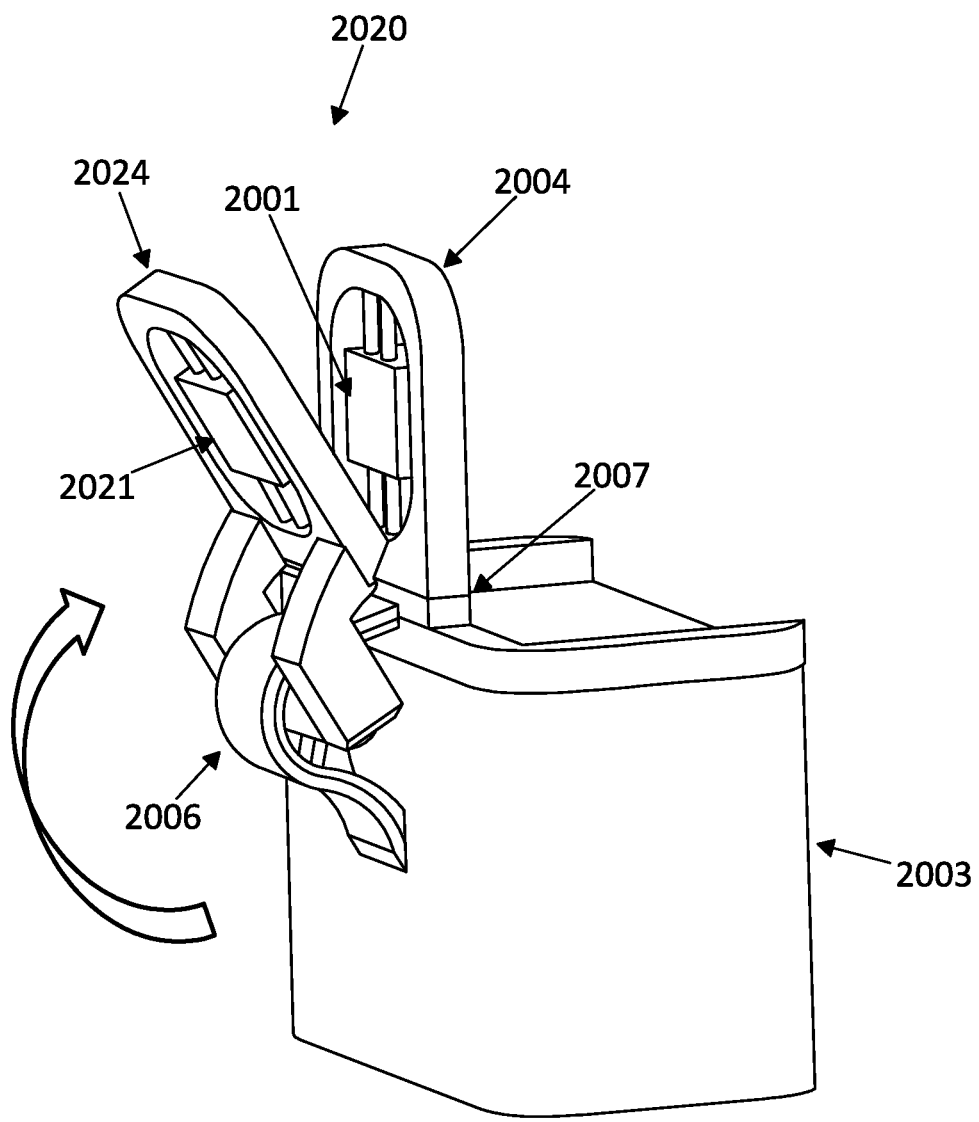
FIGS. 20A-20E illustrate an example of a hinge-type dental attachment replacement system for providing a first dental attachment and a second dental attachment.
Figure 20B:
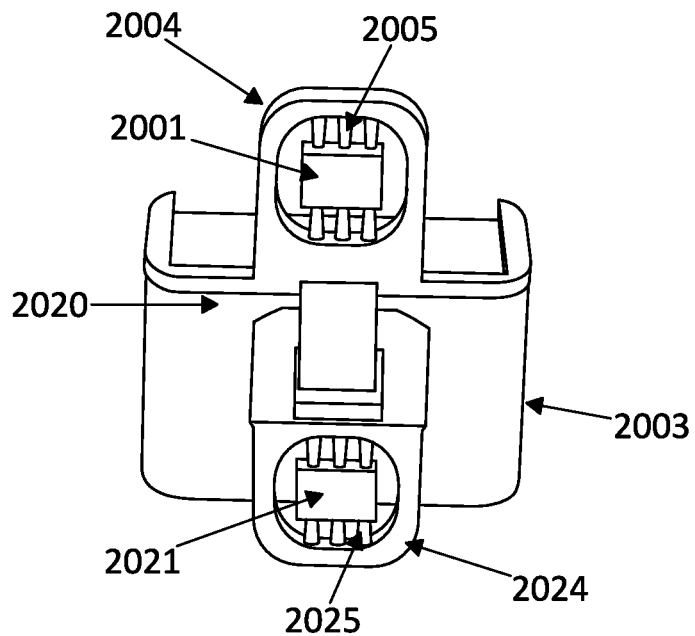
Figure 20C:
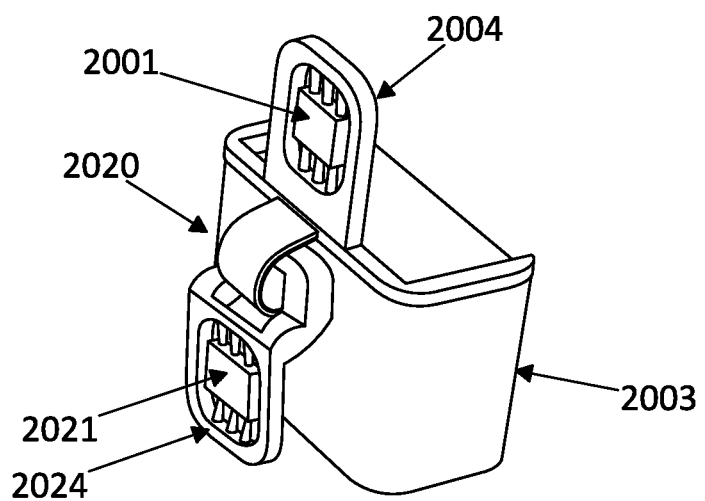

As shown in FIGS. 20A-20C, the replacement system 2020 can include a first attachment support 2004 for supporting the first dental attachment 2001 in position adjacent to a tooth. The first attachment support 2004 may have a frame shape that surrounds the first dental attachment 2001 within a plane. The first attachment support 2004 can include supports 2005 that connect the first dental attachment 2001 to the first attachment support 2004. In some cases, the supports 2005 are frangible so that the first dental attachment 2001 can be easily removed from the first attachment support 2004. A second attachment support 2024 that can similarly have a frame shape for supporting the second dental attachment 2021 therein. The second attachment support 2024 can include supports 2025 that connect the second dental attachment 2021 to the second attachment support 2024, and which also can be frangible.

Figure 20D:
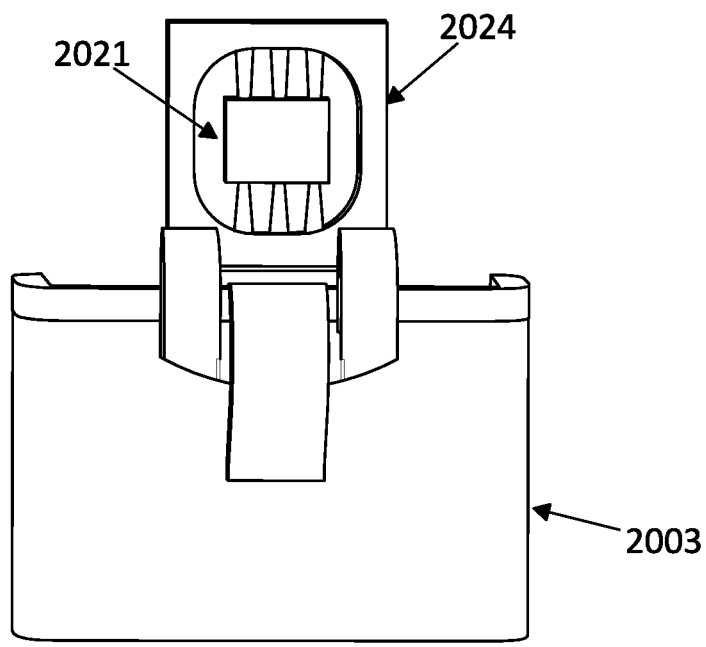
Figure 20E:
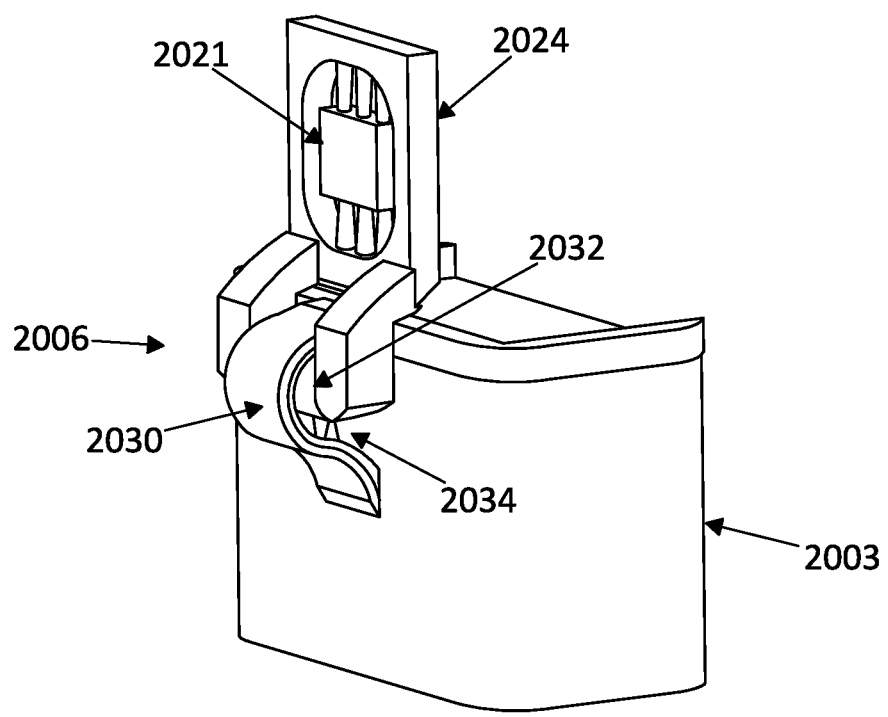

At least a portion of the first attachment support 2004 may be removable from the body 2003. For example, a breakable region 2007 at a base of the first attachment support 2004 can be configured to break away the first attachment support 2004 from the body 2003. Once the first attachment support 2004 is removed from the body 2003, the second attachment support 2024 supporting the second dental attachment 2021 can be rotated via the hinge 2006 to position the second dental attachment 2021 adjacent to the tooth as shown in FIGS. 20D and 20E. The hinge 2006 can include a loop section 2030 that is on a side of the body 2003 and that forms an opening for accommodating a bar 2032 of the second attachment support 2024. The loop section 2030 can be configured to allow the bar 2032 to rotate therein, thereby allowing the second attachment support 2024 with the second dental attachment 2021 to rotate relative to the body 2003. In some cases, the hinge 2006 may include a guide or lock 2034 that is configured to ensure proper positioning of the second attachment support 2024 and/or to lock the second attachment support 2024 in place once the second dental attachment 2021 is positioned at the desired location adjacent to the tooth for bonding.

It is noted that FIGS. 20A-20E show an example one dental attachment replacement system 2020 for attaching a replacement attachment 2021 on one tooth, which can be incorporated into a dental attachment placement apparatus (e.g., 1902). However, the dental attachment placement apparatuses described herein can include any number of dental attachment replacement systems (e.g., 1, 2, 3, 4, 5, 6, 7, 8, 10, 12 or 20) for attaching any number of replacement attachments to any number of teeth.

In any of the dental attachment placement apparatuses described herein, the replacement dental attachments may have the same shape and/or size as corresponding primary attachments or have different shapes and/or sizes than the corresponding primary attachments. Additionally, the dental attachments replacement systems may be arranged to position a replacement dental attachment at the same position with respect to the tooth as the corresponding dental attachment, or at a different position with respect to the tooth compared to the corresponding dental attachment. For example, referring to FIGS. 20A-20E, the second dental attachment 2021 may have the same size and shape as the first dental attachment 2001, thereby providing a replica of the first dental attachment 2001, for example, if the first dental attachment 2001 is lost or damaged. In some cases, the second dental attachment 2021 may have a different shape and/or size as the first dental attachment 2001. Additionally or alternatively, the second attachment support 2024 may be configured to position the second dental attachment 2021 at the same place relative to the tooth as the first attachment support 2004 places the first dental attachment 2001, or at a different place relative to the tooth compared to the first attachment support 2004. This flexibility may be useful, for example, if the second dental attachment 2021 is used to apply different forces (along with the dental aligner) to the teeth. For instance, the second dental attachment 2021 may be used for applying forces to the teeth (along with the dental aligner) in accordance with another step of the dental alignment plan. The second dental attachment 2021 may be made of the same material(s) as the first dental attachment 2001 or different material(s) compared to the first dental attachment 2001. A second dental attachment 2021 made of a different material may be useful, for example, if the second dental attachment 2021 is configured to withstand different forces than the first dental attachment 2001.

Figure 21:
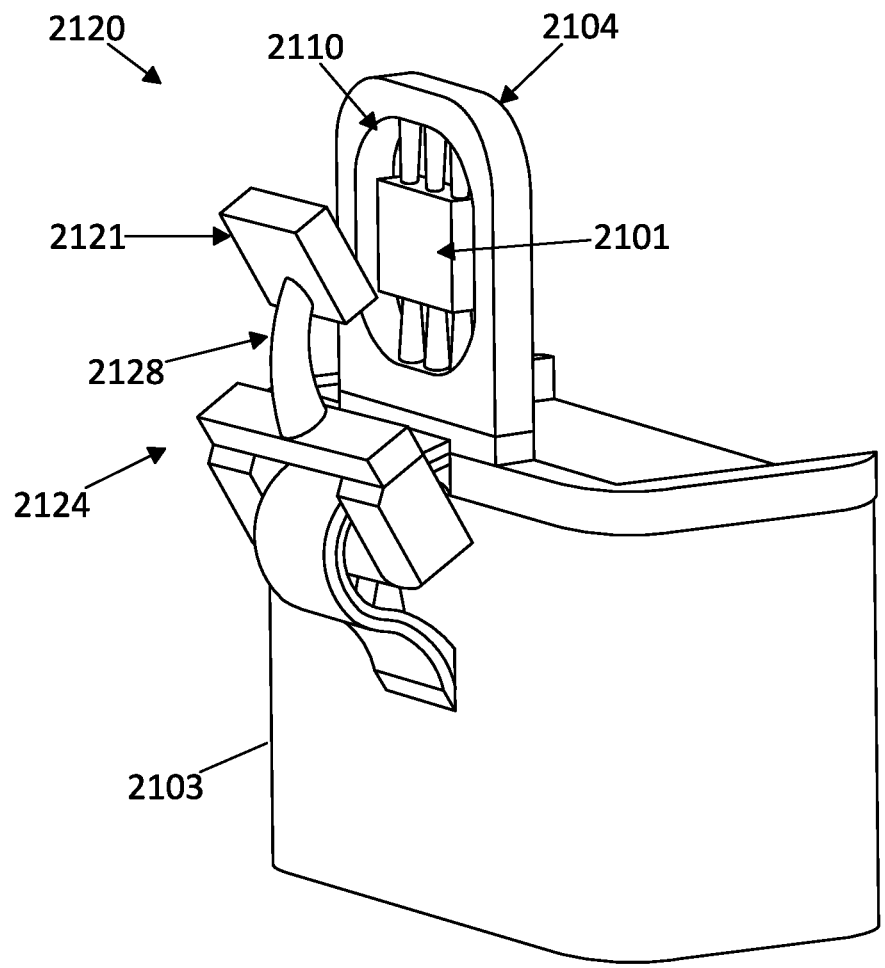
FIG. 21 illustrates another example of a hinge-type dental attachment replacement system.

FIG. 21 shows another example dental attachment replacement system 2120 that is an example of the hinge-based attachment replacement system 2020, where the second attachment support 2124 includes a post 2128 (rather than a frame) for supporting the second dental attachment 2121. The post 2128 may have a curved shape that curves toward the tooth to facilitate the placement of the second dental attachment 2121. In this example, once the first dental attachment 2101 is removed from the first attachment support 2104, the first attachment support 2104 (e.g., frame) may remain attached to the body 2103 when the second dental attachment 2121 is rotated adjacent to the tooth. In some cases, the first attachment support 2104 (e.g., frame) may be shaped and sized to align the second dental attachment 2121 with respect to the tooth. For example, the first attachment support 2104 (e.g., frame) can include one or more internal surface 2110 that contact and align the second dental attachment 2121.

Figure 22:
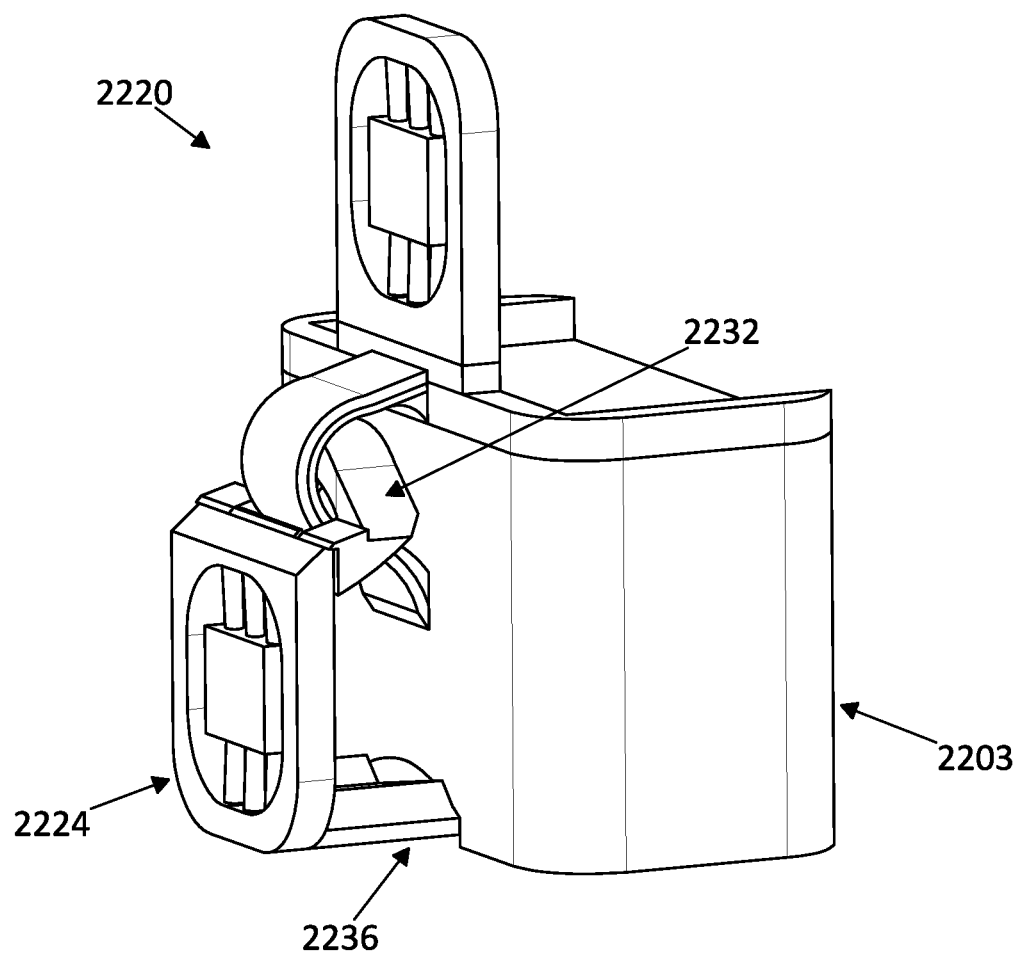
FIG. 22 illustrates a further example of a hinge-type dental attachment replacement system.

FIG. 22 shows a further example dental attachment replacement system 2220 that is another example of the hinge-based attachment replacement system 2020, where the dental attachment replacement system 2220 includes a sacrificial support 2236 that couples the second attachment support 2224 to the body 2203. The sacrificial support 436 can be configured to be severed/broken, for example by the dental specialist, to release the second attachment support 2224 so that the second attachment support 2224 can be rotated into place adjacent to the tooth. In some cases, the sacrificial support 2236 can act as a handle for the dental specialist when positioning the dental attachment placement apparatus on a patient's dental arch. Alternatively, the sacrificial support 2236 may be removed prior to shipping to the dental specialist. In this example, the bar 2232 of the second attachment support 2224 has curved shaped to lengthen the second attachment support 2224. Note that in cases where the dental attachment placement apparatus is printed (e.g., using 3D printing), the sacrificial support 2236 can be oriented at the bottom so that the dental attachment placement apparatus may be printed without additional printing supports.

Figure 23A:
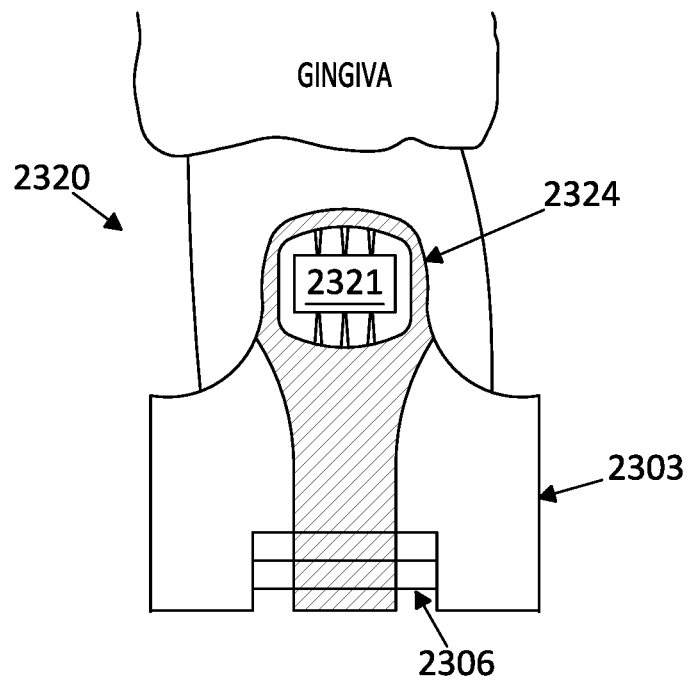
FIGS. 23A and 23B illustrate yet another example of a hinge-type dental attachment replacement system.
Figure 23B:
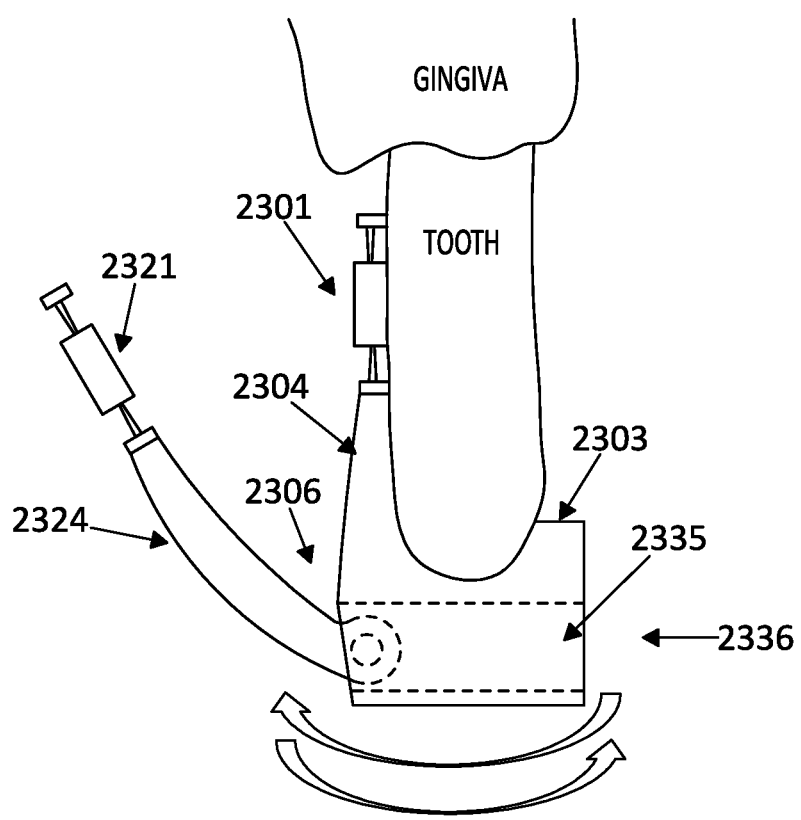

FIGS. 23A and 23B show another example dental attachment replacement system 2320 that is a further example of the hinge-based attachment replacement system 2020, where the hinge 2306 is configured to rotate the second attachment support 2324 to either side of the body 2303. In addition, the body 2303 can include an internal cutout 2335 that allows lateral movement of the hinge 2306 within the body so that the second attachment support 2324 (with the second dental attachment 2321 attached thereto) may be stored on a side 2336 of the body 2303 opposite the first attachment support 2304 (e.g., supporting the first dental attachment 2301). This configuration can allow the second attachment support 2324 and second dental attachment 2321 to be positioned out of the way until needed.

FIGS. 24A and 24B show a further example of a dental attachment replacement system 2420 that is another example of the hinge-based attachment replacement system 2020, where the first attachment support 2404 has a first frame 2440 that is configured to align a second frame 2444 of the second attachment support 2424. FIG. 24A shows a frontal view of the first frame 2440 and the second frame 2444 from the perspective of the tooth. The first frame 2440 can have a shape that accommodates the smaller second frame 2444 so that the second dental attachment 2421 can be positioned adjacent to the tooth. Thus, when rotated toward the tooth, the second frame 2444 can self-locate into the first frame 2440 for proper alignment of the second dental attachment 2421. FIG. 24B shows a side view of the dental attachment replacement system 2420 illustrating how the second attachment support 2424 can rotate with respect to the body 2403 to replace the first dental attachment 2401 with the second dental attachment 2421. FIG. 24C shows another example where the body 2403 includes an internal cutout 2446 that allows the second attachment support 2424 rotate further to move the second attachment support 2424 out of the way until needed.

Figure 25A:
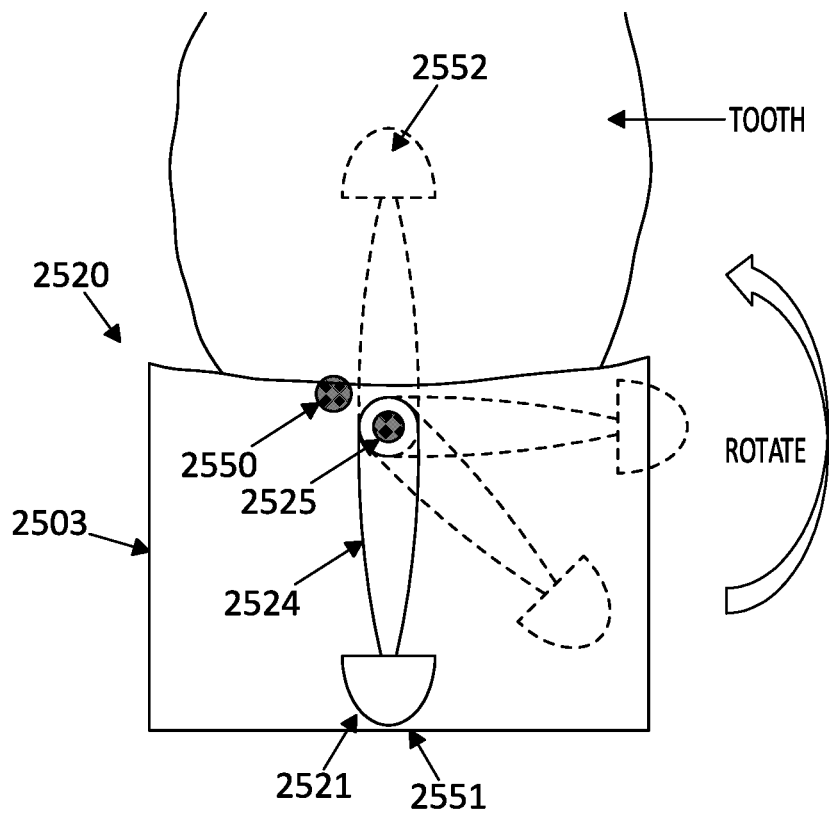
FIGS. 25A and 25B illustrate an example of a dial-type dental attachment replacement system.
Figure 25B:
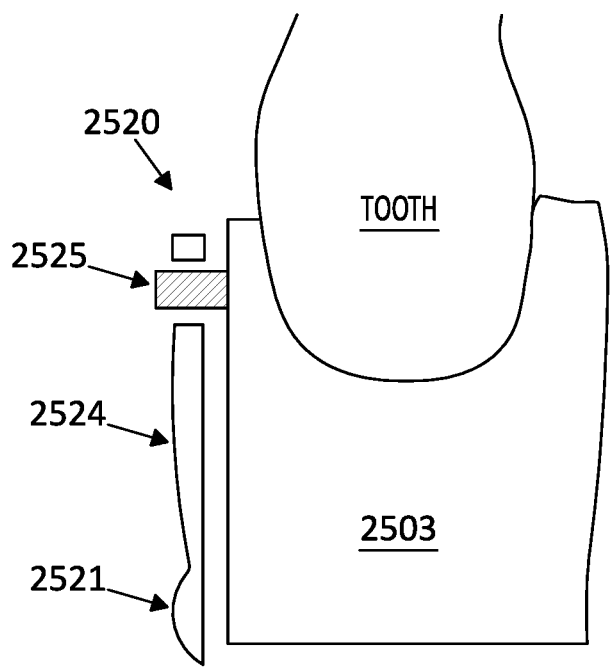

FIGS. 25A and 25B show an example dental attachment replacement system 2520 that includes a dial type assembly where the second attachment support 2524 is rotatable around a post 2525. Once the first dental attachment is removed from dental attachment placement apparatus, the second attachment support 2524 can be rotated such that the second dental attachment 2521, which is attached to the second attachment support 2524, can be rotated from a storage position 2551 to a desired position 2552 adjacent to the tooth. A stopper 2550 can prevent the second attachment support 2524 from rotating past the desired position 2552 so that the second dental attachment 2521 is properly positioned adjacent to the tooth.

Figure 26:
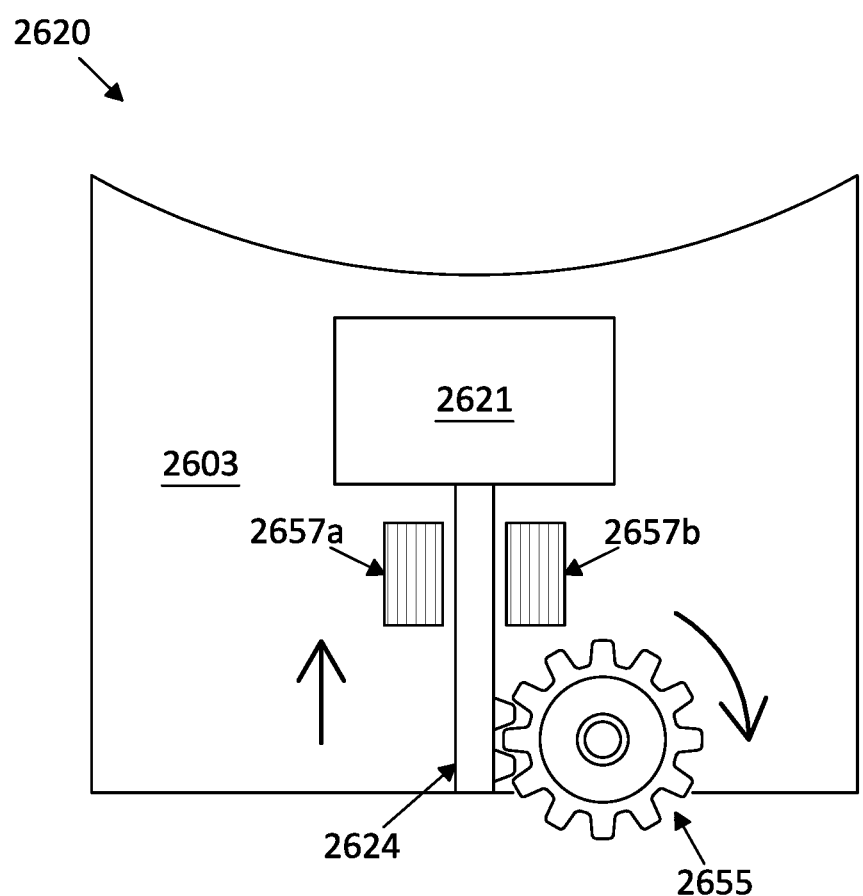
FIG. 26 illustrates an example dental attachment replacement system that includes a gear assembly.

FIG. 26 shows an example dental attachment replacement system 2620 that includes a gear assembly. The teeth of a gear 2655 can engage with teeth on the second support structure 2624 such that rotational motion of the gear 2655 causes linear translation of the second support structure 2624. For example, the gear 2655 can be rotated in a first direction to extend the second dental attachment 2621 above (or below) the body 2603 to a desired position adjacent a tooth. Likewise, the gear 2655 may be rotated in a second (opposite) direction to retract the second dental attachment 2621 the out of the way, for example, of the first dental attachment. In some instances, guides 2657a, 2657b guide the second support structure 2624 to so that the second dental attachment 2621 is positioned properly adjacent to the tooth.

Figure 27A:
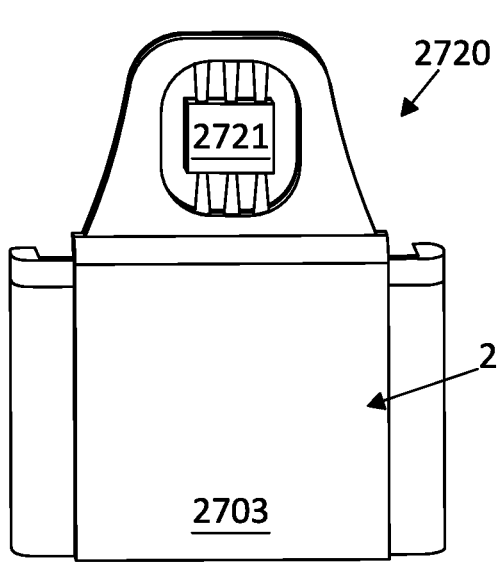
FIGS. 27A-27C illustrates an example dental attachment replacement system that includes a dowel joint assembly.
Figure 27B:
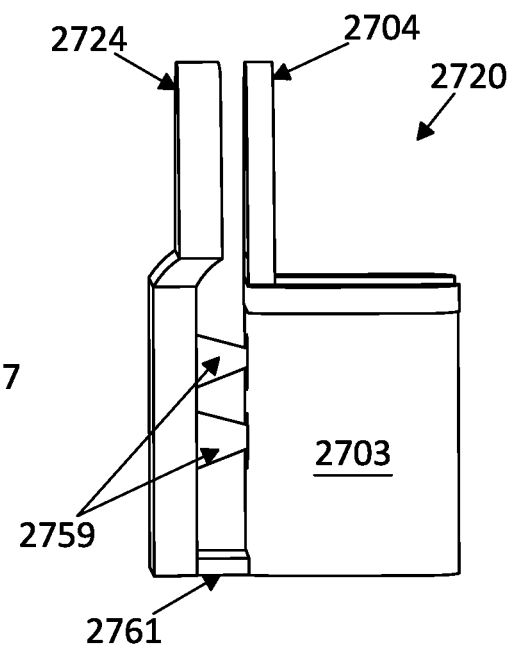
Figure 27C:
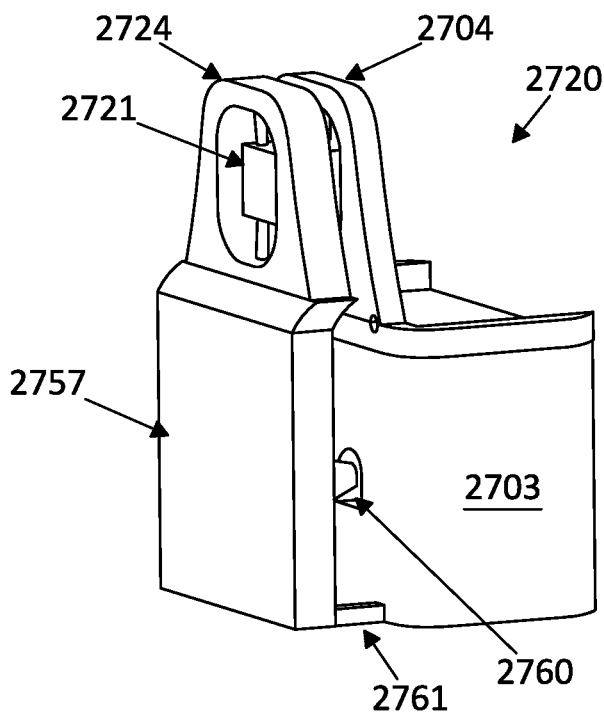

FIGS. 27A-27C show an example dental attachment replacement system 2720 that includes a dowel joint assembly. In this example, the second support structure 2724 that is connected to the body 2703 by a breakable support 2761. The breakable support 2761 can be broken, thereby freeing the second support structure 2724 from the body 2703. The first support structure 2704 can be removed from the body 2703, for example, if it is damaged or has a missing first dental attachment. The second support structure 2724 includes one or more alignment structures 2759 (e.g., dowel shaped, or cone shaped) that are configured to fit within one or more correspondingly shaped openings 2760 of the body 2703, which align the second support structure 2724 with the second dental attachment 2721 into proper position for bonding of the second dental attachment 2721 against the tooth. In this example, the second support structure 2724 includes three alignment structures 2759 to maximize stabilization and ensure consistent placement of the second dental attachment 2721. However, the dental attachment replacement system 2720 may include more alignment structures 2759 with corresponding openings 2760 (e.g., 4, 5, 6, 7, 10), or less alignment structures 2759 with corresponding openings 2760 (e.g., 1 or 2). In some instances, the second support structure 2724 includes a label 2757 (e.g., upper left mandible "ULM") to track the second support structure 2724 when separated from the body 2703, thereby reducing the chances of the second support structure 2724 being placed incorrectly. In some cases, the second support structure 2724 has a large enough size that it can be handled by the dental specialist without risk of breaking the second dental attachment 2721. In the case of a 3D printed part, the second support structure 2724 may be printed along with the rest of the dental attachment placement apparatus, thereby eliminating tolerance stack up and traceability issues associated with lots of small spare individual parts. Further, dental attachment placement apparatus. The second support structure 2724 may be removed from the body 2703 during manufacturing and placed in kit or may be removed by dental specialist.

Figure 28A:
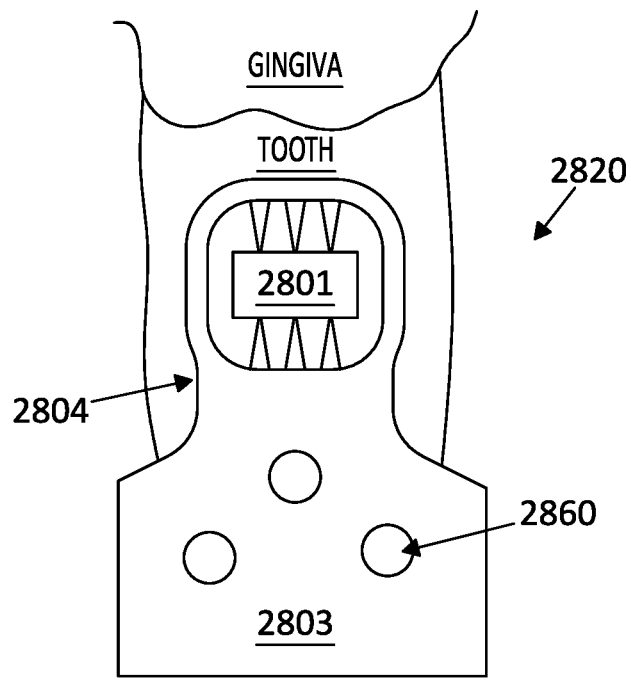
FIGS. 28A and 28B illustrate another example of a dental attachment replacement system having a dowel joint assembly.
Figure 28B:
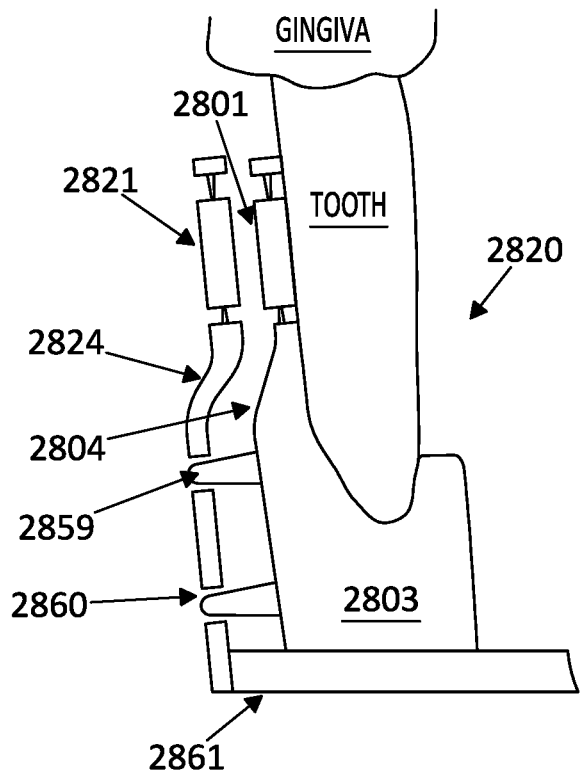

FIGS. 28A and 28B show another example of a dental attachment replacement system 2820 having a dowel joint assembly. In this case, the body 2803 includes one or more alignment structures 2859 that are configured to fit within one or more correspondingly shaped openings 2860 of the second support structure 2824. The breakable support 2861 can be broken to release the second support structure 2824 from the body 2803, then positioned properly adjacent the tooth by the one or more alignment structures 2859 guided within the one or more correspondingly shaped openings 2860 once the first dental attachment 2801 (and in some cases also the first support structure 2804) is removed from the body 2803.

Figure 29A:
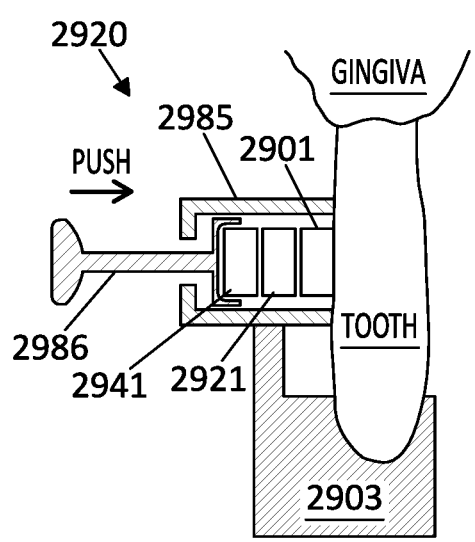
FIGS. 29A-29C illustrate example dental attachment replacement systems having dispenser type assemblies.
Figure 29B:
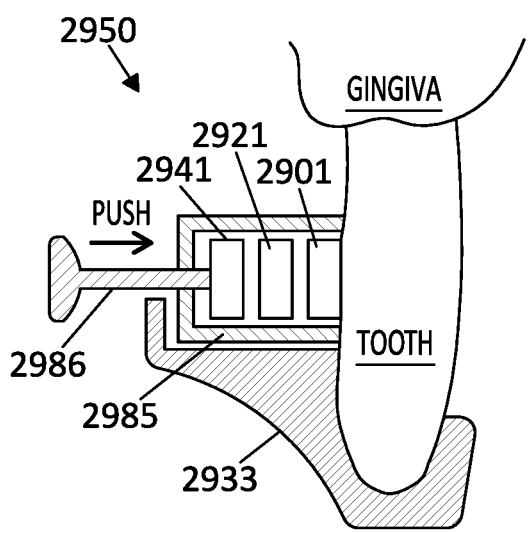
Figure 29C:
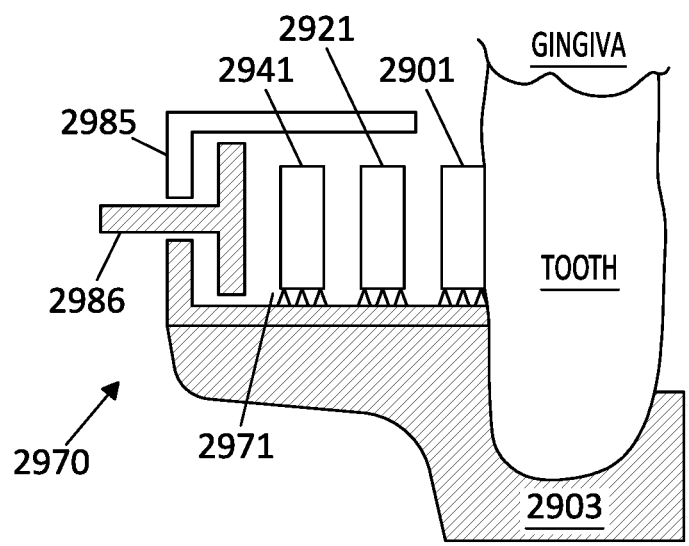
Figure 30A:
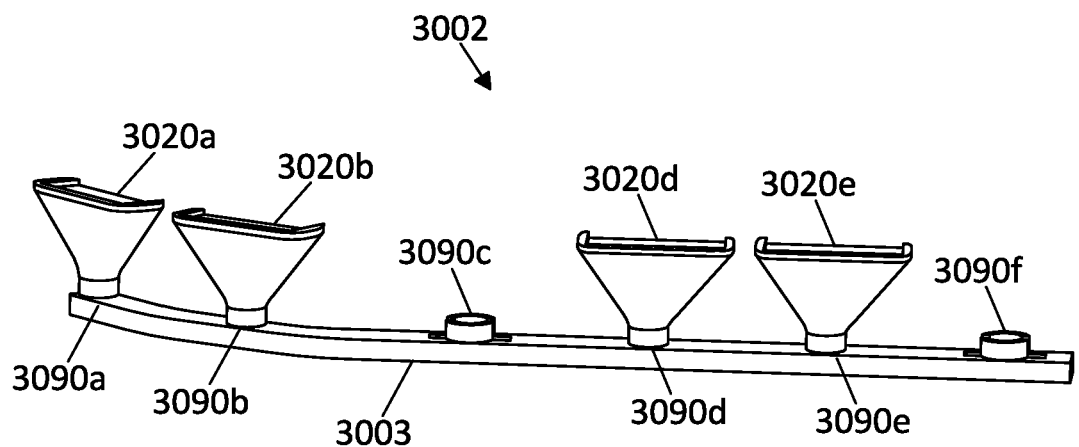
FIGS. 30A-30D illustrate an example of a portion of a dental attachment placement apparatus that includes anchors for removably attaching dental attachment replacement systems.
Figure 30B:
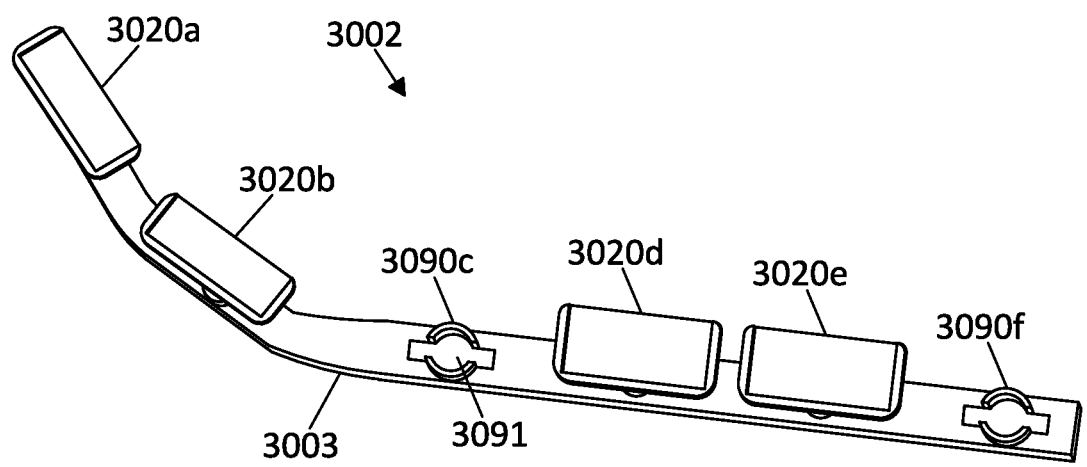
Figure 30C:
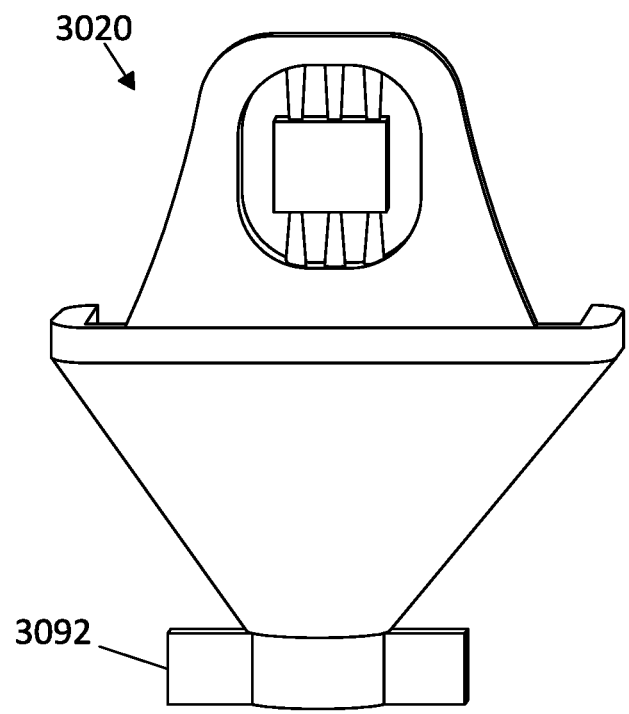
Figure 30D:
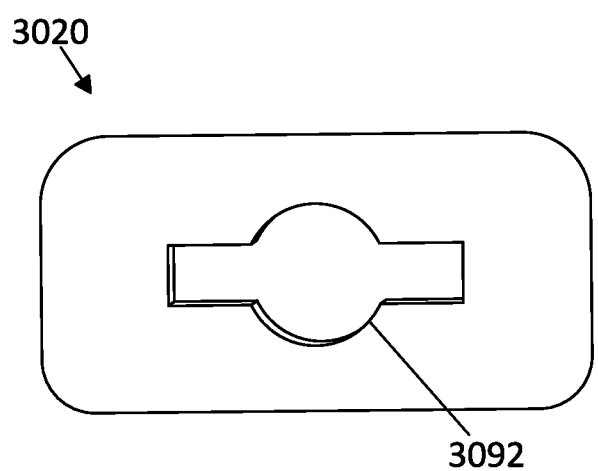

FIGS. 29A-29C show example dental attachment replacement systems 2920, 2980 and 2990 having dispenser type assemblies. In FIG. 29A, the dental attachment replacement systems 2920 includes multiple dental attachments 2901, 2921 and 2941 stored within a reservoir 2985 until they are needed. A push rod 2986 can be used to push a desired one of the multiple dental attachments 2901, 2921 and 2941 adjacent the tooth. For example, if the first dental attachment 2901 fails to bond, the first dental attachment 2901 can be removed and the second dental attachment 2921 can be moved into place by pushing the push rod 2986. FIG. 29B shows dental attachment replacement system 2950 example similar to the dental attachment replacement system 2920 except that the body 2933 (compared to body 2903) extends partially around the reservoir 2985 and has a contoured shape. FIG. 29C shows another dental attachment replacement system 2970 example similar to the dental attachment replacement system 2920 except that the dental attachments 2901, 2921 and 2941 are frangibly connected to the body 2903 by breakable features 2971, which can maintain the positions of the dental attachments 2901, 2921 and 2941 within the reservoir 2985. In the examples of FIGS. 29A-29C, the dental attachments 2901, 2921 and 2941 may be manufactured separately from or with the manufacture of the dental attachment replacement systems 2920, 2980 and 2990.

FIGS. 30A-30D show an example of a portion of a dental attachment placement apparatus 3002 that includes anchors (e.g., 3090a, 3090b, 3090c, 3090d, 3090e and 30900 that are configured to removably connect with multiple corresponding dental attachment replacement systems (e.g., 3020a, 3020b, 3020d and 3020e). In this example, the anchors 3090 include keyholes 3091 that are configured to accept protruding keys 3092 of the anchors 3020. In some cases, the keys 3092 are attached by press fit within the keyholes 3091. Allowing the dental attachment replacement systems 3020 to be removably attached to the body 3003 adds a degree of flexibility to the apparatus 3002. For example, the manufacturer or the specialist can choose which dental attachment placement apparatus(es) 3002 to attached to the body 3003. The dental attachment replacement systems 3020 may be manufactured with or separately from the body 3003. This modular assembly can also allow any one of the replacement dental attachments to be switched to a different type (e.g., shape or size) mid treatment without the need to manufacture the entire dental attachment placement apparatus. Additional aligner orders can utilize the same body—just order new anchors. In some cases, additional anchors can be stored at the specialist's office. Manufacturing of the anchor and dental attachment as a unit ensures the attachment can be placed accurately every time as it relies on the stability of the anchor for reliable placement. The anchors may be large enough to be easily manufactured as stand-alone parts and easily traced, for example, by labeling each of the replacement attachments.

Figure 31A:
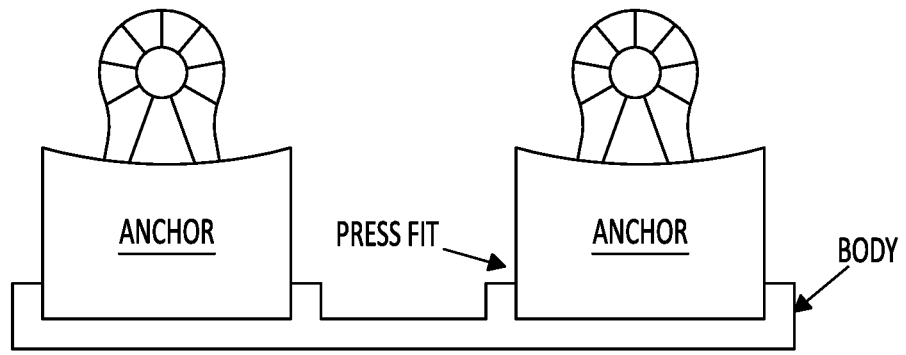
FIGS. 31A-31C illustrate other examples of dental attachment placement apparatuses having removable dental attachment replacement systems.
Figure 31B:
Figure 31C:
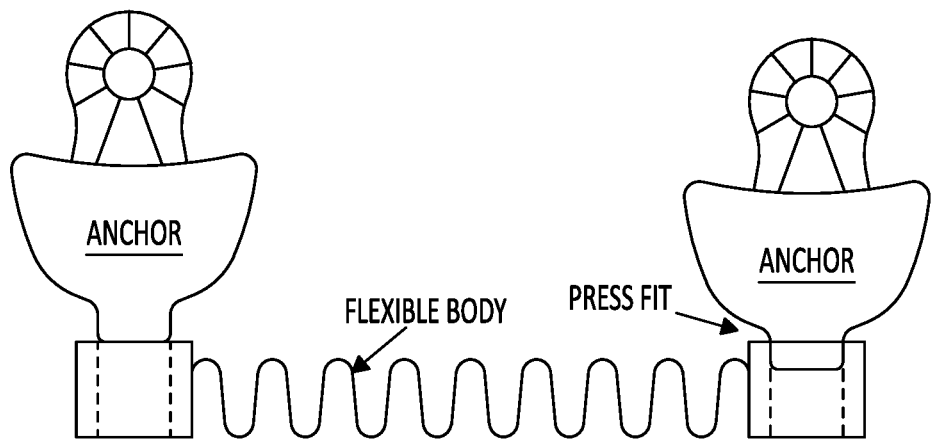

FIGS. 31A-31C show other examples of example of dental attachment placement apparatus having removable dental attachment replacement systems. FIG. 31A shows an example where the anchors are removably coupled (press fit) to square or rectangular shaped holes in the body. FIG. 31B shows an example where the anchors are removably coupled (press fit) to round shaped holes in the body. FIG. 31C shows an example where the anchors are removably coupled (press fit) to a flexible body.

Figure 32A:
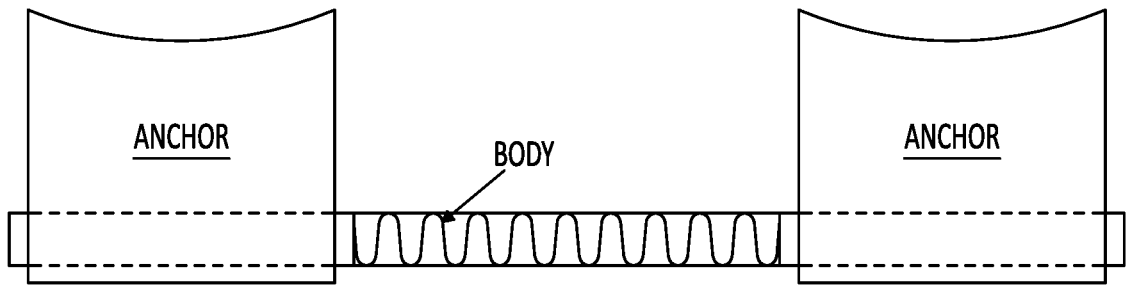
FIGS. 32A-32C illustrate other examples of removable dental attachment replacement systems.
Figure 32B:
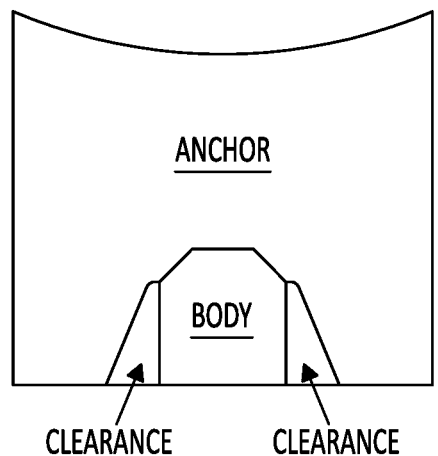
Figure 32C:
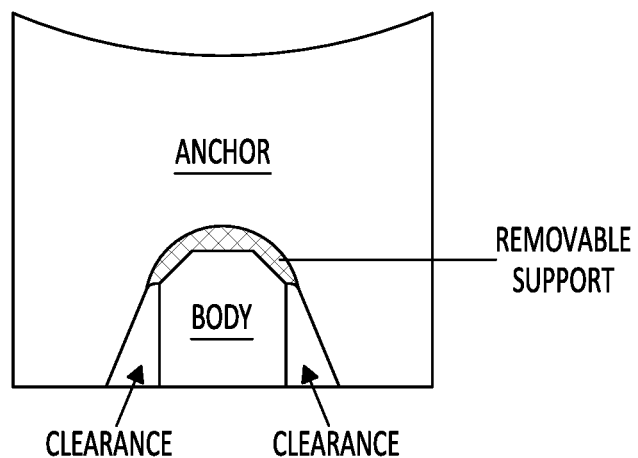

FIGS. 32A-32C show other examples of removable dental attachment replacement systems. FIGS. 32A and 32C shows an example where a clearance is provided between the anchors and the body so that the anchors and body may be printed as separate parts (e.g., during a single 3D printing). The anchor may snugly fit into the body (e.g., press fit, screw, slide etc.) Extra anchors can be manufactured separately and provided up front as backups or by request for individual teeth. FIG. 32C shows an example where a removable support is provided between the body and the anchor so that the body and the anchor can remain connected during post-processing, packaging, shipping etc. A user may press down on the anchor to break the removable support, thereby freeing the anchor from the body.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or examples of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and examples such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or examples of various embodiments. Combinations of the above embodiments, and other embodiments not specifically described herein, will be apparent to those of skill in the art upon reviewing the above description.

What is claimed is:

1. A dental attachment placement apparatus comprising:
    a body configured for placement against tooth surfaces of a dental arch;

a first attachment support coupled to the body and configured to position a first dental attachment adjacent to a tooth of the dental arch; and an attachment replacement system comprising a second attachment support coupled to the body, the second attachment support configured to move relative to the body to position a second dental attachment adjacent to the tooth in place of the first dental attachment.

2. The dental attachment placement apparatus of claim 1, wherein the attachment replacement system is configured to allow rotation or translation of the second attachment support relative to the body.

3. The dental attachment placement apparatus of claim 1, wherein the attachment replacement system includes one or more of a hinge, a joint, a rotatable arm, a gear and a dispenser configured to allow movement of the second attachment support relative to the body.

4. The dental attachment placement apparatus of claim 1, wherein the attachment replacement system includes a hinge configured to allow movement of the second attachment support relative to the body.

5. The dental attachment placement apparatus of claim 1, wherein the first attachment support is removably attached to the body.

6. The dental attachment placement apparatus of claim 1, wherein the body includes surfaces that register with the tooth surfaces of the dental arch to retain a relative position of the dental attachment placement apparatus with respect to the dental arch when placed against the tooth surfaces.

7. The dental attachment placement apparatus of claim 1, wherein the body includes cavities shaped to receive teeth of the dental arch to retain a relative position of the dental attachment placement apparatus with respect to the dental arch when placed against the tooth surfaces.

8. The dental attachment placement apparatus of claim 1, wherein first the attachment support is configured to position the first dental attachment at a first position with respect to the tooth, wherein the attachment replacement system is configured to position the second dental attachment at a second position with respect to the tooth that is different than the first position.

9. The dental attachment placement apparatus of claim 1, wherein the first attachment support is configured to position the first dental attachment at a first position with respect to the tooth, wherein the attachment replacement system is configured to position the second dental attachment at a second position with respect to the tooth that is the same as the first second position.

10. The dental attachment placement apparatus of claim 1, wherein the first dental attachment has a different shape than the second dental attachment.

11. The dental attachment placement apparatus of claim 1, wherein the first dental attachment has the same shape as the second dental attachment.

12. The dental attachment placement apparatus of claim 1, wherein the second attachment support includes one or more supports that frangibly connect the second dental attachment to the second attachment support.

13. The dental attachment placement apparatus of claim 1, wherein the first attachment support includes one or more supports that frangibly connect the first dental attachment to the first attachment support.

14. The dental attachment placement apparatus of claim 1, wherein the dental attachment placement apparatus includes multiple attachment replacement systems configured to replace multiple first dental attachments with corresponding multiple second dental attachments.

15. The dental attachment placement apparatus of claim 1, wherein the second attachment support is adjacent to the first attachment support.

16. A method of using a dental attachment placement apparatus, the method comprising:

placing a body of the dental attachment placement apparatus against tooth surfaces of a dental arch, wherein a first attachment support coupled to the body is configured to support a first dental attachment;

using an attachment replacement system comprising a second attachment support coupled to the body to move a second dental attachment to a position adjacent to a surface of a tooth of the dental arch, wherein moving the second dental attachment comprises moving the second attachment support relative to the body in place of the first dental attachment; and bonding the second dental attachment to the surface of the tooth.

17. The method of claim 16, further comprising removing the first dental attachment from the dental attachment placement apparatus prior to moving the second dental attachment to the position adjacent to the surface of the tooth.

18. The method of claim 16, further comprising removing the first attachment support from the dental attachment placement apparatus prior to moving the second dental attachment to the position adjacent to the surface of the tooth.

19. The method of claim 16, wherein moving the second dental attachment includes rotating or translating the second attachment support relative to the body.

20. The method of claim 16, wherein the second attachment support is adjacent to the first attachment support.

* * * * *